US012615149B2

(12) United States Patent
Otman et al.

(10) Patent No.: US 12,615,149 B2
(45) Date of Patent: *Apr. 28, 2026

(54) SIGNAL PROTECTION AND RETRIEVAL BY NON-LINEAR ANALOG MODULATION

(71) Applicant: Signal Advance, Inc., Rosharon, TX (US)

(72) Inventors: Naser Otman, Halifax (CA); Chris M. Hymel, Rosharon, TX (US); Ron Stubbers, Houston, TX (US)

(73) Assignee: Signal Advance, Inc., Rosharon, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/413,897

(22) Filed: Dec. 9, 2025

(65) Prior Publication Data

US 2026/0095325 A1 Apr. 2, 2026

Related U.S. Application Data

(63) Continuation of application No. 19/220,451, filed on May 28, 2025, which is a continuation-in-part of
(Continued)

(51) Int. Cl.
| | |
|---|---|
| *H04L 9/32* | (2006.01) |
| *H04L 9/08* | (2006.01) |
| *H04L 9/40* | (2022.01) |

(52) U.S. Cl.
CPC ............... *H04L 9/32* (2013.01); *H04L 9/088* (2013.01); *H04L 9/0822* (2013.01); *H04L 63/0428* (2013.01)

(58) Field of Classification Search
CPC ..... H04L 9/32; H04L 9/40; H04L 9/08; H04L 9/0822; H04L 9/088; H04L 63/0428
See application file for complete search history.

(56) References Cited

U.S. PATENT DOCUMENTS 4,302,628 A * 11/1981 Akrich ..................... H04K 1/06
                                                        380/43
5,909,491 A 6/1999 Luo
(Continued)

FOREIGN PATENT DOCUMENTS

| CN | 110381504 A | 10/2019 | |
|---|---|---|---|
| CN | 108768542 B | * 10/2021 | ........... H04L 9/0869 |
| WO | 2015097312 A1 | 7/2015 | |

OTHER PUBLICATIONS

Bianchi et al. "Composite signal representation for fast and storage-efficient processing of encrypted signals." IEEE Transactions on Information Forensics and Security 5.1 (2009): 180-187. Retrieved on May 23, 2024 (May 23, 2024).
(Continued)

*Primary Examiner* — Jayesh M Jhaveri
(74) *Attorney, Agent, or Firm* — Gregory M. Howison

(57) ABSTRACT

A method is disclosed for processing a file in either an encryption operation or a decryption operation. A received analog signal is received comprising one of an analog encrypted signal to be decrypted or an analog message signal to be encrypted, each having an associated length from a fixed beginning point. A first analog key signal and a second analog key signal are received, each having a fixed beginning point and an associated length. The received analog signal is processed through a first transfer function and the output of the first transfer function processed through a second transfer function, each of transfer function having at least a second order response. The operation of the first transfer function is parameterized with the first analog key and the operation of the second transfer function is parameterized with the second analog key. The steps of parameterizing are controlled to synchronize the beginning of the one of the encrypted analog encrypted signal or the
(Continued)

analog message signal received as the received signal with the beginning of the first and second analog key signals.

30 Claims, 50 Drawing Sheets

Related U.S. Application Data application No. 18/922,304, filed on Oct. 21, 2024, which is a continuation of application No. 18/621, 838, filed on Mar. 29, 2024, now Pat. No. 12,126,720.

(60) Provisional application No. 63/456,410, filed on Mar. 31, 2023.

(56) References Cited

U.S. PATENT DOCUMENTS

| | | | | |
|---|---|---|---|---|
| 7,545,929 | B1 * | 6/2009 | Babb | H04K 1/02 |
| | | | | 380/38 |
| 8,068,516 | B1 | 11/2011 | Oz | |
| 8,452,544 | B2 | 5/2013 | Hymel | |
| 12,537,684 | B2 * | 1/2026 | Wang | H04L 9/32 |
| 2003/0034909 | A1 | 2/2003 | Wong | |
| 2003/0035542 | A1 * | 2/2003 | Kim | H04L 1/14 |
| | | | | 380/37 |
| 2008/0141022 | A1 | 6/2008 | Hu et al. | |
| 2011/0246792 | A1 | 10/2011 | Weingarten | |

OTHER PUBLICATIONS

Motorola National Service Training: Securenet Systems Securenet Concepts: What is Securenet?; 28 Pages; Sep. 1, 1992.

Patent Cooperation Treaty: International Search Report and Written Opinion for PCT/US2024/022278; Matos , Taina; Jun. 17, 2024; 13 pages.

Patent Cooperation Treaty: International Preliminary Report on Patentability of PCT/US2024/022278 (related application); Fiona Doherty; Oct. 9, 2025; 11 pages.

* cited by examiner

NET TEMPORAL SHIFT

SPECTRAL COHERENCE
(Matched Key)

SPECTRAL COHERENCE
(Mis-Matched Key)

Digital Data Stream:  0101111100110011000001010001100101001011111001000001111001011

3-Bit Encoding
  010 111 110 011 001 100 000 101 000 110
  010 100 101 111 001 000 001 111 001 011

4-Bit Encoding
  0101 1111 0011 0011 0000 0101 0001 1001
  1001 0100 1011 1100 1000 0011 1100 1011

5-Bit Encoding
  01011 11100 11001 10000 01010 00110
  01010 01011 11001 00000 11110 01011

SIGNAL PROTECTION AND RETRIEVAL BY NON-LINEAR ANALOG MODULATION

CROSS-REFERENCE TO RELATED APPLICATIONS

This application is a Continuation of U.S. application Ser. No. 19/220,451, filed May 28, 2025, entitled SIGNAL PROTECTION AND RETRIEVAL BY NON-LINEAR ANALOG MODULATION, which is a Continuation-in-Part of U.S. application Ser. No. 18/922,304, filed Oct. 21, 2024, entitled SIGNAL PROTECTION AND RETRIEVAL BY NON-LINEAR ANALOG MODULATION, which is a Continuation of U.S. application Ser. No. 18/621,838, filed Mar. 29, 2024, entitled SIGNAL PROTECTION AND RETRIEVAL BY NON-LINEAR ANALOG MODULATION, issued as U.S. Pat. No. 12,126,720 on Oct. 22, 2024, which claims priority to U.S. Provisional Application Ser. No. 63/456,410, entitled "SIGNAL PROTECTION AND RETRIEVAL BY NON-LINEAR ANALOG MODULATION," filed Mar. 31, 2023, the complete disclosure thereof being incorporated herein by reference.

TECHNICAL FIELD OF THE INVENTION

The present invention relates to the analog encryption and decryption of analog and/or analog encoded digital files representing information/data.

BACKGROUND OF THE INVENTION

Protecting and maintaining secure communication and data capabilities are critical national priorities. Industrial control, military operations, banking, government and medical systems, etc. that rely on point-to-point data transfer and communication are too critical to allow eavesdropping or malicious manipulation. Communications are critical not only for defense, but across a wide range of industries, as noted, from medical to infrastructure and industrial communications and controls to law enforcement to cloud computing. The integrity of stored data and confidence that it remains both private and unaltered is also crucial to the systems listed above. Each of these requires assurance of data integrity and insurance against malicious intervention. This opens areas of application to include parallel processing, serial processing, time division and frequency division multiplexed waveforms, stored signals and encrypted storage; time division multiple access (TDMA), and its more sophisticated variations are all possible applications, as multiple parallel and/or serial data streams can be secured simultaneously.

Traditional and current approaches to encryption for cybersecurity are typically digital and complex with multiple communication and transmission overlays, and with potentially unknown vulnerabilities. Current systems use either point-to-point fully encrypted digital links or tunnels and, for radio frequency communication, spread spectrum techniques overlaying digital data encryption. Ever more complex and sophisticated digital attack strategies evolve as fast or faster than the protection mechanisms for these digital cybersecurity solutions. Therefore, fundamentally different and asymmetric strategies and countermeasures are needed to maintain and protect data transmission and storage.

SUMMARY OF THE INVENTION

The present invention disclosed and claimed herein comprises a method for processing a file in either an encryption operation or a decryption operation. A received analog signal is received comprising one of an analog encrypted signal to be decrypted or an analog message signal to be encrypted, each having an associated length from a fixed beginning point. A first analog key signal and a second analog key signal are received, each having a fixed beginning point and an associated length. The received analog signal is processed through a first transfer function and the output of the first transfer function processed through a second transfer function, each transfer function having at least a second order response. The operation of the first transfer function is parameterized with the first analog key and the operation of the second transfer function is parameterized with the second analog key. The steps of parameterizing are controlled to synchronize the beginning of the one of the encrypted analog encrypted signal or the analog message signal received as the received signal with the beginning of the first and second analog key signals.

BRIEF DESCRIPTION OF THE DRAWINGS

For a more complete understanding, reference is now made to the following description taken in conjunction with the accompanying Drawings in which.

DETAILED DESCRIPTION OF THE INVENTION

Figure 1:
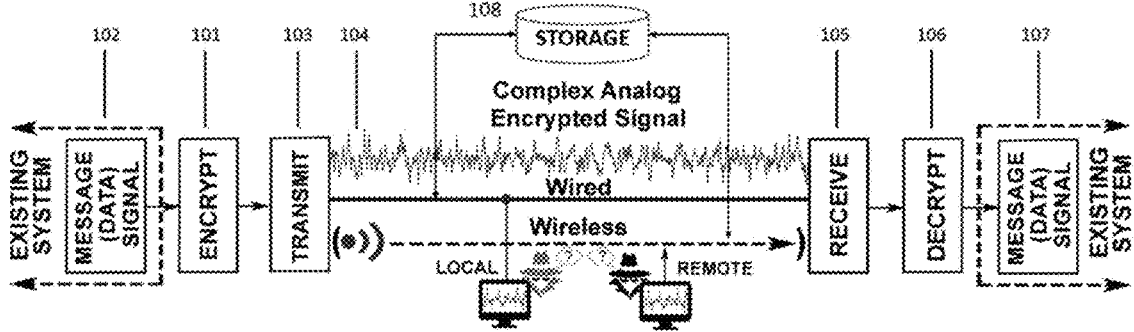
FIG. 1 illustrates a system block diagram of the encryption and decryption devices.

Referring now to FIG. 1, there is illustrated an overall block diagram of the analog key encryption system of the present disclosure. The process embodied in the system of FIG. 1 comprises analog encryption 101 of a received message/data signal 102 optionally provided to a transmission 103 or storage 108 means. Following transmission 103 or access to storage 108, the analog encrypted signal is received 105, in some instances by an intervening power or signal-amplifying receiver, and matching decryption 106 is applied to recover the original message/data signal 107 to enable point to point secure communications. It is compatible with a range of transmission media, including wired or wireless across a range of frequencies, including storage before transmission.

This technology uses an analog key signal-based Dynamic Carrier ("DC"), for example, the DC would be a Dynamic Frequency Carrier ("DFC") when frequency modulation (vs. phase or other form of modulation) is applied utilizing the analog key. Various forms of modulation (e.g., frequency, phase) using a complex analog key (or keys), rather than modulating the original analog message signal, modulate a carrier waveform to generate a complex dynamic carrier waveform. The DC is then mixed with another signal (e.g., the message signal), which is a baseband signal. This process is termed Analog Dynamic Modulation (ADM). This message signal is a finite message signal that has a beginning and an end.

The system of FIG. 1 illustrates both the encryption side and the decryption side. For encryption, what is necessary is the DC and the analog key or keys. To perform the decryption operation, all that is needed is the same DC and analog key or keys. In addition, the decryption requires the mixing operation on the encryption side to be mirrored on the decryption side. During encryption, the modulation of the DC is temporally related to the message signal such that both are initiated at a finite time relative to each other. As will be described hereinbelow, the decryption operation must also take into consideration the temporal relationship.

As to the overall operation, a message is received from an existing system and then converted to an analog signal. The now analog message is input to the encrypt block and converted to a Complex Analog Encrypted Signal with the analog key. As will be described hereinbelow, the Complex Analog Encrypted Signal is a signal that centers the message around the DC, wherein the DC has a bandwidth to accommodate the encryption operation. The Complex Analog Encrypted Signal is the encrypted message. On a wired transmission path (although wireless is anticipated as a transmission path) the Complex Analog Encrypted Signal is transmitted to a receiver associated with the decryption operation. At the decrypt block, the Complex Analog Encrypted Signal is received and the same analog key used in the decryption operation. As will be further described hereinbelow, the decryption operation requires the analog key and the encrypted message be input at the same time requiring a temporal relationship therebetween.

In addition, a method of signal modulation, termed Phase-Linked Temporal Non-Linear Modulation ("PLTNM") is introduced and described herein to enhance encrypted signal complexity and, thus, encryption strength. The implementations described herein render local and remote attacks using digital approaches ineffective—thus mitigating the ability of "bad actors" to remotely infiltrate systems and breach security and, if acquired, exploit the information contained in the analog encrypted signals. The technology herein disclosed includes an apparatus and method steps for assemblage and implementation of an analog, hardware-based, physical signal encryption approach—compared to software-based digital data encryption.

Encryption

Figure 2:
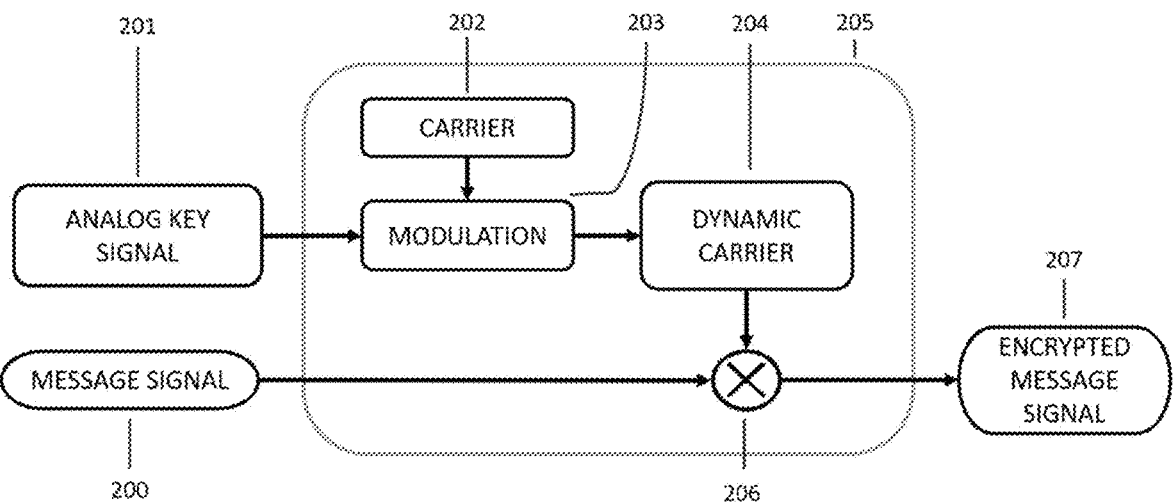
FIG. 2 illustrates a block diagram of the encryption device.

Referring now to FIG. 2, there is illustrated a block diagram of the encryption block 101, illustrating an implementation of a portion of one disclosed embodiment and describes methods and an apparatus to encrypt a message signal 102 whether analog or digital, having amplitude and phase. The message signal, if digital, is converted to a continuous time analog signal with a digital-to-analog converter or other means of analog encoding. On the decryption side, the decrypted signal will exist in the analog domain and will have to be processed through an analog-to-digital converter or other encoding means to recover the original digital message. The encryption operation operates on non-discrete continuous time analog signals.

The disclosed implementation employs a continuous "analog key" signal 201 having similar amplitude and phase. This analog key can be any analog signal, such as an audio signal in the form of a Wave file or any type of analog file existing in the baseband and in an analog domain. The analog key will have a finite length with a beginning and an end. The analog key signal 201 is used to apply, through modulation of a carrier, angle, temporal (or by other means) modulation via a modulation block 203 to a first carrier 202 in any one of several different methods. Thus, a base carrier in the form of the first carrier 202 is provided to the modulation block 203 and modulated by the analog key signal to provide or generate a second carrier signal termed a Dynamic Carrier (DC) 204. The DC needs to be at a frequency higher than the analog key signal. It can be a carrier in the MHz range or higher and even an optical carrier. The bandwidth of any channel associated with transmission of the carrier must be sufficient to capture all of the spectral energy associated with the modulation.

For explanatory purposes, one specific embodiment disclosed herein comprises the dynamic carrier to be generated by applying frequency modulation, and thus is a DFC 204, i.e., a modulated DC. In this embodiment, frequency modulation is utilized as the type of modulation. Non-trivial encryption requires an analog key that is complex in the time domain and has bandwidth to include a range of frequencies in the encryption process, which range of frequencies is within the analog domain. Pure sine waves do not provide non-trivial encryption and, although they would provide an analog signal for the purpose of modulation, a more complex analog signal is preferred.

Throughout this specification, the message signal (also known as original message signal or data signal) 200, with appropriate numbering for the figure referenced, will be used to refer to a signal, whether analog or digital in nature, that is a message, data, audio (whether digital or analog), or any type of information to be encrypted and then stored or transmitted for later decryption. However, as described above, the message signal, if digital, is converted to a signal in the analog domain. The message signal 200 is input to a mixer 206 to be mixed with the DFC to generate a primary encrypted message signal 207. The process of modulating with the modulator 203 an analog carrier 202 with the analog key signal 201 to produce a dynamic carrier, which is subsequently mixed with the message signal, is referred to as the encryption module 205 in this embodiment. This essentially amplitude modulates the already modulated DC.

In this disclosed embodiment is the generation of a carrier with dynamic variation in frequency and/or phase (or variation from any other form of modulation) content based upon an analog key signal. This variation can be, without limitation, accomplished by angle modulation, including examples such as frequency modulation, where the carrier would then be designated as a DFC, or phase modulation, where the designation could be defined as a Dynamic Phase Carrier ("DPC"), or a combination of both.

A further form of modulation herein introduced, designated temporal modulation through use of a class of circuits exhibiting Negative Group Delay (NGD), where the action of these circuits is designated as PLTNM. Other types of modulation, such as amplitude, may also be utilized by one skilled in the art. Portions of the NGD are described in U.S. Pat. No. 8,452,544, which is incorporated herein by reference in its entirety.

While there are several modulation methods disclosed herein (e.g., phase, angle, frequency, amplitude), in order to simplify subsequent explanations, this Specification utilizes as an example frequency modulation, and thus the dynamic carrier generated is referred to as a Dynamic Frequency Carrier ("DFC"). This example in no way limits the scope of the disclosed embodiment to frequency modulation exclusively. Stated otherwise, for simplicity in explanation throughout the rest of this document, DC will be utilized to represent generally a dynamic carrier without limitation as to type of modulation used to make it "dynamic." Where 'DFC' is shown within the figures, explanations, and specifications, it is therefore representative of the range of dynamic carriers. If DFC is to be indicated specifically and only DFC, that fact will be stated.

It is also understood that more than one type of modulation or operation (scaling or mixing as non-limiting examples) may be applied to the carrier 202 as well to increase the level of complexity and thereby increase the level of encryption of the signal it is later used to encrypt.

The DC is then mixed with mixer 206, in real-time, with the continuous message signal 200 using any one of several possible mixing methods including, in one disclosed embodiment, multiplication and, in another embodiment, PLTNM described later herein, to produce an encrypted continuous signal 207 with amplitude and phase containing both the analog key and message embedded therein that can be securely transmitted. Demonstration of mixing is described in the multiplication embodiment and PLTNM embodiment described herein below, and in both embodiments the message signal is mixed with a dynamic carrier. In this particular disclosed embodiment, the output of the mixer is a carrier centric signal that can be transmitted over a communication link, wired or wireless, to the receive block 105 on the decryption side. Thus, once received, the decryption operation begins, and the analog key must be initiated at the time of reception of the encrypted signal.

A complete encryption/decryption system is illustrated by the combination of FIG. 2 for encryption followed by FIG. 29 for decryption, described hereinbelow. For the operation of the encryption and decryption operation a DC must be created by modulation of a carrier by the analog key signal. The created DC is now a signal at passband or in other words centered around the carrier frequency, but with a complex spectrum due to the effect of the analog key and the modulator transfer characteristics. The same DC is required on both sides of the system.

With the DC available, referring further to FIG. 2 for encryption, when the message signal 200 is multiplied by the DC with multiplier 206, this will result in amplitude modulation of the message onto the complex DC signal. This resulting signal 207 is the encrypted message signal.

Referring back to FIG. 1, if directly transmitted or stored, the encrypted message signal 207 is represented by signal 104. FIG. 1 indicates an additional module designated 103, which may without limitation include additional amplification for power or amplitude, modulation to shift frequency ranges, filtering for bandwidth reduction, or buffering of other known conversions of the analog signal. In the case where FIG. 1 module 103 is present in a system, an encryption module 205 or of a related type as described in the present technology is then represented by module 101.

Receivers of the encrypted signal and subsequent decryption process blocks (105, 106, respectively) in FIG. 1 without the matching analog key signal are unable to reproduce the DC and, hence, are unable to successfully 'unmix' the original message signal from the encrypted signal. The decryption block 106 in FIG. 1, when supplied with the proper analog key signal and the same carrier as used in the encryption process, can reproduce the same DC used in the encryption process to 'unmix' the encrypted signal and recover the original message signal at the receiving end. This decryption process will be described hereinbelow with respect to FIG. 29 and following.

During encryption, the analog key signal is applied to the carrier 202 via the modulator 203 with a temporal relationship, as both have finite lengths. The encryption operation thus begins when both the message and the analog key signal are applied to the system of FIG. 1. As will be described hereinbelow with respect to FIG. 29, decryption requires the same operation wherein the encrypted message signal and the analog key are applied to the decryptor at the same time to begin the decryption operation.

The general summarized steps for the encryption operation are as follows:

1) Receive analog key;
2) Receive message to be encrypted:
   a. If digital then convert to the analog domain;
3) Provide a carrier;
4) Initiate encryption by inputting:
   a. Analog key to a modulator and modulate the carrier (frequency, phase, temporal or Amplitude) to provide a Dynamic Carrier (DC),
   b. Message (in analog domain) to a mixer,
   c. DC to the mixer at same time as message;
5) Output encrypted message from the mixer;
6) Transmit encrypted message to a decryptor.

Figure 29:
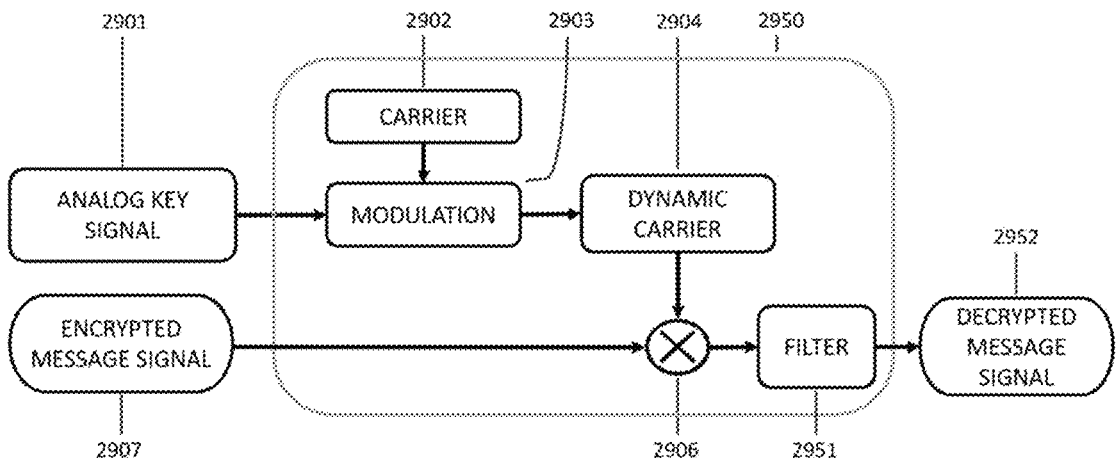
FIG. 29 illustrates the decryption system of FIG. 1 with a filter.

The steps for the decryption operation, as will be more fully described hereinbelow with respect to FIG. 29, are as follows:

1) Receive or retrieve encrypted message; Retrieve analog key;
2) Provide the same carrier used for encryption;
3) Initiate decryption by inputting:
   a. Analog key to a modulator identical to modulator used in encryption and modulate the carrier to provide a Dynamic Carrier (DC),
   b. Encrypted message to a mixer identical to the mixer used for the encryption operation,
   c. DC to the mixer at the same time as the encrypted message;
4) Filter the output of the mixer;
5) Output from the filter the decrypted message.

Once the message has been encrypted, the decryption operation requires substantially the same process to be carried out as the encryption operation, as will more fully be described hereinbelow with respect to FIG. 29 and following. However, in general, the concept is that the mixing process for encryption and decryption is identical but must utilize the substantially identical input from a DC on the decryption side to the mixing process on the decryption as was used for the encryption for value in time for the encrypted messages. Consider the analog key signal being a continuous complex analog key signal with values $AK_t$ with t representing time increments 0 to n. The unencrypted message signal would be an analog signal with values $MS_t$ wherein that the analog key signal, $AK_t$, and the message signal, $MS_t$, would both be initiated a t=0 when the encryption is initiated. The carrier in the encryption operation would have a continuous value that, once modulated by the analog key signal, would produce the dynamic carrier DC having values $DC_t$ over time. As such, for each value of t, $AK_t$, $MS_t$ and $DC_t$ would yield a value for the encrypted message, $EM_t$.

In order to decrypt the message, what is required is to provide the same mixing process employed in the encryption operation and, for each value of t in the received $EM_t$, there will be a DC generated at the decryption side with an analog key identical to the one used in the encryption process, Decryption Analog Key (DAK), and a carrier identical to the carrier used in the encryption operation, wherein using the same modulation as the encryption process, the DAK can modulate the carrier generated in the decryption operation to generated a decryption dynamic carrier (DDC) that is substantially identical to the DC generated in the encryption operation. Thus, there will exist for the encryption at a given time t a $DDC_t$ and a $DAK_t$. At, for example for a value of t=270, what must occur for decryption is that $DDC_{270}$, $DAK_{270}$ and $EM_{270}$ all line up, with $DDC_{270}$ and $EM_{270}$ being input to the same mixing process as that used in the encryption process. This will result in a decrypted message signal being output at that value of t. If there is a slight offset in time, such that the value of the encrypted message a t=270 were $EM_{275}$, that would just result in some error in the decrypted signal due to the fact the EM was generated at t=275. After conversion to a digital value, there may be a higher Bit Error Rate (BER). It can thus be recognized that generation of the same $DDC_t$ corresponding in time relative to the value of t for $EM_t$ is required, wherein initiating the decryption operation at t–0 for both the analog key signal and the encrypted message signal will result in such happening.

Methods are further disclosed herein to protect the encrypted message signal by adding additional signal encryption complexity through the mixing process and/or process of generation of the dynamic carrier (DC). This latter set of processes, that add further complexity in the generation of the dynamic carrier, are generally designated as "key protection." Key protection will ensure that the analog key signal cannot be extracted from the encrypted signal or otherwise determined by an actor that is not authorized to access the key signal.

Figure 3:
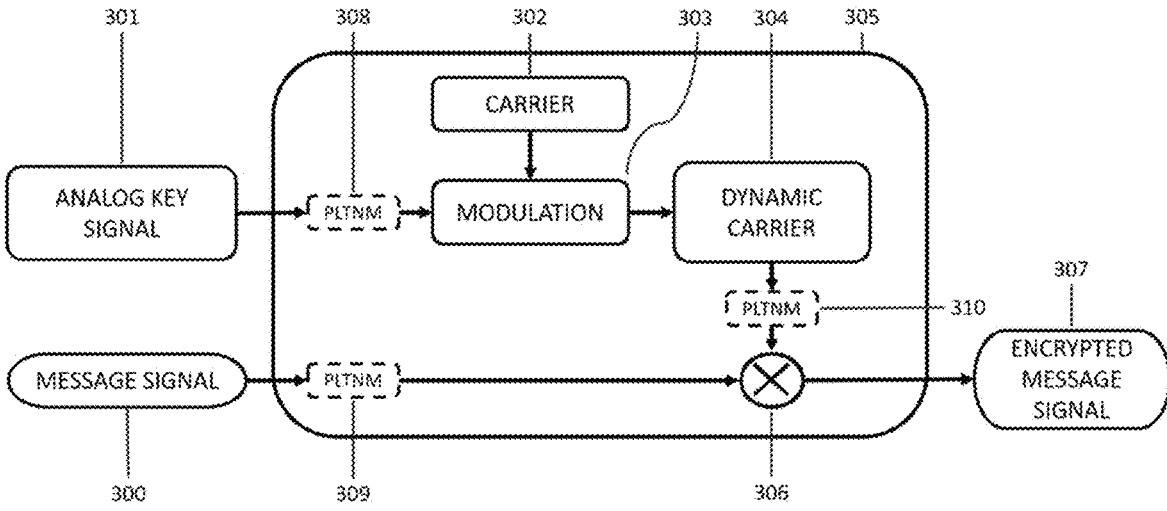
FIG. 3 illustrates a block diagram of the encryption device utilizing optional PLTNM circuits for additional security.

FIG. 3 illustrates the same encryption process depicted in FIG. 2, but additionally implementing PLTNM at various points in the process to increase encrypted signal complexity and thus encryption strength. PLTNM significantly increases encrypted signal complexity and extraction difficulty due to the $2^{nd}$-order per stage non-linear nature of this form of temporal modulation. Elements 300, 301, 302, 303, 304, 305, 306, and 307 in FIG. 3 are the same as elements 200, 201, 202, 203, 204, 205, 206 and 207 in FIG. 2. Additional elements 308, 309 and 310 are various implementations of PLTNM applied at different points in the encryption process. PLTNM applied at 308 between the analog key signal 301 and the modulation block 303 or at 310 between the DC 304 and the mixer 306 affects the dynamic carrier (DC) and must be applied correspondingly during the decryption process for message signal recovery. In addition to the elements 308, 309 (applied between the message signal 300 and the mixer 306), and 310 that may be added, PLTNM may in other embodiments also be utilized as the mixer 306. Whereas, in some specific embodiments, the mixer 306 may be, as a non-limiting example, a multiplier. The mixer 306 may also as a non-limiting example be a PLTNM circuit. This circuit implementation is demonstrated later in this document.

Where modulations are described in this disclosed embodiment, it is understood that there are several types of modulation available, including without limitation, generally, angle, including phase and frequency, amplitude, or temporal. For temporal modulation specifically, PLTNM can be utilized.

Protection of the Analog Key Signal

Inverted Key—The analog key signal is incorporated into the encrypted message signal for transmission before decryption. As the analog key signal also enables decryption of the encrypted signal, it is imperative that the analog key signal be protected. Protection of the analog key signal in the encrypted signal may be enhanced by several methods. One such method is the use of an inverted key, as illustrated in FIGS. 4 and 5.

Figure 4:
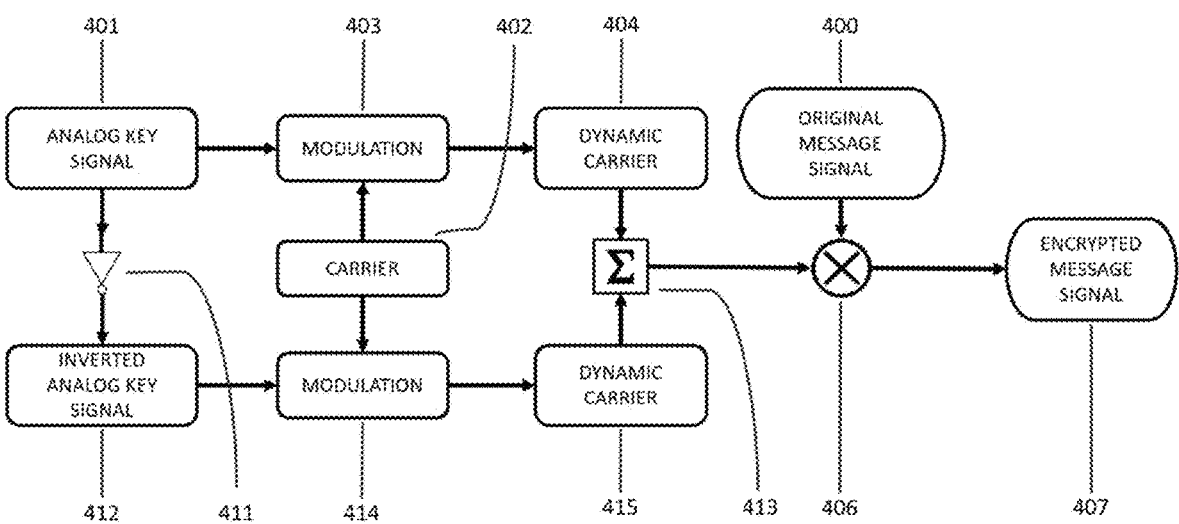
FIG. 4 illustrates a block diagram of an alternate embodiment of the encryption device with modulation of both the analog key and an inverted analog key.
Figure 5:
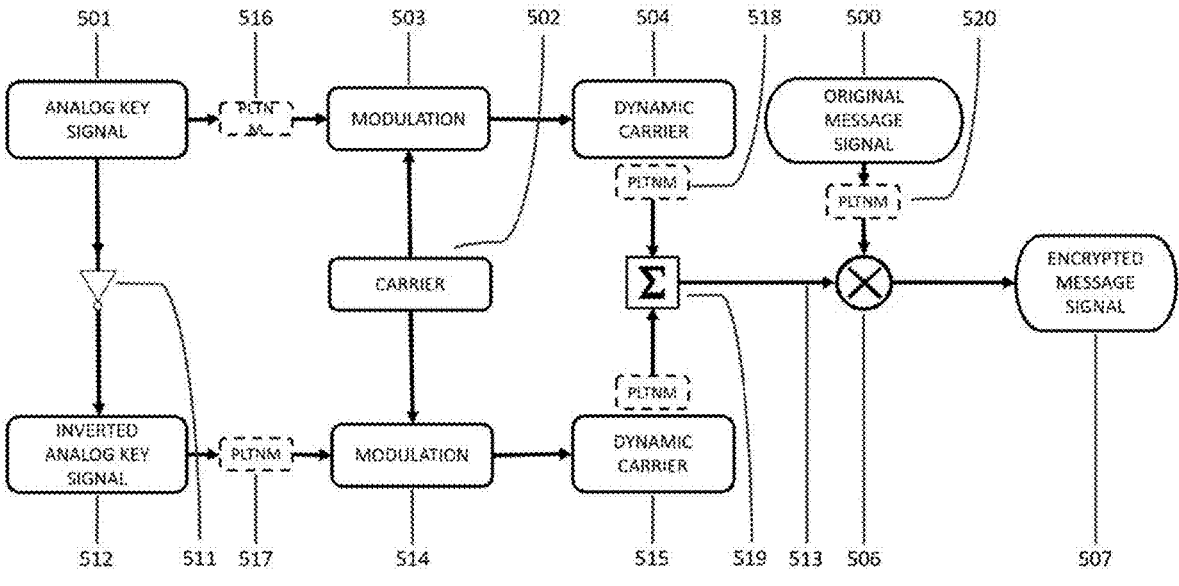
FIG. 5 illustrates a block diagram of an alternate embodiment of FIG. 4 where PLTNM circuits may optionally be added for additional complexity and security.

FIG. 4 illustrates inverted key protection without explicit implementation of PLTNM. FIG. 5 shows additional use of PLTNM. Similar to FIGS. 2 and 3, the figure elements numbered 400-407 correspond to elements 200-207 & 300-307 in the previous FIGS. 2 and 3, respectively.

The inverted key utilizes an analog key signal 401 to modulate, with a modulator 403, the carrier 402 to generate, in this embodiment, the dynamic carrier 404. Analog key signal 401 is inverted (effectively multiplied by –1) with an inverter 411 to form the inverted analog key signal 412, which modulates with a modulator 414 the carrier 402 to form an additional dynamic carrier 415. DC 414 is similar to but not identical to the second DC 415 due to the fact it is modulated with an inverted analog key signal. The modulations of the modulators 403 and 414 applied to the individual signals must be of exactly the same type and must be applied to the two signals individually before summation with a summation block 413. Any attempt to perform direct demodulation (e.g., frequency demodulation) of the encrypted signal to extract the analog key signal will result in elimination of the analog key signal due to destructive interference with the inverted key signal.

Systems that include inverted key protection, are operable to mix with a mixer 406 summed DC from a summation block 413 with the original message signal 400 to form the encrypted message signal 407.

FIG. 5 illustrates one embodiment of inverted key protection that additionally applies different implementations of PLTNM (516-520) at various points in the process to manipulate the analog key signal and/or the inverted analog key signal and/or one or more dynamic carriers (DCs), and/or the original message signal for increased encryption complexity/strength. Elements 500-515 corresponds to elements 400-415 in FIG. 4.

Figure 6:
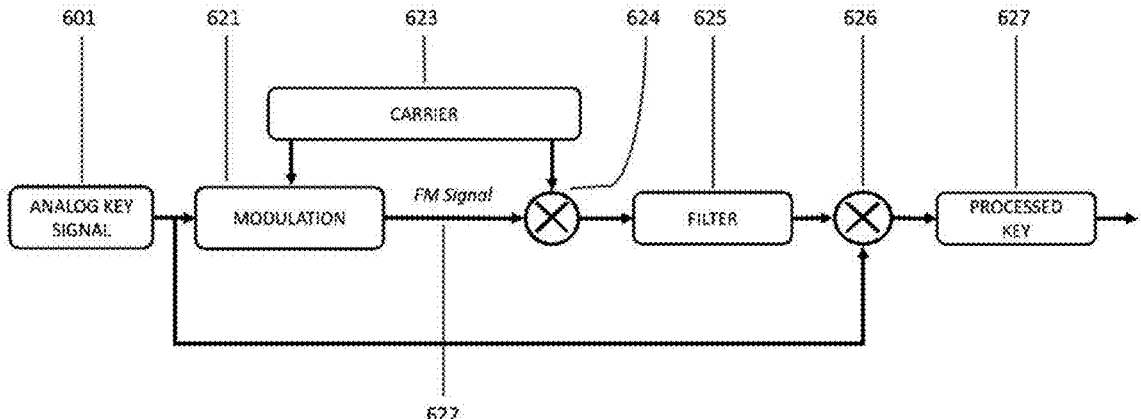
FIG. 6 illustrates a block diagram for generation of a processed key without PLTNM.

Processed Key Referring now to FIG. 6, there is illustrated a block diagram of a process to generate a processed key. Protection of the analog key signal from being extracted from the encrypted signal involves additional processing of the analog key signal. The analog key signal is used to angle or otherwise modulate a first carrier directly to form a DC (for this example, a DFC). An additional modulation step is implemented to further protect the key embedded in the DC from extraction.

FIG. 6 illustrates the generation of a processed key from an analog key. It is noted that the processed key is utilized in the generation of a dynamic carrier (DC) exactly like an unprocessed key would be but implements additional protection from extraction of the key from the DC.

The analog key signal 601 angle or otherwise modulates with a modulator 621 a first carrier 623, creating a first modulated signal 622. The first modulated signal and the first carrier are then mixed with a mixer 624, in this preferred embodiment by multiplication, filtered with a filter 625, and then again mixed with a second mixer 626 with, in this preferred embodiment by multiplication, the analog key signal 601 to produce a processed key 627. This processed key is then utilized in any of the embodiments described herein where the analog key signal 201, 301, 401, 501 is illustrated. The "double modulation" shown provides an additional layer of security against decryption by FM or related type demodulation, thus protecting against an adversary attempting to extract the key from the encrypted data stream. This type of key protection is designated as processed key protection.

In an additional embodiment, the final signal mixing uses a second analog key signal rather than the original analog key to additionally increase encrypted signal complexity/strength (not illustrated).

Figure 7:
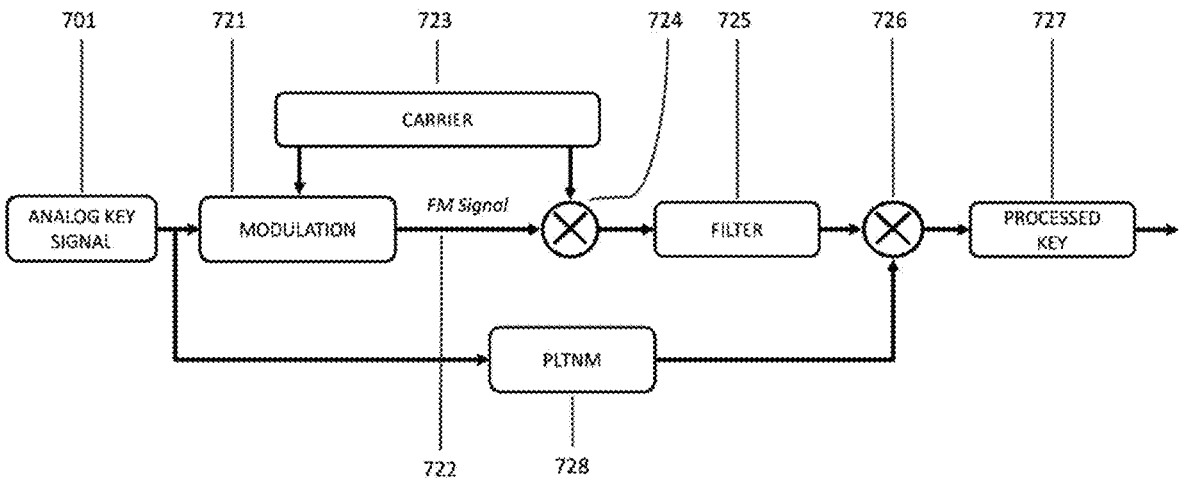
FIG. 7 illustrates a block diagram of an alternate embodiment of FIG. 6 with the addition of PLTNM.

Referring now to FIG. 7, there is illustrated a block diagram of a further embodiment of the FIG. 6 embodiment, wherein PLTNM 728 applies non-linear temporal modulation to the analog key signal 701 before the final mixing at a mixer 726 in order to provide additional security against extraction of the key and, hence, increased encryption strength. PLTNM significantly increases encrypted signal complexity and extraction difficulty due to the $2^{nd}$-order, non-linear nature of this form of temporal modulation. Elements 701 and 721-727 correspond to elements 601 and 621-627 in FIG. 6 respectively.

Described thus far is a method for modification as well as encryption of a message signal that produces intermediate signals. Those intermediate signals as listed include or are produced from modulated carriers, dynamic carriers, orthogonal mask signals, message signals, and more. Additional manipulation may be applied to primary signals to produce modified intermediate signals, or to intermediate signals themselves to increase signal complexity and increase the extent and thus strength of signal encryption.

Phase-Linked Temporal Non-linear Modulation (PLTNM)

One class of additional methods of manipulation of intermediate signals or to primary signals described herein is termed Phase-Linked Temporal Non-Linear Modulation ("PLTNM"). This modulation method can be implemented with a variable non-linearity, for example, as a second order function presenting as any of a number of signal functions, e.g., high pass, low pass, high/low with no-go in middle, band pass, band stop. The range of functions that can be produced with the PLTNM characteristic equation is described in greater detail later in this document.

Within each of these implementations, the bandwidth and frequency ranges of interest are designed to match the signal characteristics of the specific application and can further be varied throughout the analog signal encryption process. PLTNM circuits and circuit functions are characterized by negative group delay (NGD). PLTNM circuit modules may also be cascaded to produce higher order functions. Further, PLTNM can be applied at various steps (functional system processes) comprising the signal encryption process, e.g., the message signal, analog key, additional key, the DC, mask signal.

Additional Complexity—Increased Encryption Strength

Increased signal encryption complexity translates to improved encryption strength. Increased signal complexity can be achieved through the signal mixing process by use of multiple carriers, in which the signal carriers are orthogonal to one another. One channel contains the message of interest and the other contains an orthogonal mask signal. The two channels are configured such that if the identical analog key signal is used for both encryption and decryption, the additional orthogonal mask signal is eliminated and only the message of interest is retained in the decrypted message. If the analog key signal used for decryption does not match the analog key signal used for encryption, then some or all of the mask signal added by the orthogonal carrier is retained, thereby degrading readability of the received message.

Figure 8:
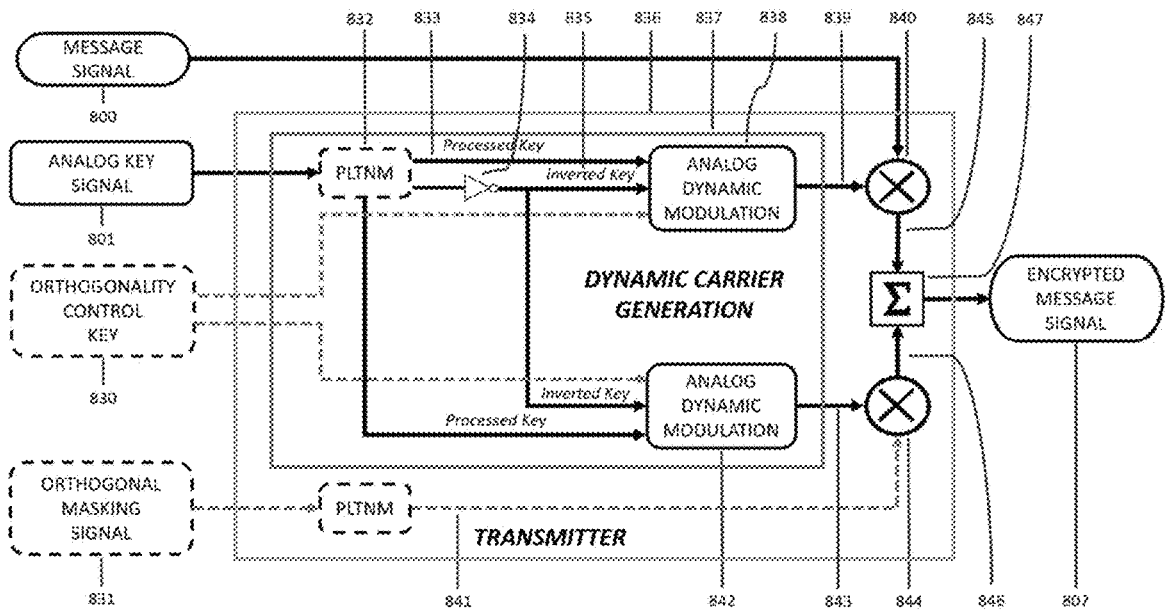
FIG. 8 illustrates a block diagram of an encryption system that includes the addition of a masking signal added via orthogonal carrier to the message signal.

Referring now to FIG. 8, the method of orthogonal carriers described above is illustrated which can be accomplished with a single key 801 and orthogonal carriers, or with an additional key 830. Orthogonal signals, in this case sinusoids with 90 degrees of separation, can be used to transmit two signals on the same frequency at the same time. Either the single key or the additional key can alternatively control an orthogonally additive signal 831 such that if the additional key does not match, the orthogonally additive signal dominates the decrypted message produced by the decryption process. The present embodiment teaches use of a key to determine if the orthogonal signal will be shown or hidden. The orthogonally added signal 831 is optionally modulated by PLTNM prior to transmission by a transmitter 841 to a mixer 844. The carrier that has undergone modulation with a modulator 842 is orthogonal to the carrier that also undergoes modulation with a modulator 138. The message signal is mixed with the modulated carrier DC 139 at 840, and the masking signal is mixed with the orthogonally modulated carrier DC 843 at a mixer 844. These two mixed signals are subsequently summed at a summation block 847 to form the encrypted message signal 807. The summation process does not affect orthogonality properties as the mixing processes are scaling processes and thus do not impact the orthogonality of the two carriers. The encrypted message signal is the mixture of the message signal modulated by one DC, and a masking signal modulated by an orthogonal DC.

FIG. 8 further illustrates the combination of several elements that have been discussed. It shows inverted key protection at an inverter 834 generating the inverted key 835, and indicates the processed key 833, though the full diagram for the processed key is not included here. The optional (dashed lines) application of PLTNM modulation is illustrated at block 832 and between 831 and 841.

Increased Encryption Strength Through Dynamic Sequencing

Figure 9:
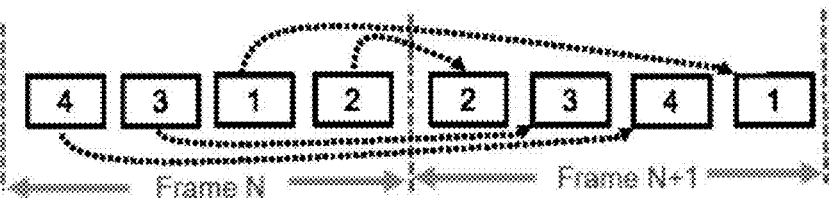
FIG. 9 illustrates a sequencing diagram for time blocks or frequency sub-bands.

Two methods, one in the time domain and one in the frequency domain, increase encryption strength through dynamic sequencing. In one embodiment addressing time domain sequencing, the message signal is broken into time blocks. Each of those time blocks is further divided into a number of time segments or blocks (in this example four (4) time blocks), as an example without limitation, illustrated in FIG. 9. If the normal ordering of the sub-blocks is 1, 2, 3, 4, it is possible to cause the sequence of the sub-blocks within a block to be rearranged to a different ordering, for example 1, 4, 2, 3.

For one skilled in the art, there are many methods to generate ordering that can be known at both the encryption block and decryption block by users who have access to appropriate codes and knowledge. However, the ordering is difficult to decode for anyone not skilled in the art without the requisite codes and knowledge. This re-ordering of sub-blocks within a block for sequential blocks of a message to be transmitted is time domain sequencing. Use of PLTNM circuits can 1) shift data blocks into time spaces considered to be in a different sub-block is one method of utilization and/or 2) apply non-linear modulation to the signal segment. If each block is shifted (in time) in the encryption device instead of a full integer amount of time shift and/or modulated non-linearly, using PLTNM, the identical decoding would be performed on the decryption device.

Further embodiments to be described more fully herein (see FIG. 27) apply multiple channels in parallel and/or in series where dynamic sequencing is applied. The disclosed embodiment enables yet more complex encryption and decryption of multiple parallel signal time-domain segments or frequency-domain sub-bands to be transmitted, or single signals to be transmitted that may be split into multiple parallel streams for transmission. For these multiple channels where multiple instances of PLTNM or other circuits may be utilized for encryption, circuits and parameters of circuits may either be the same for each channel and circuit or may be different, yielding a substantial combinatorial set of possibilities for encryption.

Frequency domain sequencing is analogous to time domain sequencing, but where a block of the message signal is transformed into the frequency domain, and frequency slices of the spectrum are taken and re-sequenced. The term dynamic is used in front of either time domain sequencing or frequency domain sequencing if the sequence is dynamically changed, as noted in the description for time sequencing above by applying PLTNM to effect phase (time)-shift and/or non-linear modulation. (See also FIGS. 9 and 10). As was noted above, for time domain and frequency domain sequencing, temporal segments (or blocks) and/or frequency sub-bands can be applied across multiple parallel or parallel/serial channels with like or unique parameters and sequences. Further embodiments will be described in more detail below.

Use of PLTNM to introduce temporal and phase changes as well as other modulations results in a broadened and flattened power spectrum in order to increase encryption strength when performing frequency sequencing, dynamic frequency sequencing, or time domain sequencing including dynamic time domain sequencing.

For both time domain sequencing and frequency domain sequencing, it is possible to add additional "masking" sub-blocks with time domain or frequency content intended to confuse those attempting to gain unauthorized access to the signals. This is particularly helpful in frequency domain sequencing when the message signal has characteristic frequency content.

Utilization of The Present Disclosed Embodiment for Digital Signals

Application of the present technology to digital signals has been mentioned previously but bears elaboration as there are multiple methods for application. Digital signals are encoded for transmission using such methods as phase-shift keying (PSK) modulation, frequency shift keying (FSK) modulation, or Quadrature Amplitude Modulation (QAM) to name just a few of the several available methods, to produce analog signals. The technology here disclosed can be applied just as it would be for any other analog signal.

Digital-to-digital encoding of the "1's" and "0's" is generally in one of three types of encoding: Unipolar, Polar and Bipolar.

Figure 11:
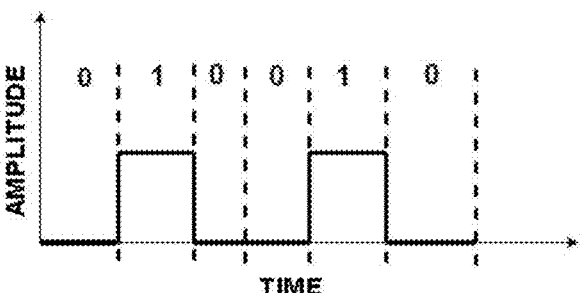
FIG. 11 illustrates diagrammatically unipolar encoding of a digital sequence.

In Unipolar encoding, '1' is represented by a high voltage and '0' is represented by zero voltage (FIG. 11).

Figure 12:
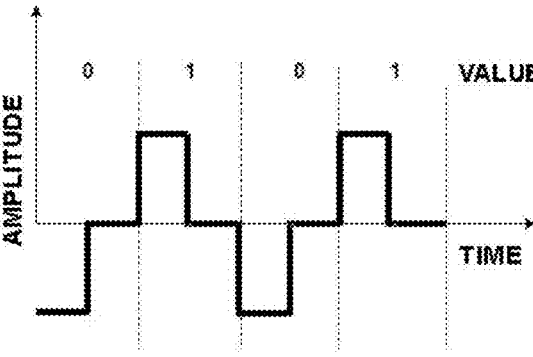
FIG. 12 illustrates diagrammatically bipolar encoding of a digital sequence.
Figure 13:
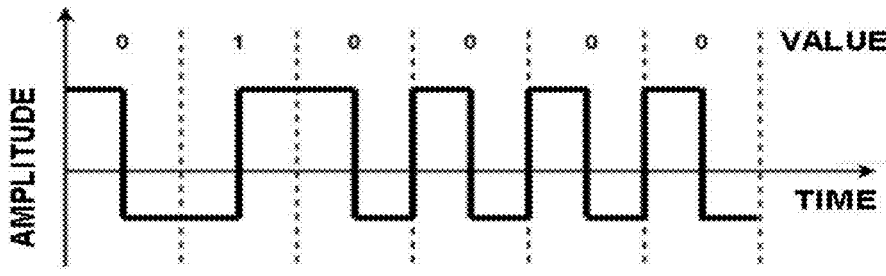
FIG. 13 illustrates diagrammatically bipolar Manchester encoding.

Polar encoding uses two voltage levels: one is positive, and another is negative. While there are some variations, FIGS. 12 and 13 illustrate two Polar encoding methods.

Bipolar encoding uses three voltage levels: positive, negative, and zero. The zero level represents binary 0, and binary 1 is represented by alternating positive and negative voltages.

Analog encryption can be applied to each of these digital encoding schemes, either by processing the data stream as an analog signal, or through conversion by application of an appropriate front and back end for the system. More complex parallel data streams could undergo digital to analog (D/A) conversion on the front end (prior to analog encryption) and analog to digital (A/D) conversion on the back end (following analog decryption), thereby enabling analog encryption for the transmission of parallel data streams. Such analog encryption application to parallel data streams requires consideration to data rates and bandwidth.

PLTNM Application to Digital Signals

An embodiment of the present technology is application to digital signals that are characterized by sequences of 1's and 0's to scramble the ordering of the 1's and 0's.

A first further embodiment utilizes temporal modulation of the signal with PLTNM to temporally shift the order of occurrence of the bits representing the 1's relative to those representing the 0's in the data stream. The encryption block and decryption block both utilize the same two PLTNM methods (one for the "1's" and another for the "0's"), and the encryption in the encryption block is essentially reversed or undone in the decryption block utilizing the same key.

A second further embodiment utilizes temporal modulation of phase encoded bit streams. Phase modulation of digital data is a popular and standardized methodology of encoding data for transmission, and modulation using one or more keys and PLTNM for temporal modulation results in encryption of the signal. As the same analog key signal is used for encryption and decryption, the encryption that occurs in the encryption block and/or for storage is essentially reversed or undone during decryption.

In a third further embodiment, as noted above, the digital data stream encodes the 1's and 0's at two different voltage levels representing the data bits. This signal is treated, for the purpose of encryption, like any other analog waveform. The incoming waveform shifts between one voltage level and the other and remains for the designated time period to encode one or more 1's or 0's (bits). Encryption is performed just as with any other analog waveform employing one or a combination of the analog modulation and protection methods described previously.

Figure 14:
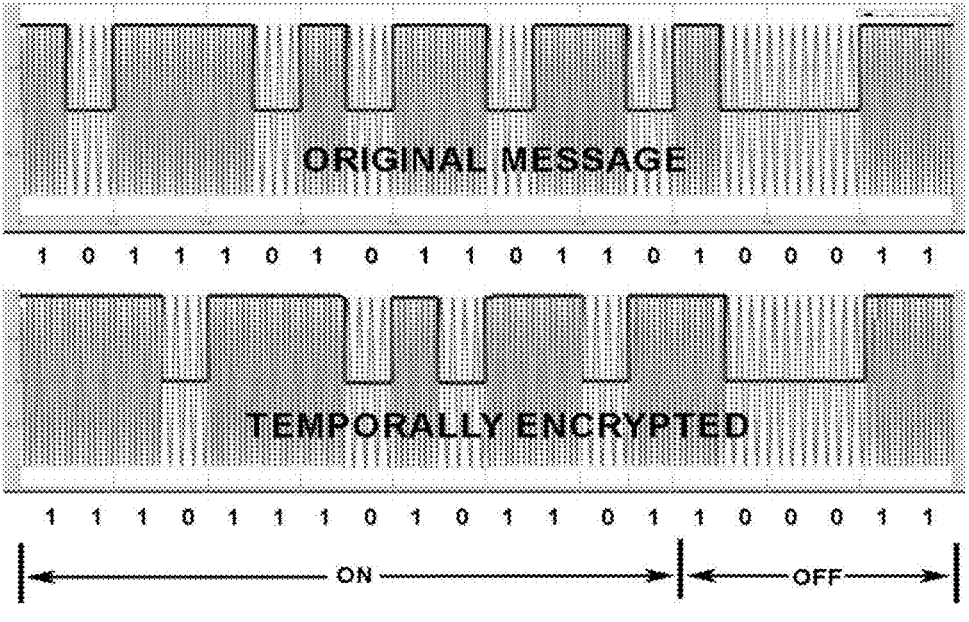
FIG. 14 illustrates digital signal encoding using frequency shift keying with a net temporal shift caused by temporal modulation.

A fourth further embodiment, as noted above, applies to the case in which the data stream is represented in a continuous analog waveform by two different frequencies (both in the analog domain), each representing the 1's or 0's. The incoming waveform shifts between one frequency and the other, again remaining at either frequency for the required time period to represent one of more bits (FIG. 14). The analog waveform is encrypted just as any other analog waveform and may be treated like any other analog waveform.

A fifth further embodiment as noted above involves conversion by a digital to analog converter on the front end, after which the analog signal is encrypted for storage or transmission. Subsequent decryption would then be followed by conversion back to a digital signal by an analog to digital converter.

Pulse Position Modulation

Pulse position modulation is the encoding of a signal so that the total time for any number to be represented is constant, but the location of a pulse within that time determines the value. For example, a signal that has four values can have a pulse in any of four positions. Variations on this modulation scheme are possible.

As stated, PLTNM can be applied to any one or more of the following: message signal 200, analog key 201, orthogonal masking signal 831, or other key or message signals. Application of PLTNM is particularly effective when the signal is encoded using pulse position modulation. PLTNM can then be used to shift the pulse position based on a modulating control signal and according to a modulating control waveform. PLTNM can be configured so that the shape of the pulse is minimally affected by appropriate selection of component values. For example, the PLTNM modulating signal can cause the message or any other signal pulse to be shifted (in time) to a location other than its original location. Application of the matching modulating signal at both the encryption block and decryption block ensures decoding of the encoded pulse.

Analog Encrypted File Storage

An application of the disclosed embodiment is encryption of either signals of originally analog or digital nature into an analog form for storage in an efficient and secure manner. Once encrypted, the encrypted and now analog signal is either sampled and converted to a digital format that retains its encryption, which is stored on any known available means for storage of digital signals, or if kept as an analog signal, is stored directly on media intended for analog signals.

An aspect of the disclosed embodiment is efficient encryption of digital signals for analog encrypted storage, as encrypted signals may be stored and later transmitted for decryption or decrypted for subsequent use at the original location of encryption. If the stored analog data is acquired by an unauthorized party, use of the actual data still requires analog decryption. As such, acquired datasets remain secure.

Phase-Linked Temporal Non-Linear Modulation

The use of PLTNM has been included in the description of the disclosed embodiment. PLTNM employs a class of circuits that generally exhibit Negative Group Delay (NGD) over specific frequency ranges to perform both linear and non-linear temporal modulation of an analog signal (e.g., frequency carrier, data signal, masking signal, analog key).

In NGD, there is a portion of the characteristic frequency response of a circuit or system where the slope of the phase is positive relative to a change in frequency. Under these conditions, band limited signals applied to the circuit exhibit a negative group delay. As such, the output wave envelope can lead the input. Causality is not violated, but rather early signal perturbations are amplified and detected at the output. Within the frequency range(s) in which the slope of the change in phase is positive, the group delay is negative, i.e., the output signal (Vo) is advanced in time relative to the input signal (Vi).

Figure 15A:
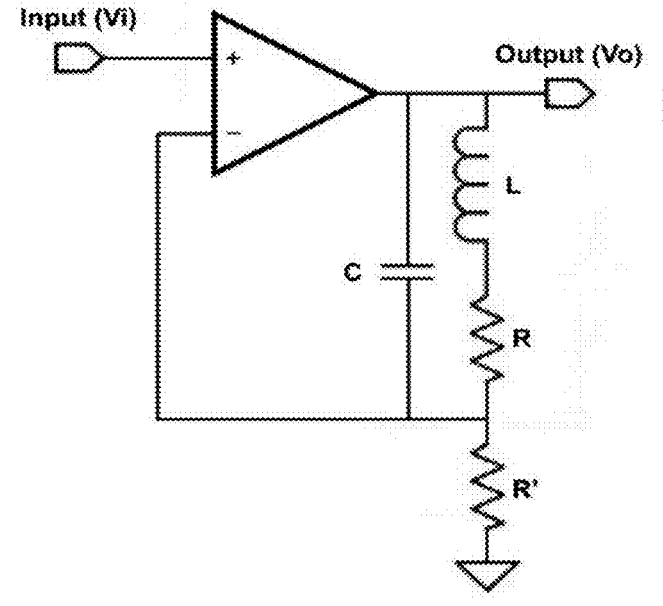
FIG. 15A illustrates a circuit diagram for a single resonant-circuit non-inverting NGD circuit.
Figure 15B:
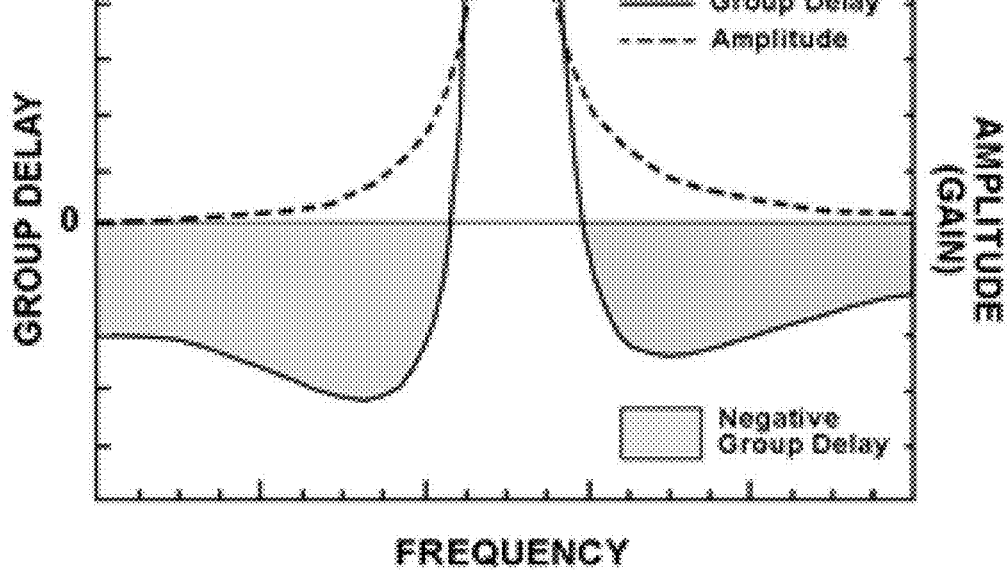
FIG. 15B illustrates the amplitude response and group delay vs. frequency plot for the single resonant-circuit non-inverting NGD circuit of FIG. 15A.

Referring now to FIG. 15A, there is illustrated a simple, single stage NGD circuit example and in FIG. 15B the associated amplitude and negative group delay response (vs. frequency) that illustrate the non-linear relationship between the phase and frequency. This illustration depicts the response of the single-stage PLTNM circuit configuration that demonstrates resonance at a single frequency and NGD both above and below the resonant frequency (or pole).

Figures 16A, 16B:
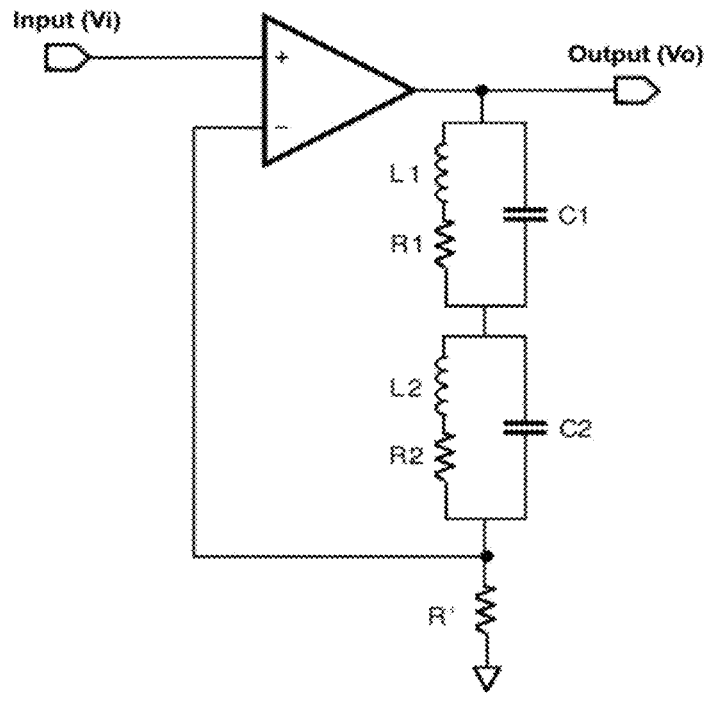
FIG. 16A illustrates a circuit diagram for a non-inverting amplifier configuration.
FIG. 16B illustrates the resulting amplitude response and group delay vs frequency plot for the non-inverting amplifier configuration of FIG. 16A.

FIG. 16A depicts an NGD circuit implementation that produces two resonant frequencies (poles) in a single-stage NGD circuit. This circuit configuration yields multiple (three) frequency ranges or sub-bands in which the resulting negative group delay varies in each of the three different frequency bands.

In this configuration, the resonant frequencies (or poles) are separated and distinct within the frequency range shown in FIG. 16B. In addition, there are frequency ranges that demonstrate NGD before, between, and after the two poles. The NGD imparted by the circuit is different in each of the three frequency ranges—lower than the $1^{st}$ pole, between the poles and greater than the $2^{nd}$ pole. Further, the NGD within each region is non-linear and the gain is zero or positive, thereby enhancing the utility.

It is noted that, for circuit stability, the frequency content of the analog signal being modulated should not have content at or near the frequencies associated with the poles (or resonances).

Figure 17:
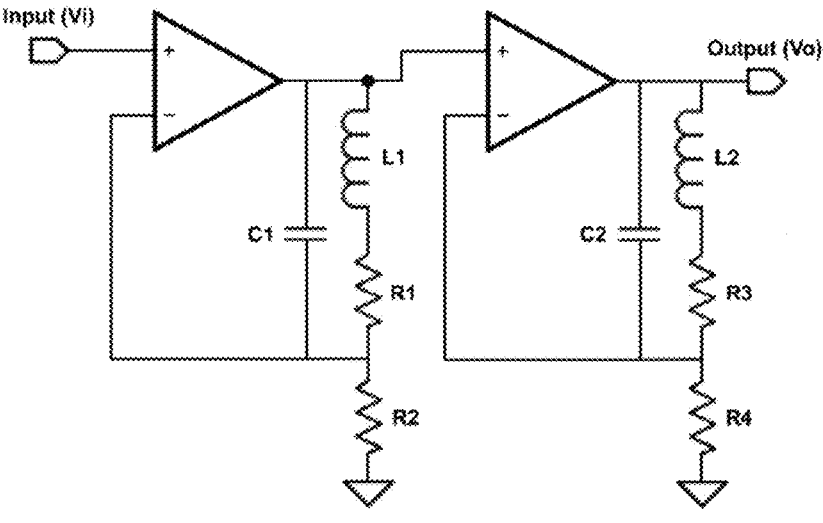
FIG. 17 illustrates a circuit diagram for two cascaded non-inverting resonant-circuit NGD filter circuit stages.

Referring now to FIG. 17, there is depicted a two-stage NGD circuit that also produces two resonant frequencies (poles). The form of the transfer function for NGD circuits under consideration is generally as shown below, and there are several frequency response characteristics that can result. These will be discussed below.

The transfer function for the circuit schematics illustrated in FIG. 17 is expressed as:

$$T(\omega) = \left[1 + \left(\frac{1}{R_2}\right)\left(\frac{1}{(R_1 - i\omega L_1)^{-1} - i\omega C_1}\right)\right] \times$$

$$\left[1 + \left(\frac{1}{R_4}\right)\left(\frac{1}{(R_3 - i\omega L_2)^{-1} - i\omega C_2}\right)\right]$$

Equation 1

The associated phase is given by:

$$\psi(\omega) = \arg[T(\omega)]$$

Equation 2

One skilled in the art can write the above equation as a transfer function for the two-stage NGD circuit using the Laplace Transform. This equation in the "s" domain is second order in both the numerator and the denominator.

The distinction between this implementation and the two-pole response depicted in FIG. 17 that is designed to produce the NGD phase response can be made linear over a specific frequency range—in this case, for frequencies that are lower than the first pole. As such, the imparted NGD is constant over the same frequency band is shown in FIGS. 18A, 18B, and 18C.

Figure 18A:
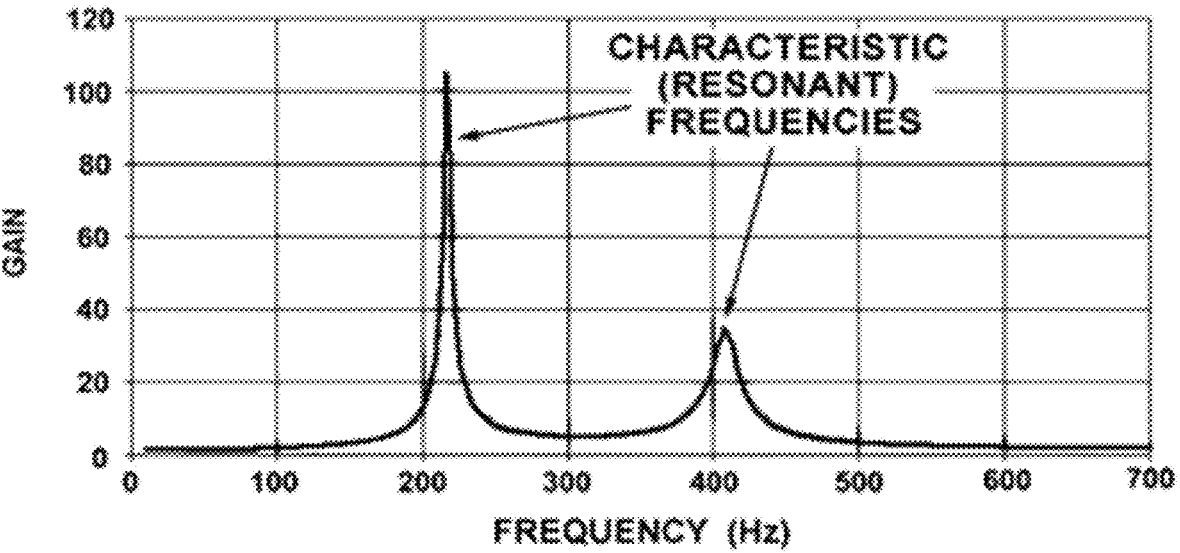
FIGS. 18A, 18B and 18C illustrate plots of gain, phase, and group delay vs frequency, respectively, for a two-stage NGD circuit illustrated in FIG. 17.
Figure 18B:
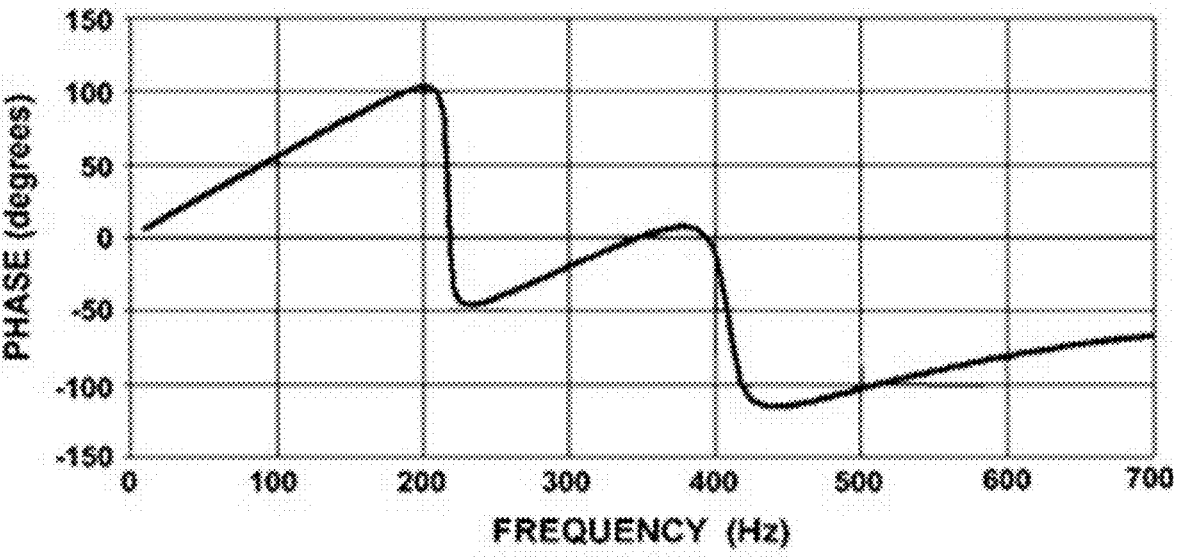
Figure 18C:
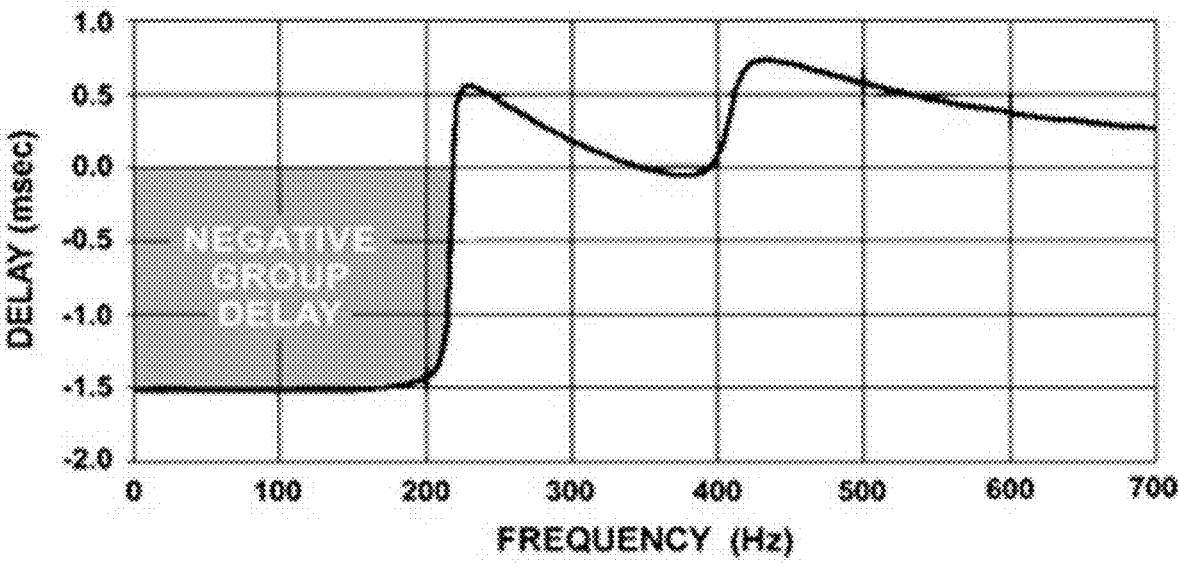

FIG. 18A illustrates the Gain or amplitude response, FIG. 18B illustrates the phase change over frequency, and FIG. 18C illustrates the Group Delay (change in phase per change in frequency) for this particular embodiment of a two-stage PLTNM circuit. This circuit configuration can be used to impart NGD that, within the lower frequency range (frequencies less than the frequency associated with first pole), the NGD is constant. The linear change in phase produces a constant negative group delay or positive group advance.

Two poles and two zeroes (Bode Plot) are characteristic of a two-stage NGD circuit, with some poles approaching the right half plane. For the discussion below, of primary interest is the poles (frequencies at which the circuit resonates) or the roots of the denominator.

Figure 19A:
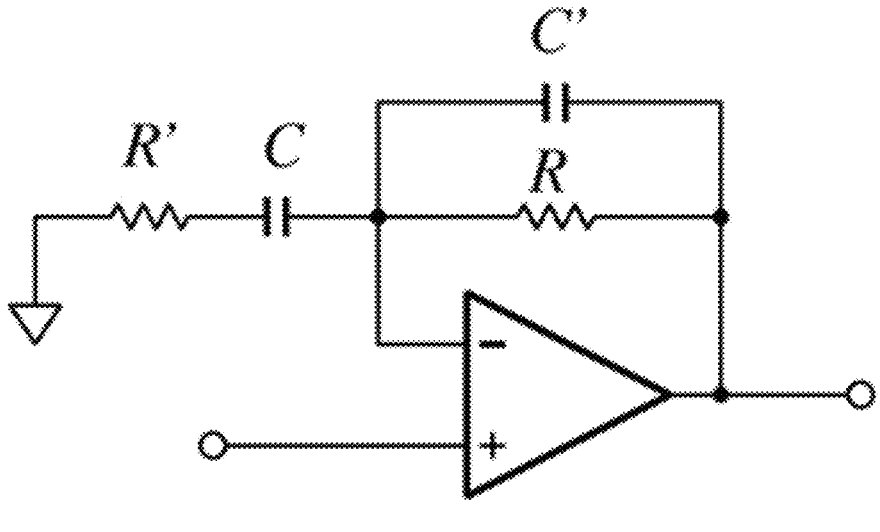
FIG. 19A illustrates an NGD circuit topology employing resistance and capacitance, but not inductance.
Figure 19B:
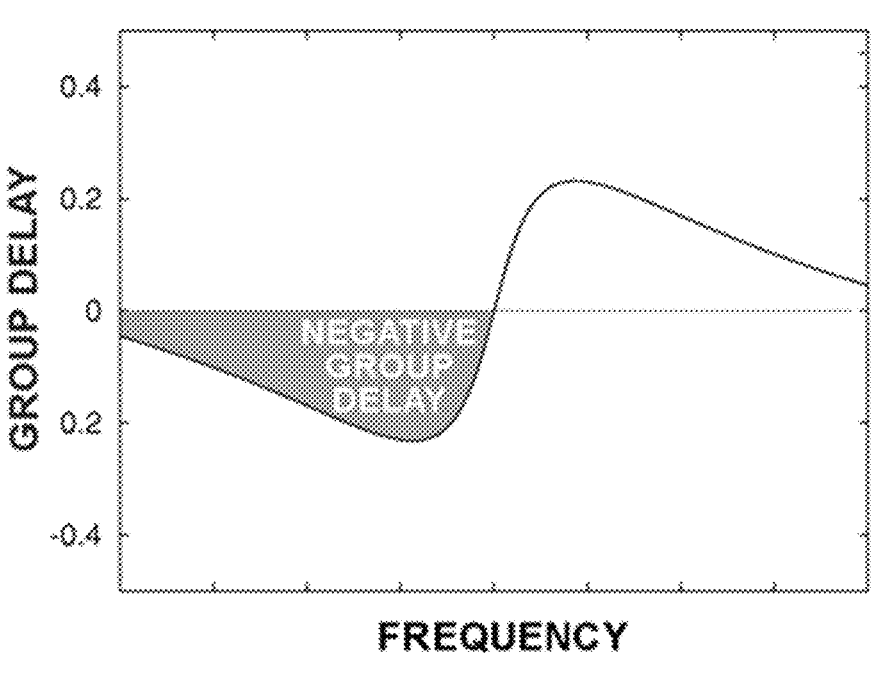
FIG. 19B illustrates a graph illustrating output signal group delay versus frequency in a range both above and below the circuit resonant frequency for the circuit of FIG. 19A.

FIG. 19B illustrates the negative group delay results for another NGD circuit topology employing resistance and capacitance shown in FIG. 19A, but not inductance in which NGD occurs in the frequency band adjacent to, but lower than, the frequency at which the circuit resonates. This example (FIG. 19A) is representative of a range of NGD circuit topologies that are possible but not illustrated.

The above descriptions of PLTNM illustrate the means to apply non-linear temporal modulation to analog signals, where the values of the various circuit components are varied according to a modulation scheme. Non-linear temporal modulation applied in conjunction with traditional forms of modulation (e.g., frequency, phase, angle, etc.) provide a novel means to encrypt any analog signal, whether the signal undergoing PLTNM represents data or the message, a carrier wave, an analog encryption key, and masking signal or any other analog waveform.

One example of the instant invention using PLTNM employs frequency shift keying (FSK) to represent a digital signal where either the digital "0" or "1" is represented by a frequency less than the frequency of the lower frequency pole and the other is represented by a frequency greater than the frequency represented by the higher frequency pole. By doing so, the relative positions, in time, of the "1's" can be varied relative to the positions of the "0's". In the alternative, one could utilize NGD frequency ranges that are less than or greater than the resonant frequency (or pole) to represent and temporally shift the "1's" relative to the "0's".

Modulation

FIGS. 15A/B-19A/B illustrate NGD characteristics of various configurations of PLTNM circuits. Each of these can be implemented as a PLTNM circuit by manipulation of circuit components either directly or through an analog key acting on a carrier. Within the disclosed system, PLTNM can be utilized for the linear and/or non-linear temporal shift and/or modulation of the original message signal, analog key signals, orthogonal key (masking) signals, carrier orthogonality control signals and/or encrypted signals as well as additional signals.

The characteristics of the temporal modulation (frequency, phase, group delay) can be manipulated by:

1) varying one or more circuit component values,
2) the control, introduction, or removal of one or more cascaded PLTNM circuit stages, or
3) integrating controlled variation of both the circuit components comprising one or more of the cascaded PLTNM circuit stages in conjunction with controlled addition/elimination of various circuit stages comprising the cascade.

PLTNM Example

Figure 20:
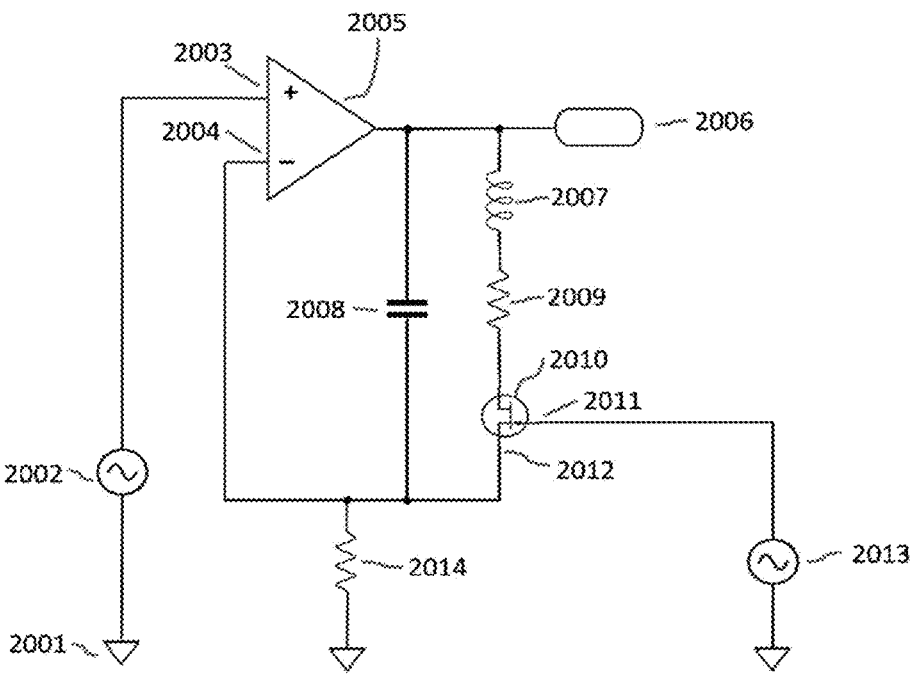
FIG. 20 illustrates a circuit diagram of a non-inverting op-amp filter used for encryption.
Figure 21:
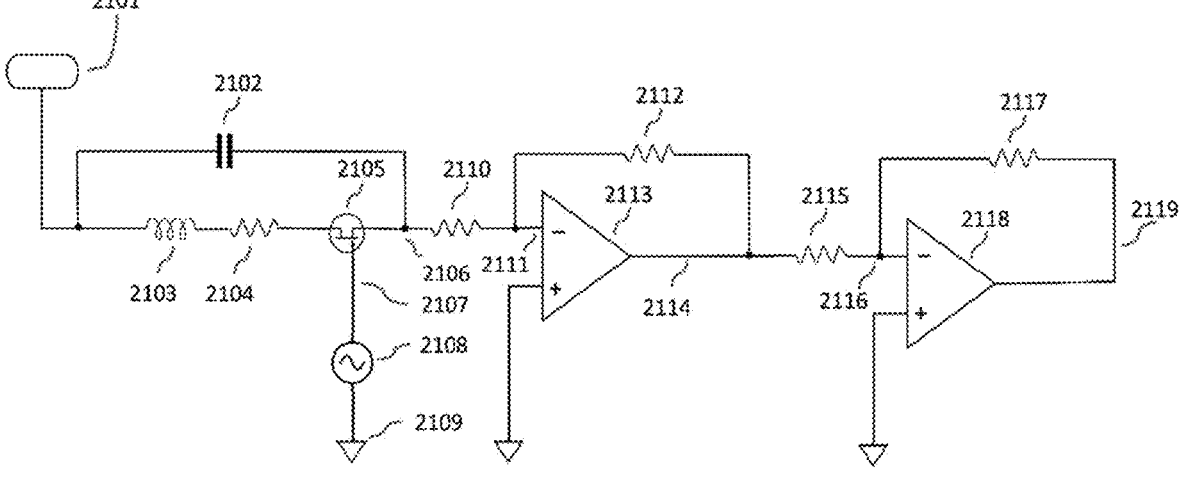
FIG. 21 illustrates the inverse circuit of FIG. 20 used for decryption.

FIGS. 20 and 21 depict simplified examples of a PLTNM (encryption) circuit and the inverse function (decryption) applied to a single message (data) signal and a single analog key signal. At the center of the PLTNM process are specific configurations of NGD circuits (see examples—FIGS. 15A, 16A and 17).

In FIG. 20 (encryption circuit), the message signal 2002 to be encrypted is applied relative to a circuit ground 2001 to the positive input 2003 of the operational amplifier (op-amp) 2005. The op-amp output signal 2006 is the encrypted message signal, connected also to a resonant circuit comprising inductor 2007, capacitor 2008, and a combined resistor 2009 and FET (Field Effect Transistor) 2010 operating as a variable resistor. The impedance of the FET 2010 is determined by the voltage between the FET gate voltage 2011 and FET source voltage 2012 driven by a component of voltage source 2013. The inductor 2007, capacitor 2008, resistor 2009, and FET 2010 form a resonant circuit in the feedback loop connected to the inverting input of the op-amp 2005. This resonant circuit is an important part of the NGD configuration. In addition, resistor 2014 is connected between the op-amp 2005 inverting input 2004 and circuit ground. Thus, the circuit is a non-inverting amplifier configuration. Signal source 2013 is a DC applied to the gate of the FET 2010, thus modifying the resonant frequency of the resonant circuit. As noted previously, this DC signal (or an associated circuit known to those practiced in the art) also provides bias for the FET 2010. This results in non-linear temporal modulation of the message signal 2002 and, thereby, generates the encrypted message 2006.

FIG. 21 depicts a simplified circuit that functions to invert or reverse the modulations performed by the circuit shown in FIG. 20 and, thus, "decrypt" the encrypted signal. (Decryption will be discussed in more detail hereinbelow with respect to FIG. 29 and following.) Input signal 2101 is the encrypted message signal (additional circuitry performing amplification and detection not shown) and may be required depending on the system in which the instant invention is implemented. This encrypted signal could, in theory, be the encrypted output signal 2006 from FIG. 20. However, in a number of practical applications, intervening amplifiers or other circuit elements may be present. The signal may also have been a stored digital signal that had been previously encrypted. Inductor 2103, capacitor 2102, and resistor 2104 produce a resonant circuit whose parameters are modified by FET 2105 operating as a variable resistor. The impedance of the variable resistance of 2105 (between resistor 2104 and node 2106) is determined by gate voltage 2107 driven by source 2108. In order to decrypt and thus recover the original message signal, the DC applied to the source 2108 must be identical to the DC used to encrypt the signal, indicated as 2013 in FIG. 20. These two DC sources may vary significantly with regard to signal complexity and may be derived from any type of source that produces a continuous analog signal.

For optimal decryption, impedance 2110 matches impedance 2014 of FIG. 20, and the various resonant circuit impedances of FIG. 21 match the resonant circuit impedances of FIG. 20. The virtual ground node at 2111 allows resistor 2112 to be chosen to match 2110 without affecting the signal, and the final inverting amplifier 2118 with resistors 2115 and 2117 invert the signal at 2114, resulting in the decrypted signal at 2119 having the same polarity as the original unencrypted signal. The final amplifier serves no decryption function.

Figure 22:
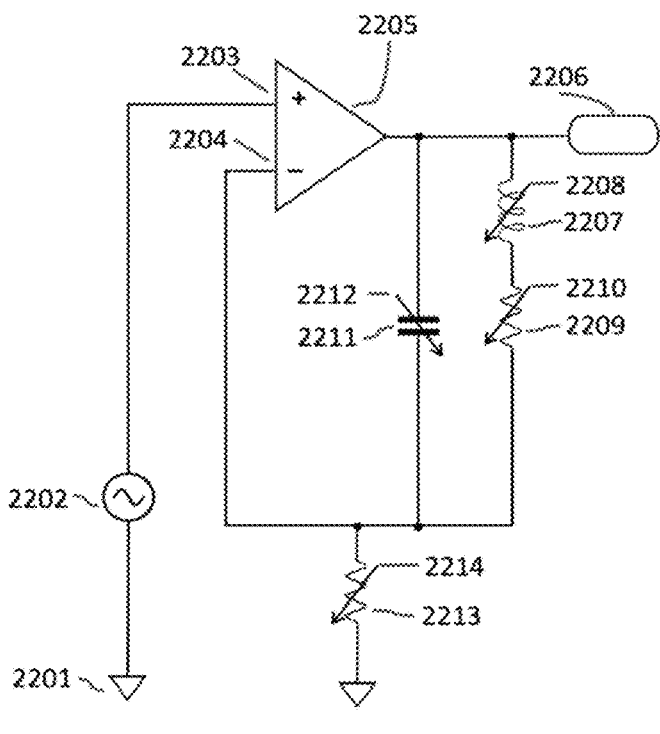
FIG. 22 illustrates a circuit diagram of a non-inverting op-amp filter used for encryption with single resonant circuit in the feedback loop where all elements of the resonant circuit and the gain resistor to ground are indicated as variable elements.
Figure 23:
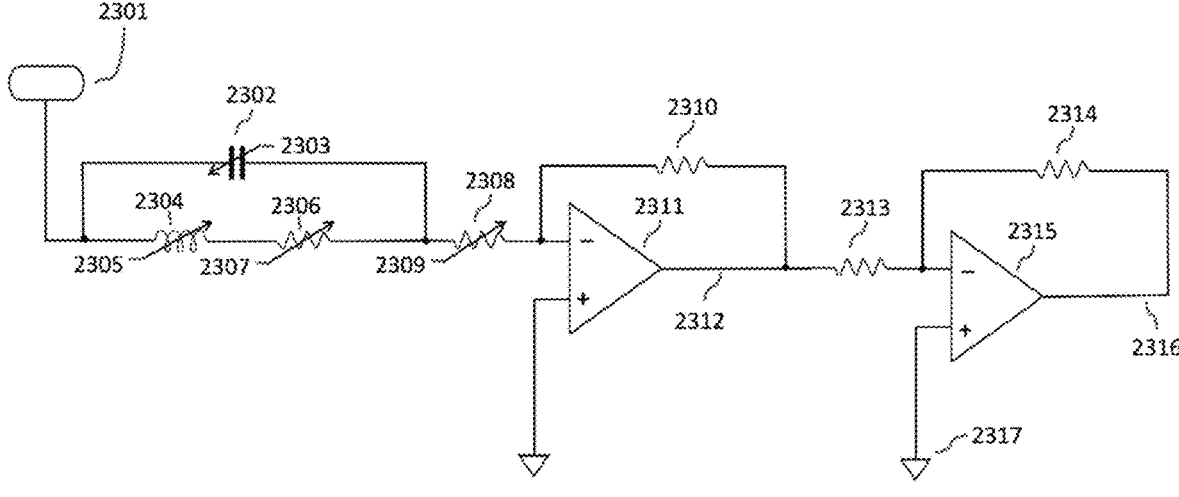
FIG. 23 shows the equivalent circuit topology of the circuit of FIG. 21 in which all elements of the resonant circuit and the gain resistor to ground are indicated as variable elements.

FIGS. 20 and 21 are an instant embodiment of an encryption/decryption method utilizing a PLTNM circuit configuration. In the configuration of FIGS. 20 and 21, the resonant feedback circuit resistance is varied by means of a series FET, and this resistance alone is modified, thus modifying the resonant frequency of the circuit. This change has a particular effect on the characteristic or transfer equation for the system, and on the system itself as a method of encryption and decryption. This configuration can also be generalized as shown in FIGS. 22 and 23 where additional components are also variable. Varying the resonant circuit capacitor, inductor, series resistor, as well as the feedback circuit resistance to ground, provides the ability of one skilled in the art to adjust and variably control the transfer function of the negative feedback circuit throughout the encryption process and, thus, the encrypted signal characteristics.

FIG. 22 illustrates a circuit for encryption of a signal using PLTNM whereby one or more of the circuit component values may be varied. As with FIG. 20, the input message signal 2202 is applied to the non-inverting input 2203 of the amplifier 2205 where a resonant circuit in a non-inverting feedback configuration is fed back from the amplifier output (i.e., the encrypted output of the encryption device 2206) to the amplifier negative input 2204 and circuit ground through 2213.

Inductor 2207 is a variable component that can be varied by a signal applied to input 2208. This signal may be an analog key, a modulating carrier, or other suitable signal.

Resistor 2209 is a variable component that can be varied by a signal applied to input 2210. This signal may also be an analog key, a modulating carrier, or other suitable signal.

Variable capacitor 2211 is a variable component that can be varied by a signal applied to input 2212. This signal may also be an analog key, a modulating carrier, or other suitable signal.

Resistor 2213 is a variable component that can be varied by a signal applied to input 2214. This signal may also be an analog key, a modulating carrier, or other suitable signal.

FIG. 23 depicts the schematic for the decryption circuit that inverts or reverses the function of the circuit of FIG. 22.

When properly configured, variations in component values applied dynamically to a signal arriving at 2202 result in an encrypted signal at 2206. Further, by synchronizing the timing and control of variations in these components during the continuous analog signal encryption and transmission process and providing the control timing/synchronization information for decryption, the non-linear temporal modulation can be varied over time-significantly increasing encrypted signal complexity/strength.

FIG. 23 is the circuit implementation that decrypts the signal generated by the circuit embodied in FIG. 22. The component manipulation performed during encryption must be performed in exactly the same order and timing synchronized with the encrypted message signal during decryption.

The encrypted message signal 2301 is applied to the resonant circuit. Resistor 2308 is shown as variable with control 2309 corresponding to the value and variation of the variable component 2213 in FIG. 22. Components 2304 (inductor), 2302 (capacitor), and 2306 (resistor) form a resonant circuit that correspond to the resonant circuit in FIG. 22 comprised of inductor 2207, capacitor 2211, and resistor 2209. In FIGS. 23 and 21, an inverting amplifier is placed at the end of the decryption circuit so that the phase of the decrypted message signal matches the original message signal.

FIGS. 22 and 23 depict a more generalized version of the encryption/decryption circuit/system than the particular embodiment shown in FIGS. 21 and 22 in order to provide clarity. Further generalization and expansion with respect to encryption control is illustrated by the process diagram provided in FIG. 24.

In this embodiment, the unencrypted message signal 2402 is applied to the NGD circuit to produce an encrypted message signal 2406. Any one key or a plurality of analog control signals may be used to control the parameters of the encryption, in this example, showing four (4) keys designated as 2409, 2412, 2415, and 2418. Note that any one or more Key/Control/Variable Component combinations can be varied during encryption/decryption or can remain fixed during the course of an encryption/decryption run.

Control signals may be identical or completely different from one another, or some may match and some may be different. These control signals can control any number of controllable components, however, in this example, four (4) designated 2408, 2411, 2414, and 2417. Each of the control elements is one of the variable components of FIG. 22, but where additional complexity can be added at the user's discretion. Each control element may be a complex circuit on its own, directed by the key signal and providing additional complexity to encryption of the message signal due to variation of the resonant feedback circuit component values.

Figure 24:
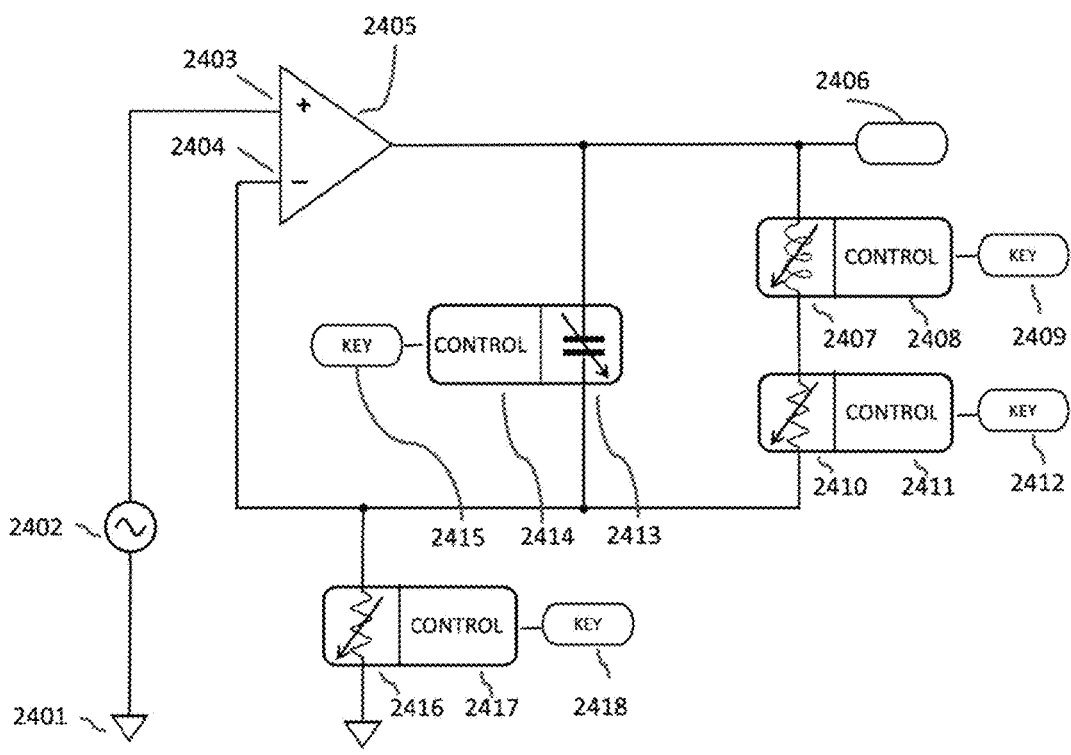
FIG. 24 illustrates the circuit diagram of FIG. 22 with generalized control elements for a plurality of controllable components.

FIG. 22 has a variable inductor. In the case of FIG. 24, the combination of 2407 and 2408 might as a non-limiting example be a gyrator circuit that simulates an inductor using operational amplifiers, resistors, and capacitors, and allows the value of the inductance of the circuit to be modified by changing a resistance. In this case, a FET used as a variable resistance in a gyrator circuit becomes the control element simulating the variable simulated inductance in FIG. 22, and the control signal can change the value of the inductance across a range of values and with speeds that would not be possible using a hand-modified coil or other variable inductor.

Likewise, one control element represents the variable resistor 2209 in the resonant circuit of FIG. 22. One possible combination that creates a control element is the resistor/FET combination of FIG. 20, designated 2009 and with FET 2010 driven by a control signal. In FIG. 20, the control signal is the gate voltage amplitude 2013. In FIG. 22, this is 2210 the input line that controls the variation for 2209 and where the control signal such as an analog control signal is connected. FIG. 24 illustrates the analog control signal 2412 driving Control 2411. This combination produces a variable resistance whose resistance can be varied over a wide range and at whatever frequency is determined by the analog key signal driving the control element.

Additional circuit elements may also be added by one skilled in the art to add encryption complexity. Likewise, for the variable capacitor and remaining variable resistive elements, those elements can be replaced by unit circuit elements driven by analog control signals to produce variation in the encrypted message signal yielding robust encryption.

It is important to note that anywhere within the instant invention that a control signal is noted where it applies to an NGD circuit, multiple control signals can be applied to multiple circuits. Multiple control signals can also be applied within the same circuit, as shown in FIG. 24. For example, in FIGS. 25-28 in which a control signal (symbolized as a key symbol) is shown, a plurality of control signals (analog keys) may be applied to that individual circuit—applied to individual circuit controls (in this example, four shown).

Angle Modulation

Angle modulation is the process of varying the total phase angle of a carrier wave in accordance with the instantaneous value of the modulating signal, while keeping the amplitude of the carrier constant. Angle modulation can include phase modulation and/or frequency modulation.

For Phase Modulation (PM), the equation for the modulated carrier is:

$$s_{PM}(t) = A \cos[\omega_c t + \Theta_0 + k_{PM} m(t)] \qquad \text{Equation 3}$$

where:
 A is the carrier amplitude
 $\omega_c$ is the carrier angular frequency
 $\theta_0$ is an initial phase
 $K_{PM}$ is the phase sensitivity constant
 m(t) is the analog key signal or modulating signal
For Frequency Modulation (FM) the equation for the modulated carrier is:

$$s_{FM}(t) = A \cos\left[\omega_c t + \Theta_0 + k_{FM} \int m(t) dt\right] \qquad \text{Equation 4}$$

where:
 A is the carrier amplitude
 $\omega_c$ is the carrier angular frequency
 $\theta_0$ is an initial phase
 $\int K_{FM}$ is the frequency sensitivity constant
 $\int m(t) dt$ is the integral of the analog key signal or modulating signal
 Temporal modulation is related to other forms of modulation in that it shifts the signal in time, but not within the angle of a carrier.

Orthogonality

The principle of orthogonality is illustrated in several ways in the disclosed embodiment. Where two channels are employed, one channel may be frequency modulated while the other is phase modulated, and where the carriers for the two channels are orthogonal, the signals on the two channels may then be kept separate or combined, depending on how the key signals are controlled and utilized both at the encryption block and the decryption block. A particular embodiment of this method is where one signal is a masking signal, and where if a key does not match at the encryption block and at the decryption block, the masking signal overwhelms the decrypted message signal, hiding the message signal and thereby providing an added measure of security.

An additional use of orthogonality is where two signals are to be passed at the same time in one channel. In this case, use of separate carriers orthogonal to one another allows the signals to be transmitted together without interference.

Parallel Channels, NGD and PLTNM

The requirement to encrypt multiple channels in parallel is common, e.g., for digital television, but also for satellite communication and other high-density and high-sensitivity or high-security communication systems. For these systems, it may be important that not only individual channels are encrypted, but that individual channels are encrypted differently from one another so that decrypting one does not decrypt all.

The disclosed embodiment presents several methods of achieving this end. First, there are multiple modulation methods that can be applied to signals, both primary and intermediate, as well as both singly and in combination, to produce complex waveforms with strong encryption strength. Second, multiple modulation methods, including without limitation, PLTNM can be applied, as described below, in combinations of serial and parallel configurations with varied frequency settings, phase responses, and ranges of adjustment of the PLTNM modulation parameters to strongly encrypt signals, and where each different setting and configuration will have unique encryption parameters. Several embodiments discussed herein are illustrated in FIGS. 25-28 whereby parallel message signals of one or more AG and/or PLTNM circuits are applied in serial and parallel combinations. The parallel message signals are in one or more embodiments derived from multiple independent messages that are then collected together, or in other embodiments can be a single message signal that is subdivided (in the frequency or time domain) and these subsegments are applied to multiple channels simultaneously.

Negative group delay (NGD) circuits (discussed elsewhere in this document) form the basis of the PLTNM modulation circuits. Parallel and/or parallel/serial combinations of ADM circuits (where the parallel/serial combinations may or may not include PLTNM) and direct PLTNM circuits employing various modulation methods, whether frequency, phase, temporal, or other methods, come at the cost of additional circuitry and circuitry real estate in order to enhance encryption security.

Parallel PLTNM Channels

Multiple channels of encryption/decryption (see FIG. 1) are often operated in parallel. PLTNM can be utilized on individual channels with variable adjustable advance or delay or spectral modification of the message or encrypted waveform. The schema of encryption of one channel relative to another, and encryption of any channel at any particular moment is known to the encryption control block. This same schema is used for decryption but must be kept hidden from unauthorized users. This is an additional method for enhanced security in communications.

Parallel/Serial PLTNM Channels

In addition to application of individual Analog Dynamic Modulation (ADM) or PLTNM circuits applied to individual channels operating in serial cascades, multiple PLTNM and/or ADM circuits in parallel with each parallel channel, including cascade circuit configurations, can be applied to a single "message" input signal to obtain modulation and spectral results not obtainable with a single or a serial cascade of PLTNM and/or ADM circuits.

Figure 25:
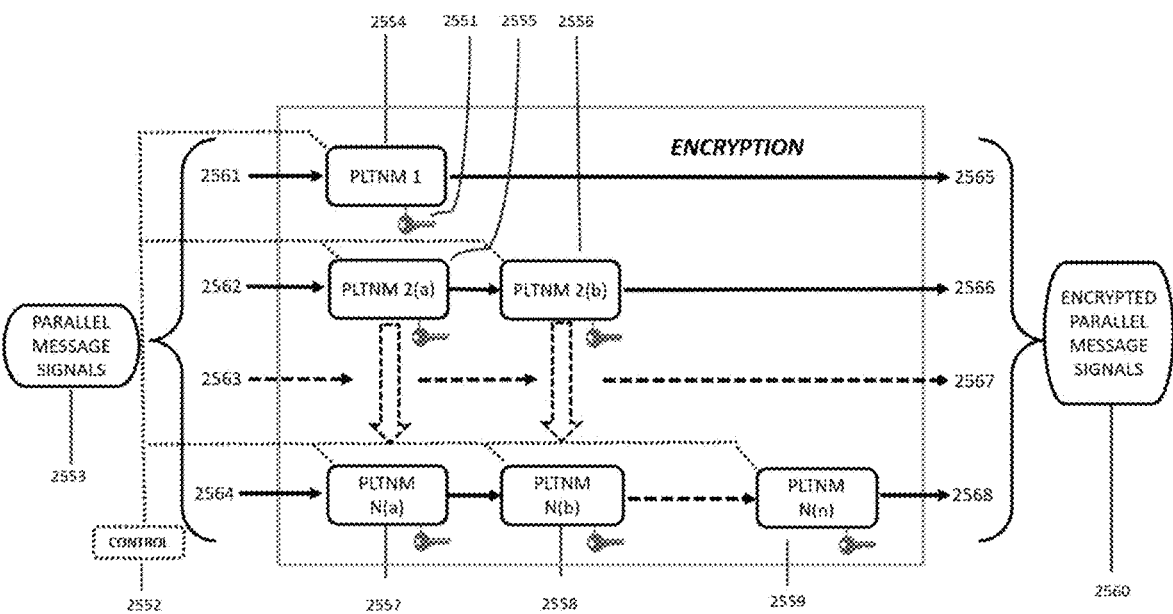
FIG. 25 illustrates application of multiple PLTNM circuit stages to parallel message signals.

As depicted in FIG. 25, the first message signal line 2561 is applied to circuit 2554. The second message signal line 2562 is applied in series with circuit 2555, and circuit 2556 is applied in series with circuit 2555. The message signal 2564 to which circuit 2557 is applied has a number of circuits additionally applied, including 2558 and 2559 respectively. If the component values of circuit 2554 are different from circuit 2555, then the action taken on their respective message will be different as well. These circuit characteristics can be independently modified and thus modulated—one channel may be modulated with parameters different from the next channel.

Figure 26:
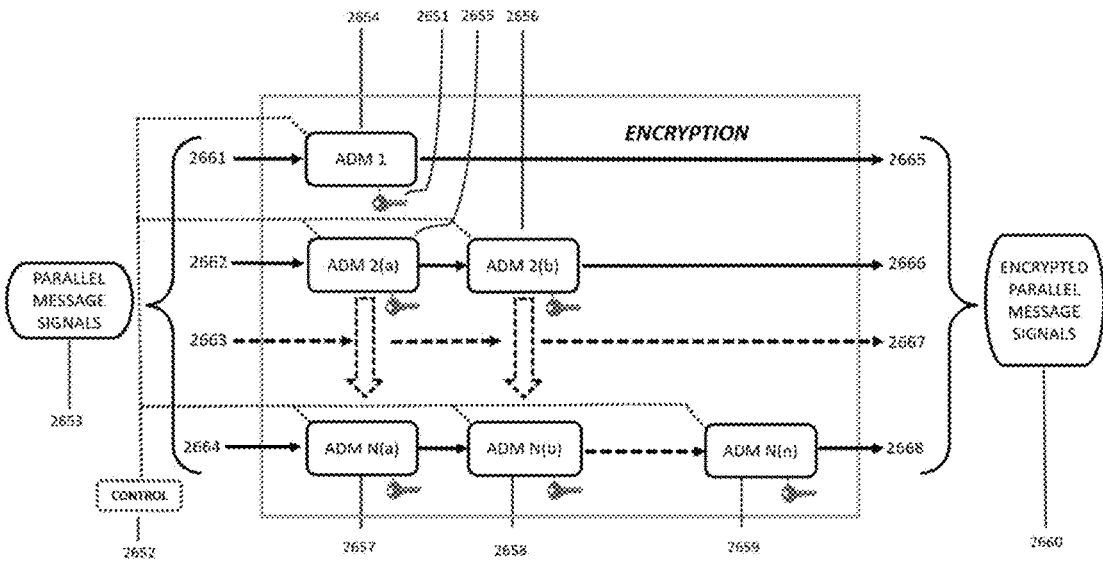
FIG. 26 illustrates application of ADM circuit stages to parallel message signals.

As depicted in FIG. 26, implementing only ADM circuit stages, the first message signal line 2661 is applied to circuit 2654. The second message signal line 2662 is applied to circuit 2655 and circuit 2656 is applied in series with circuit 2655. The message signal 2664 to which circuit 2657 is applied has a number of circuits additionally applied, including 2658 and 2659 respectively. If the keys applied to, or component values of circuit 2654 are different from circuit 2655, the action taken on their respective message will be different as well. These circuit characteristics can be independently modified and thus modulated—one channel may be modulated with parameters different from the next channel.

For PLTNM circuits, as shown in FIG. 25, individual circuits may be modulated utilizing parameters unique to the channel, making the encoding and thus encryption of that channel different from other channels. Individual circuits on individual channels are controlled by control lines indicated as 2552, 2652, and 2704 for FIGS. 25, 26, and 27 respectively. Controls may be applied across a number of channels in concert, or to entire channels, or to individual circuits within a channel without limitation. Using FIG. 25 as an example, the control for circuit 2554 may be the same or different from the control for circuit 2559 without limitation. The designation of 2552 on the control indicates a composite representing all control signals.

Again, using FIG. 25 as a non-limiting example, a control (key) signal is applied to each PLTNM circuit. The characteristics of the analog control (key) signal have been described elsewhere in this document and may include, according to FIG. 24, a plurality of individual signals applied to individual control elements for each PLTNM circuit (in this example four (4) shown). Such key 2551 is representative of a key signal or signal set on any circuit where, without limitation, the signals can be identical or different from one another. It is critical that the key used for encryption and decryption for any particular ADM or PLTNM circuit must be exactly the same key in both the encryption and decryption processes, and must be synchronized—starting at the same time that the message signal is presented to the circuit. For systems having multiple parallel message signals, having different keys may be important in that those separate and distinct keys are applied in decryption of each of the channels as separated and, in the order, presented.

Serial/Parallel PLTNM Circuits Applied to a Split Single Message Signal

Figure 27:
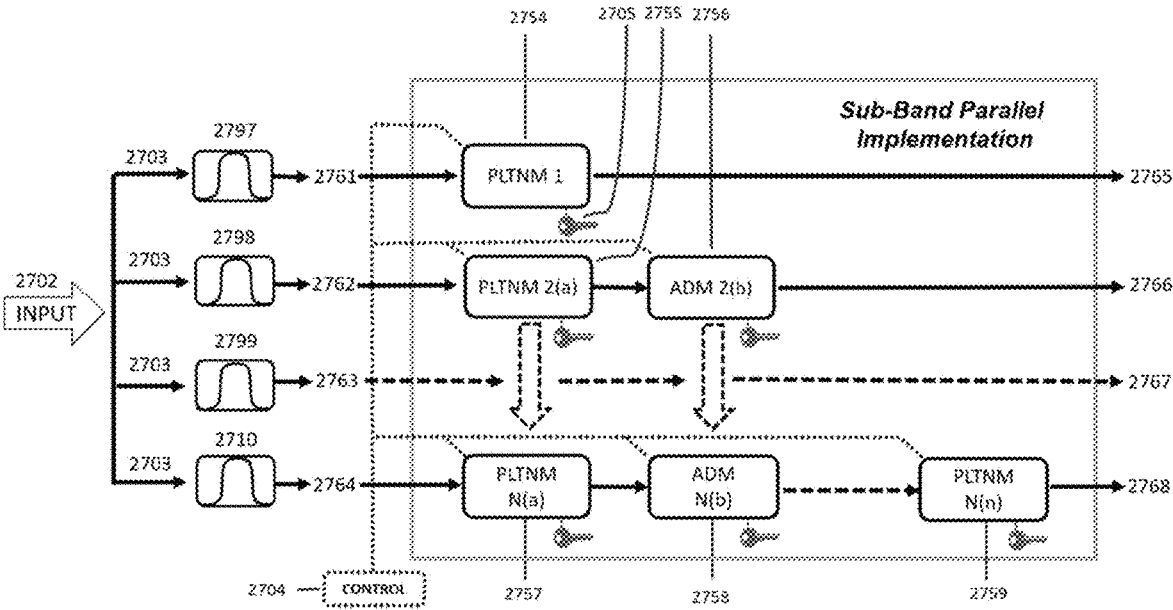
FIG. 27 illustrates application of both ADM and PLTNM circuit stages to a message signal split into multiple frequency bands. Multiple control signals (keys) that may or may not be the same as one another are applied to each of the ADM/PLTNM circuit stages, and multiple parallel/serial combinations of ADM/PLTNM circuits may be applied to channels before decryption.

Analogous to the discussion above, multiple ADM and/or PLTNM circuits in parallel and/or serial configurations can be applied to a single input to obtain modulation results and spectral results not obtainable with a single serial ADM circuit (FIG. 27). In this embodiment, filters 2797, 2798, 2799, 2710 act to split signal 2702 into frequency bands that may then be operated on independently as signals 2761, 2762, 2763, and 2764, respectively. The number of bands utilized may be more or fewer to accommodate the application requirements, and can be implemented by one skilled in the art. Filters 2797, 2798, 2799, and 2710 may be all-pass—simply passing the incoming signal 2702 to each of the parallel channels 2761, 2762, 2763, 2764, in one embodiment, or they may be overlapping in frequency, or they may not overlap and provide distinct frequency bands for each parallel channel and subsequent operations. The application of ADM and/or PLTNM circuit stages, 2754-2759 inclusive, is also indicated by the dashed lines to be non-limiting, in that additional message channels with additional ADM and/or PLTNM circuits with additional parallel/serial configurations may be applied without limitation to generate encrypted signals 2765, 2766, 2767, 2768. The technology here disclosed is not limited to four channels, but may be extended to any number of channels, in which case the number of filters and associated input channels would be extended appropriately.

Figure 10:
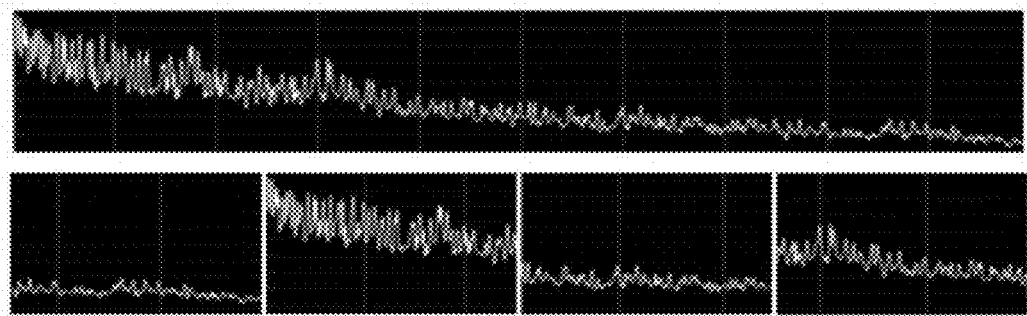
FIG. 10 shows frequency sequencing where a frequency spectrum is broken into four sub-spectra and the 'order' of the four sub-spectra are changed.

An example of the application of this embodiment would be the application to the previously describing frequency domain dynamic sequencing (FIGS. 9 and 10), wherein the frequency sub-bands or segments are applied to each of the parallel channels in order to apply various encryption characteristics to each frequency segment.

The configurations of FIGS. 25, 26, and 27 allow for variations of circuit configuration between any of the individual circuits shown, for examples 2554, 2555, 2556, 2557, 2558, or 2559 or 2654, 2655, 2656, 2657, 2658, or 2659; or 2754, 2755, 2756, 2757, 2758, or 2759 without limitation. Serial and/or parallel combinations of PLTNM and/or ADM circuit stages are possible without limitation. ADM and PLTNM circuit stages enable modulation of the circuit transfer function by changes in value of an external signal (including a key signal such as an analog key). Each of the circuit stages in the diagram can be modulated by a different signal or modified version of a signal at the same time, allowing for complex and rich encryption. This same enabling of rich and complex encryption by modulation of ADM and/or PLTNM circuits individually and as groups, and variation of ADM component values to produce varying circuit functions is equally as applicable to FIG. 26.

Figure 28:
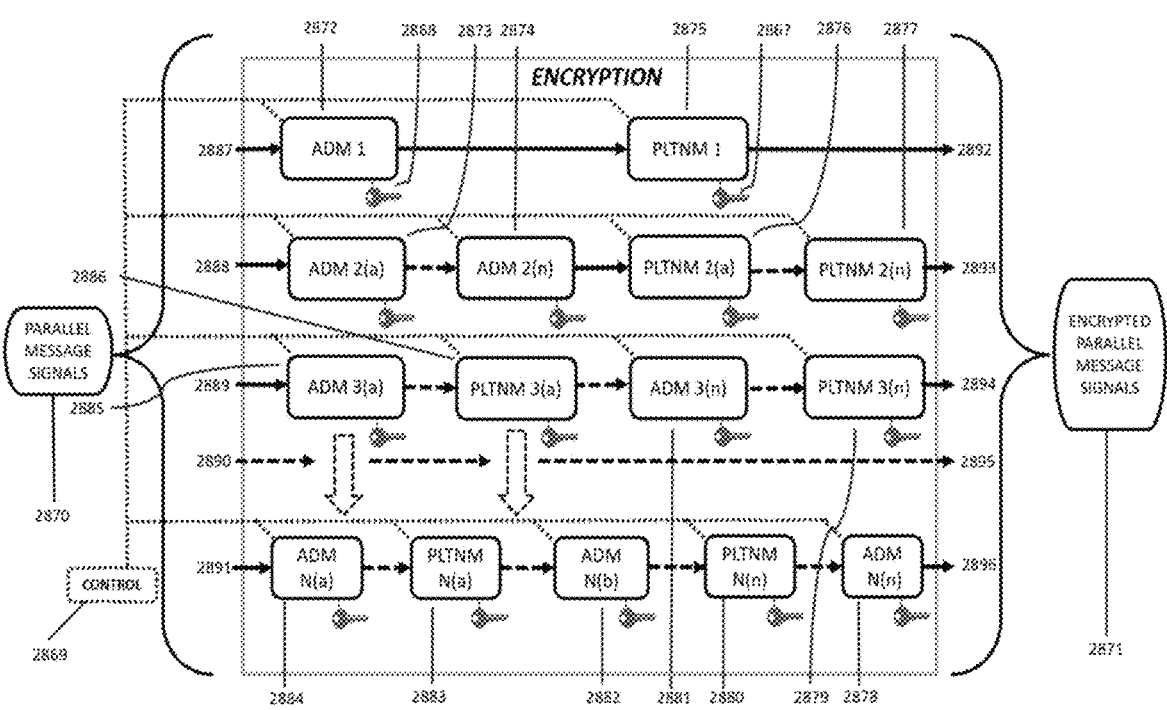
FIG. 28 illustrates parallel/serial application of mixed PLTNM and ADM circuit stages to parallel message signals.

FIG. 28 illustrates a complex combination of the various modulations integrating both ADM and PLTNM circuits in multiple configurations including encryption stages with constant or variable-parameters in the ADM and PLTNM circuit stages. The multiple parallel channels indicate that although channels may have identical filtering and PLTNM or ADM circuit parameters, they may also have different parameters in different orders and different numbers to create the desired outcome. In FIG. 28, all keys whether numbered or unnumbered may be driven by either the same key signal or by different key signals. All are independent key inputs.

PLTNM circuitry can be added to ADM circuitry to further enhance encryption strength and signal protection. Further embodiments may integrate ADM and PLTNM in various configurations or topologies in which the integrated ADM/PLTNM circuits would replace individual ADM or PLTNM circuit stages as depicted in FIGS. 25-28 as integrated individual circuit stages.

Application of Frequency and Temporal Sequencing

The embodiments illustrated in FIGS. 25-28 may also utilize signal advance or signal delay, or other modifications of signal characteristics, to implement an enhanced form of frequency or temporal dynamic sequencing, as described above. The application of ADM and/or PLTNM results in the controlled modulation of the individual time segments and/or frequency sub-bands. Parallel and/or serial combinations may be utilized to enhance encryption strength for secure transmission or storage of signals.

Decryption

Decryption (FIG. 1, 106) relies on carriers, and in particular the same Dynamic Carrier (DC) 2904 utilized for encryption of the signal, this being the carrier 202 modulated by the analog key signal 201. A basic decryption process, according to FIG. 29, shows use of the same analog key 2901 utilized to encrypt the signal. This must be exactly the same analog key signal used for encryption, and must be introduced into the decryption device at the same time as the encrypted message signal 2907 is introduced into the system, as described hereinabove. This is facilitated by a controller (not shown) that controls the timing of the overall operation. In a similar manner, the encrypt block also has a controller that control the timing of the encryption operation. These two controllers operate independent of each other. This encrypted message signal 2907 is the signal produced by the encryption device. The analog key signal 2901 modulates a carrier 2902 using a modulator 2903 where the carrier 2902 is identical to the carrier used in the encryption device. The carrier 2902 is of the same frequency as the carrier 202 used in the encryption, and the modulator 2903 is of the same type and characteristics as the modulator 203. The two carriers on either side of the encryption and decryption process do not have to be phase locked. Modulation of the carrier 2902 produces a modulated or dynamic carrier (DC) 2904. The DC 2904 is mixed with a mixer 2906 using multiplication or other suitable means identical to that utilized in the encryption device 101 in FIG. 1 to generate an output signal that is then filtered with a filter 2951 to produce the decrypted message signal.

The encrypted message signal 207 from FIG. 2 is passed to the decryption system of FIG. 29 as 2907. The DC is created contemporaneously with the transfer of the encrypted message signal into the decryption system as noted above by modulation of the carrier 2902 by the analog key signal 2901. With a transmitted encrypted signal that is centered about the DC in the frequency domain, thus resulting in the encrypted signal arriving at the decrypt block 2950 at substantially the same time as it was generated in time. As the message is being fed into the encrypt block 205, the encrypted signal is being fed into the decrypt block 2950. To ensure that the analog key signal 2901 is initiated at the same time as the initial portion of the encrypted signal, a header can be employed. There are many different header or synchronization methodologies that can be utilized. One exemplary one is to provide an operation wherein the DC at the encryption side is modulated with a simple FSK and the mixer 206 controlled to pass this carrier through. A specific code can be transmitted, such as "111101" wherein the message is indicated as following the "01." At the decryptor, a separated Phase Lock Loop (not shown) can be implemented to extract this code on the output of the signal input using the carrier 2902 and initiate the operation upon recognizing the sequence of "1's" followed by a "01."

Once initiated, the analog key signal is initiated to coincide with the beginning of the encrypted message signal to generate the DC 2904. This DC and the encrypted message signal are multiplied, in the same type of operation used in the encryption system, to remove the DC components that were added during encryption, and to shift the message signal components back to baseband. The multiplier is followed by the filter 2951 to remove unwanted high frequency components produced by the multiplication. The resulting decrypted message signal is identical to the original message signal.

Two factors are important for the operation of this encryption/decryption system. The first is that band-limited signals can be represented as sums of sinusoidal signals. The message signal, the carrier, and the analog key signal may all be represented as sums of sinusoidal signals. The second important factor is that multiplication of a pair of sinusoidal signals produces two sinusoids at the sum and difference of their frequencies. Multiplication of a low frequency signal by a high frequency signal produces a copy of the low frequency signal at the high frequency. Multiplication of that signal again by the same high frequency signal will shift the low frequency signal back to baseband where it started, though a high frequency noise component is left over to be filtered out. This works even if the signal being multiplied is itself a complex combination of sinusoids like a DC.

Protection of the Analog Key during Decryption

If key protection, including without limitation inverted key, processed key, multiple keys, or other methods described in the present technology, is utilized in the encryption process, then the corresponding key protection reversal process must be utilized for decryption.

Description of A Particular Embodiment with Data

Encryption/Decryption System Basic Model Results

Note that in the following discussion the pairs of terms "analog key" and "analog key signal," "encrypted signal" and "encrypted message signal," and "decrypted message" and "decrypted message signal" have identical meaning and may be used interchangeably.

Inputs, outputs, and intermediate signals from a basic system of FIG. 1 combining the basic encryption device of FIG. 2 utilizing an analog key signal, with a basic decryption device of FIG. 29 is illustrated in the figures that follow. A message signal 200 is presented along with an analog key 201 to the encryption device 205 that then produces an encrypted signal 207. That encrypted signal 207 in this case is not stored but passed as input 2907 to a decryption device 2950 along with the exact same ("matching") analog key 2901 used for encryption, and the resulting output signal 2952 is a decrypted and recovered message that is essentially equivalent to the original message.

These results represent one instant example demonstrating the utility of the methods and devices and is not a limiting example. Practitioners skilled in the art will recognize that frequencies and bandwidths can be scaled, thereby increasing or reducing the complexity of the various signals, as well as encryption strength based on the needs of the individual application within the bounds of the present technology.

Time Domain

Matched Keys

Figure 30:
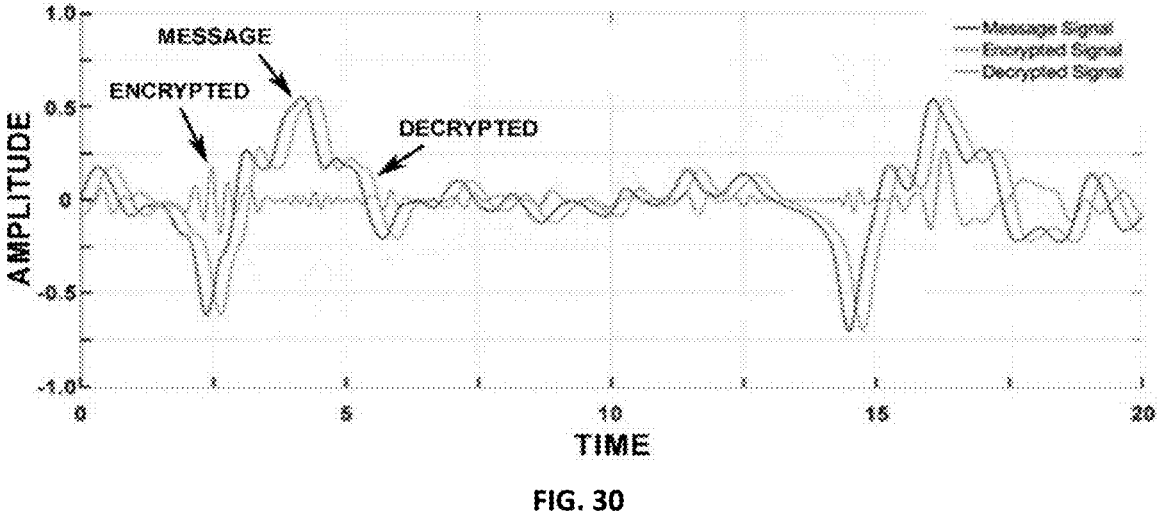
FIG. 30 illustrates waveforms obtained employing exclusively ADM circuitry in the encryption-decryption system where the encryption and decryption keys match.

FIG. 30 illustrates in the time domain (showing what signals look like over time rather than their frequency content) the result of reducing to practice FIG. 1 using a simple encryption device applying the general information of FIGS. 2 and 29, and where the analog key presented to both the encryption device and the decryption device match. It is noted that the decrypted signal is mirrored back to baseband from the modulated carrier. This is what can be extracted from the modulated carrier without the decryption circuit and the analog key.

The Pearson correlation coefficient ("Pearson "r" or "CC") provides an objective means to quantify how well two waveforms correlate to each other—basically how similar they are. The Pearson r ranges from −1 to +1 in which the "1" and "−1" indicate 100% positive and negative correlation, respectively, and a "0" value indicates that there is no correlation between the two waveforms. The correlation coefficient provides an objective indication of the similarity or difference between the original message signal, the encrypted signal, the decrypted signal and the analog key.

Additional results analyses (relative to frequency) include:

Power Spectrum—quantifies the power present in each frequency.

Spectral Coherence—identifies frequency-domain correlation between signals. The results range from zero ("0") to one ("1"). Similar to correlation, coherence values approaching "O" indicate that corresponding frequency components are uncorrelated; values approaching "1" indicate that the corresponding frequency components are correlated.

Cross-Spectrum Phase—estimates the relative phase between the correlated signal spectral components.

Note that the decrypted signal (slightly time-delayed relative to the message signal, due to filter 2951 shown in FIG. 29) is highly correlated with the message signal (r=0.999). In this example (see FIG. 32), the analog key signal (uncorrelated with the message (r=−0.020), decrypted (−0.020) and encrypted (−0.023) signals are applied to the encryption device (201 in FIGS. 2 and 2901 in FIG. 29). The message signal (FIG. 30) is applied as signal 200 in FIG. 2, and results in the encrypted signal (207 in FIGS. 2 and 2907 in FIG. 29).

The encrypted message signal 2907 (shown un-numbered in FIG. 30) does not correlate with either the message signal 200 (r=−0.024), the analog key signal 201 or 2901 (r=−0.023), or the decrypted message signal 2952 (r=−0.024).

Mismatched Keys

In a key-based encryption system, when the key used for decryption matches (is identical to) the key used for encryption, the message signal is retrievable—can be decrypted to recover the original message (the decrypted signal). If the key applied for decryption does not match the key used for encryption the original message cannot be decrypted or recovered. This is analogous to inserting the wrong key at someone's front door—the door remains locked.

Figure 31:
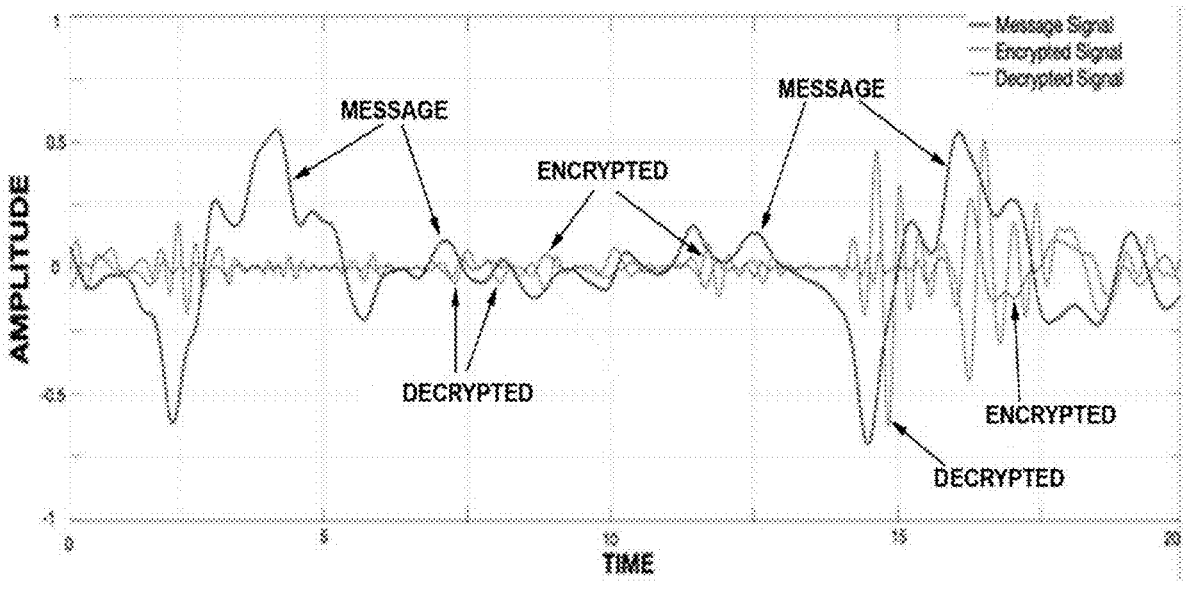
FIG. 31 illustrates waveforms obtained by the application of ADM circuitry in the encryption-decryption system where the encryption and decryption keys do not match (mismatched.

FIG. 31 illustrates signals produced from the same system of FIG. 1 using the encryption device of FIG. 2 and decryption device of FIG. 29, in which the key applied for decryption is not identical ("mismatched") to the key applied for encryption. FIG. 31 illustrates a message signal 200 encrypted by an analog key 201 to generate an encrypted message signal 207. The message signal and encrypted signal (encrypted message signal) are relatively uncorrelated (r=−0.242).

When the encrypted message signal 207 is presented as encrypted message signal 2907 to the decryption device 2950, and the analog key signal 2901 is not identical to analog key 201 (mismatched), the decrypted message signal 2952 (decrypted signal (decrypted) in FIG. 31), as a non-limiting example, is generated that has essentially no correlation with the original message signal 200 (r=0.026) (i.e., it bears no resemblance to the original message signal 200 waveform). The original message signal 200 cannot be detected or recovered (decrypted) from the encrypted signal using the wrong or mismatched key, 2952 (i.e., not identical to the key applied for encryption) and is thus protected from unauthorized access.

Figure 32:
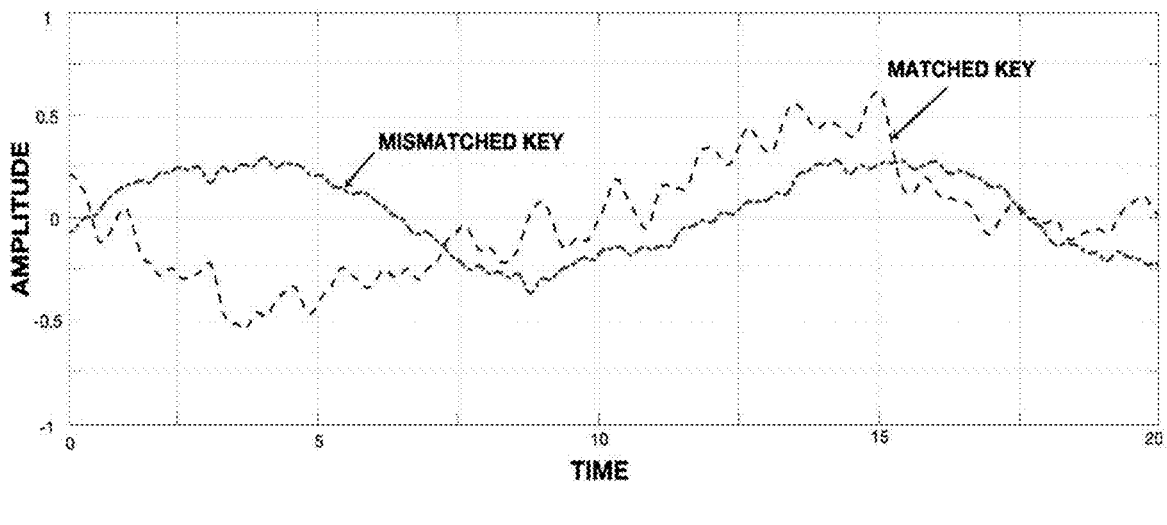
FIG. 32 illustrates waveforms (over a representative segment of time) depicting the matched key used for both encryption and decryption, and for the mismatched key the "mismatched key" used for decryption only.

FIG. 32 compares representative time segments of both the matched key and mismatched key. The matched key is utilized to generate the data for FIG. 30 for both analog key signal 201 in FIG. 2, and analog key signal 2901 in FIG. 29. The mismatched key is only utilized for decryption in the mismatched case, illustrated in FIG. 31.

The analog key signal applied for both encryption and decryption to obtain the results depicted in FIG. 30 are identical, illustrated as the waveform labeled "MATCHED". The analog key signal applied for encryption and decryption to obtain the results illustrated in FIG. 31 are the two different waveforms labeled "MATCHED" and "MIS-MATCHED", respectively. Although only a representative time segment is depicted in FIG. 32, the two signals (labeled "MATCHED" and "MISMATCHED") applied as analog keys are uncorrelated (r=−0.050) over their entire time course.

Frequency Domain

The time domain results illustrate the relationship between signals in the encryption/decryption system as they vary over time. The frequency domain analyses provide another means to examine the relationships between the various encryption and decryption device signals. The power spectrum quantifies the relative power contribution from individual frequencies that comprise the time domain waveform.

Matched Keys

Figure 33:
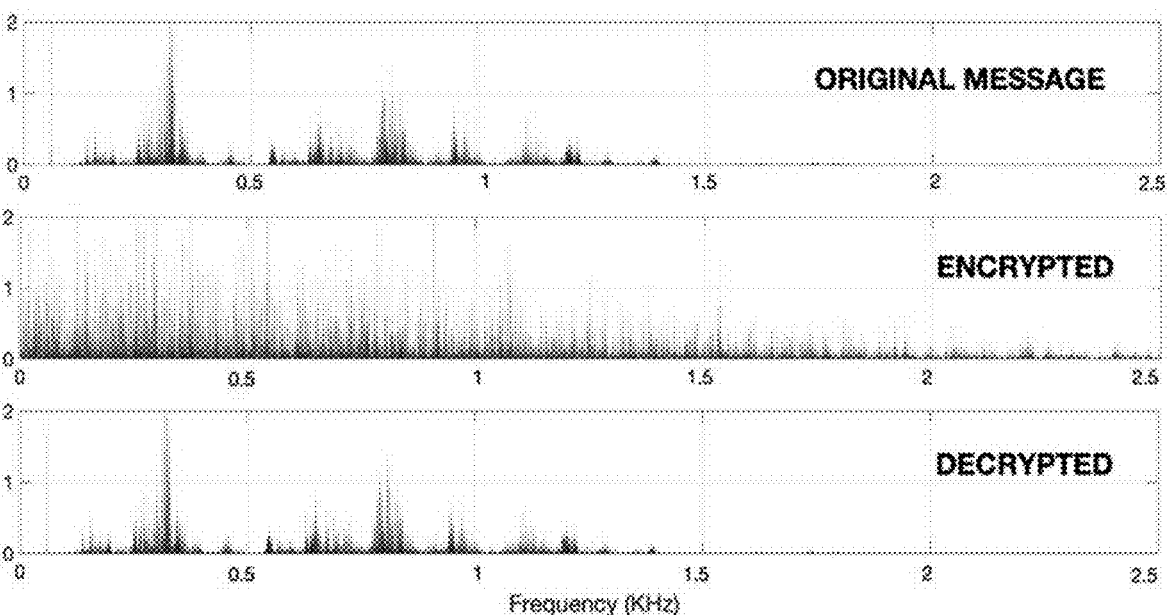
FIG. 33 illustrates an example of power spectra obtained using a simple encryption and decryption circuit with matched keys and depicts the spectra for the original message, matching decrypted message, and encrypted message.

FIG. 33 illustrates the power spectrum of the original message signal 200, the decrypted message signal (de-crypted) 2952, and the encrypted message signal (en-crypted), both 207 and 2907. When the encryption analog key 201 matches the analog key 2901 used for decryption, the power spectrum of the decrypted message 2952 matches the power spectrum of the original message signal 200. The resulting power spectrum of the message signal 200 to which the dynamic carrier is applied in order to generate the encrypted message signal 207 is more evenly spread across the available bandwidth. Where the message signal 200 had significant energy in a few frequency bands, that energy has been spread across a wider spectrum. There is also additional frequency content from the key-modulated carrier(s). The amount of spectrum used is a tunable parameter and, as such, provides an analog key "sensitivity" adjustment that impacts the frequency and phase modulation in the generation of the dynamic carrier and, thus, the encrypted signal. This adjustment facilitates increasing the encrypted signal complexity (and thus strength) by increasing the dynamic carrier bandwidth to accommodate specific user/application related requirements.

Mismatched Keys

Figure 34:
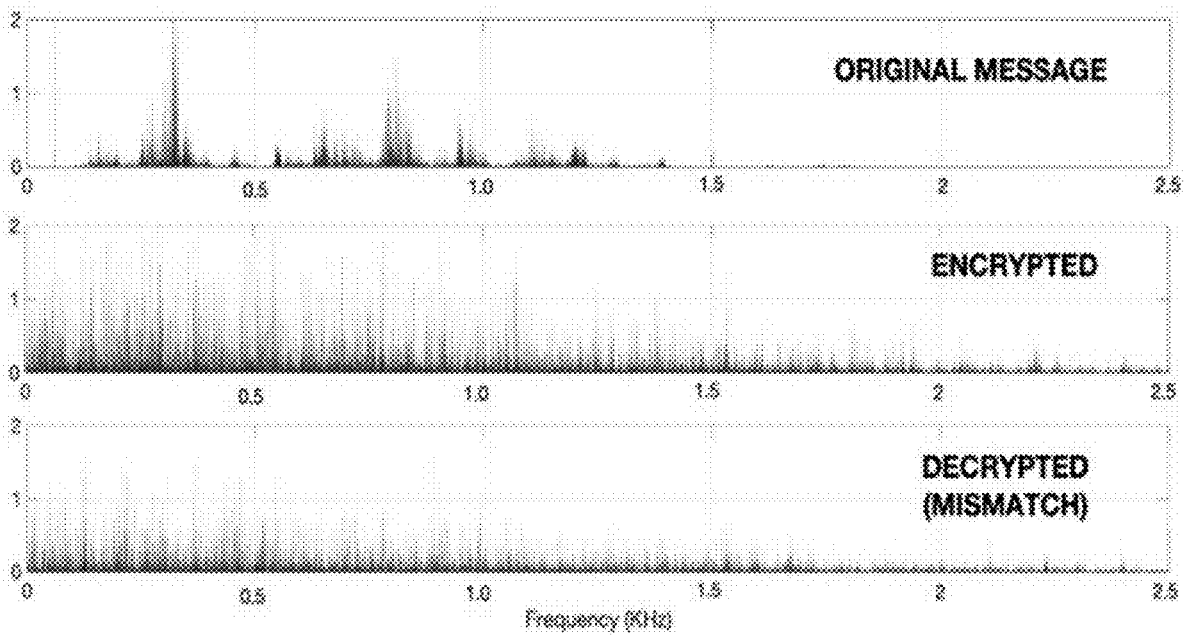
FIG. 34 illustrates an example of power spectra obtained using a simple encryption and decryption circuit with mismatched keys (where encryption and decryption keys are different from one another) for the original message, decrypted message with spectrum that does not match the original message, and encrypted message.

The effect of mismatched analog keys in the frequency domain is depicted in FIG. 34. As a non-limiting illustration, when the analog key signal presented at 201 for encryption is not identical to the analog key signal presented at 2901 used in decryption, the power spectrum of the incorrectly decrypted signal will vary significantly from the original message signal. In FIG. 34, the original message signal 200 is shown in the 'original message' graph in the top row and the incorrectly decrypted message signal 2952 (decrypted) is shown in the middle row. Note that the power spectrum of each of the two signals is quite distinct. The original message signal is comprised of specific regions of concentrated power at specific frequencies along with other frequency regions with much less power. The decrypted message signal has energy spread across a broader spectrum and no longer exhibits the distinctive power spectrum contour of the original message. Although visually the contour of the decrypted message signal 2952 appears to be similar to that of the encrypted message signal at 207 or 2907, mathematical analysis indicates that the two signals are uncorrelated (r=−0.041).

The graphs of FIG. 34 were generated using the exact same system and parameters as FIG. 33 except where the decryption analog key signal does not match the analog key signal used for encryption. FIG. 34 illustrates the scenario in which an encrypted signal may be intercepted in transmission or through unauthorized access to a data storage system. Without the correct analog key, as well as any required synchronization control signals, the analog encrypted signal cannot be decrypted and the original message signal cannot be recovered.

Figure 35:
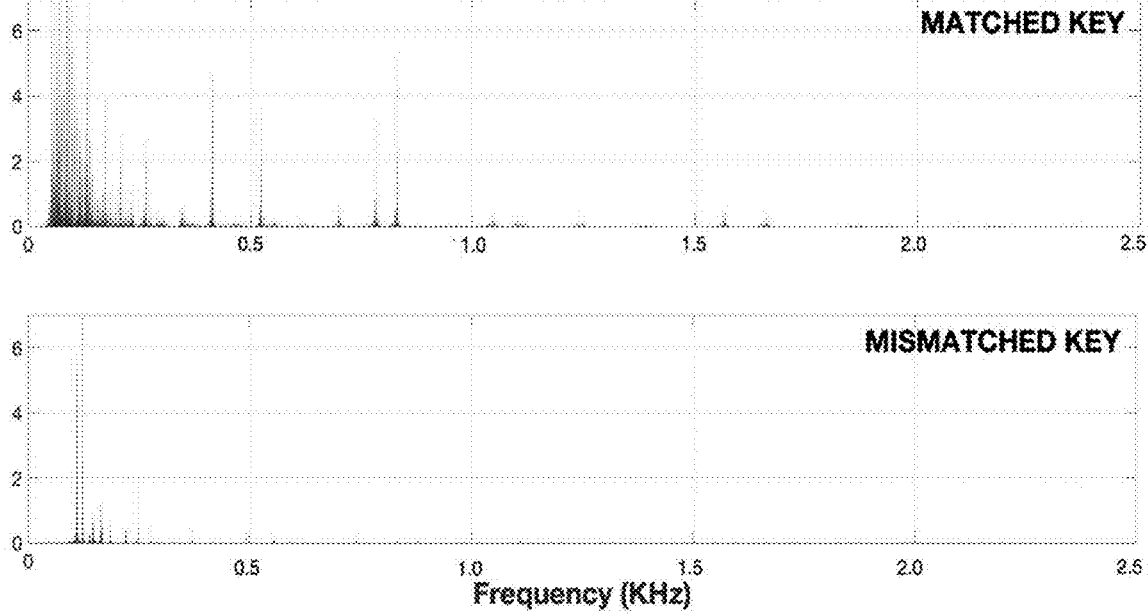
FIG. 35 illustrates the power spectra of the two analog keys used to generate the preceding figures for a matched key and a mismatched key, respectively, where the matched key used for both and, where mismatched keys are used, the matched key is used for the encryption side and the mismatched key is used for decryption.

Power spectra of the two keys used to generate the signals illustrated in FIGS. 33 and 34 are provided in FIG. 35 for reference. The 'Matched Key' signal is used for both analog key signal 201 in FIG. 2 and analog key signal 2901 to generate the matched key graphs of FIG. 33. To generate the mismatched power spectrum graphs of FIG. 34 the top matched key was used for analog key signal 201 in FIG. 2, and the lower mismatched key was used for analog key signal 2901 in FIG. 29.

Description of a Second Particular Embodiment with Data

Encryption/Decryption System Basic Model Results

Note that in the following discussion the pairs of terms "analog key" and "analog key signal," "encrypted signal" and "encrypted message signal," and "decrypted message" and "decrypted message signal" have identical meaning and may be used interchangeably.

Inputs, outputs, and intermediate signals from a basic system of FIG. 1 combining the basic encryption device of FIG. 2 utilizing an analog key signal, with a basic decryption device of FIG. 29 is illustrated in the figures that follow. A message signal 200 is presented along with an analog key 201 to the encryption device 205 that then produces an encrypted signal 207. That encrypted signal 207 in this case is not stored but passed as input 2907 in FIG. 29 to the decryption device 2950 along with the exact same analog key 2901 used for encryption, and the resulting output signal 2952 is a decrypted and recovered message that is essentially equivalent to the original message.

These results represent one instant example demonstrating the utility of the methods and devices and is not a limiting example. Practitioners skilled in the art will recognize that frequencies and bandwidths can be scaled, thereby increasing or reducing signal complexity and encryption strength based on the needs of the individual application within the bounds of the present technology.

The particular embodiment utilized to generate the data for FIGS. 36-41 includes the basic encryption device of FIG. 2, but where the multiplicative mixer 206 has been replaced by a variation of the PLTNM circuit. The non-linearities produced by the PLTNM circuit are "undone" or "reversed" in the basic decryption device where an inverted version of the PLTNM circuit is also included as the mixer 2906 in FIG. 29.

Time Domain

Matched Keys

Figure 36:
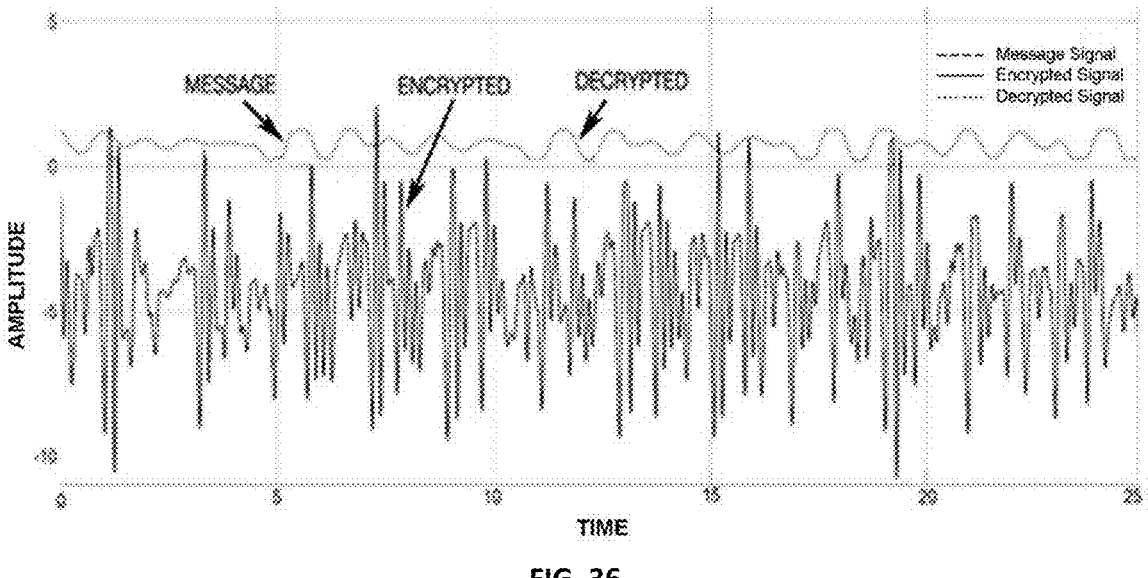
FIG. 36 illustrates waveforms obtained using the encryption-decryption system with PLTNM mixer where the encryption and decryption keys match, the original message, decrypted message, encrypted message, and analog key over a representative segment of time.

FIG. 36 illustrates in the time domain (showing what signals look like over time rather than their frequency content) the result of reducing to practice FIG. 1 using a simple encryption device utilizing the general information of FIGS. 2 and 29, wherein the mixer has been replaced with PLTNM circuit, and the analog key presented to both the encryption device and the decryption device match.

The Pearson "r" provides an objective means to quantify how well two waveforms correlate to each other—basically how similar they are. The Pearson r ranges from −1 to +1 in which the "1" and "−1" indicate 100% positive and negative correlation, respectively, and a "0" value indicates that there is no correlation between the two waveforms.

Note that the decrypted signal is highly correlated with and essentially overlaps the message signal (r=0.999), resulting in the original and decrypted messages that appear overlapped as the simulation yielded negligible delay. In this case, the analog key signal shown above (uncorrelated with the message (r=−0.055), decrypted (−0.055) and encrypted (0.024) signals) is applied to the encryption device (201 in FIGS. 2 and 2901 in FIG. 29). The message signal above is applied as signal 200 in FIG. 2, and results in the encrypted signal (207 in FIGS. 2 and 2907 in FIG. 29).

The encrypted message signal 2907 (shown un-numbered in FIG. 36) does not correlate with either the message signal 200 (r=−0.031), the analog key signal 201 or 2901 (r=0.024), or the decrypted message signal 2952 (r=−0.031).

Mismatched Keys

In a key-based encryption system, when the key used for decryption matches (is identical to) the key used for encryption, the message signal is retrievable—can be decrypted to recover the original message (the decrypted signal). If the key applied for decryption does not match the key used for encryption, then the original message cannot be decrypted or recovered.

Figure 37:
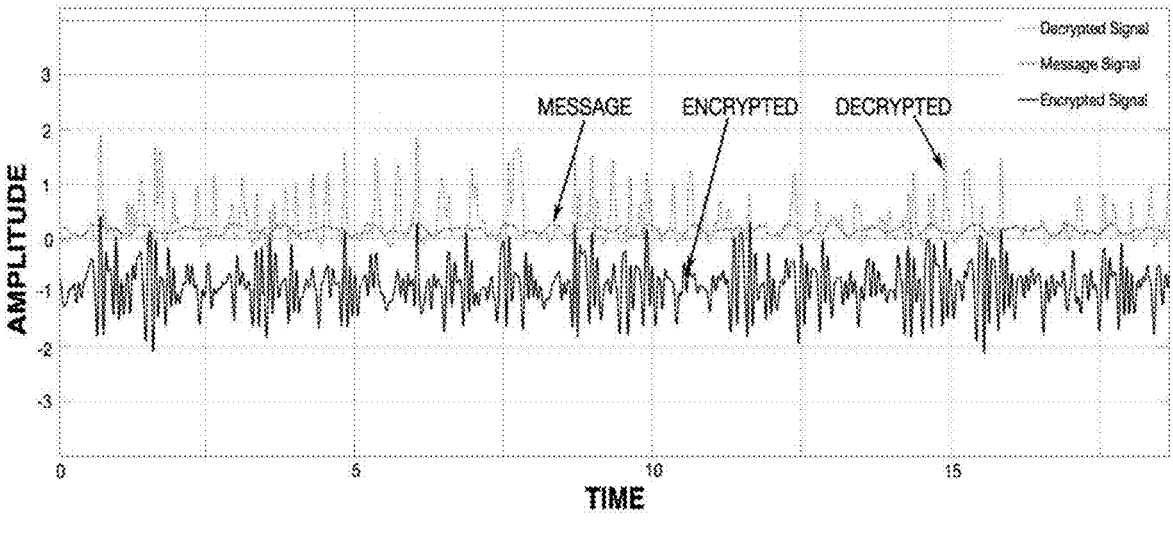
FIG. 37 illustrates waveforms obtained using the encryption-decryption system with PLTNM mixer where the encryption and decryption keys do not match, the original message, decrypted message, and encrypted message over a representative segment of time.

FIG. 37 illustrates the same system of FIG. 1 using the encryption device of FIG. 2 and decryption device of FIG. 29, in which the multiplicative mixer has been replaced by a PLTNM circuit. In this example, the key applied for decryption is not identical (mismatched) to the key applied for encryption. FIG. 37 illustrates a message signal 200 encrypted by an analog key 201 to generate an encrypted message signal 207. The message signal and encrypted signal (encrypted message signal) are relatively uncorrelated (r=−0.032).

When the encrypted message signal 207 is presented as encrypted message signal 2907 to the decryption device 2950, and the analog key signal 2901 is not identical to analog key 201, the decrypted message signal 2952 (decrypted signal, decrypted) generated (see FIG. 37), as a non-limiting example, has negligible correlation with the original message signal 200 (r=0.067) (i.e., it bears no resemblance to the original message signal 200 waveform). The original message signal 200 cannot be detected or recovered (decrypted) from the encrypted signal using the wrong key 2952 (not identical to the key applied for encryption), and is thus protected from unauthorized access.

Figure 38:
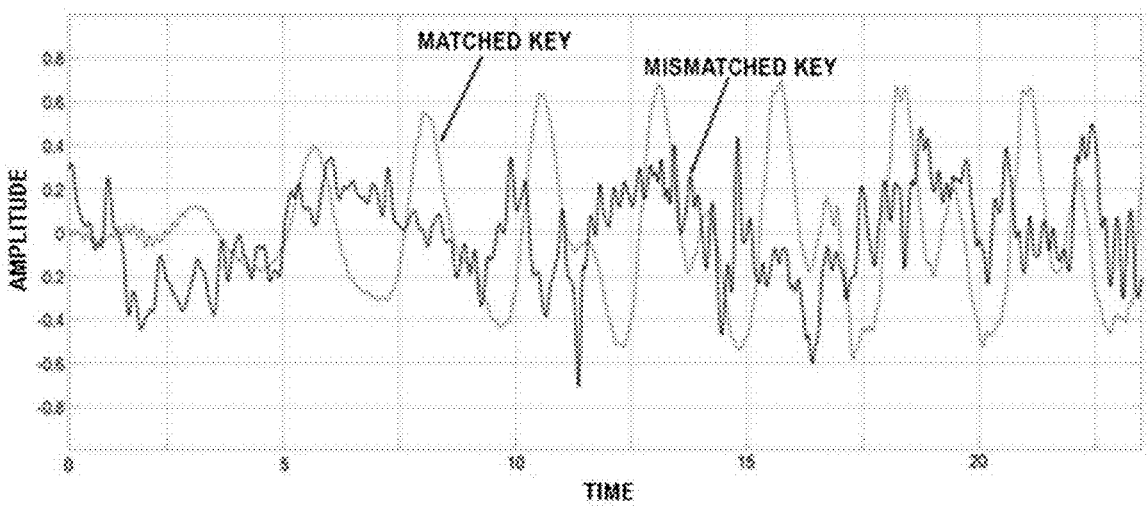
FIG. 38 illustrates the matched key used for both encryption and decryption, and the mismatched key used for decryption only for a system with PLTNM mixer.

FIG. 38 compares representative time segments of both the matched key that produced the results illustrated in FIG. 36 for both analog key signal 201 in FIG. 2 and analog key signal 2901 in FIG. 29. The "unmatched key" or mismatched signal shown in FIG. 38 is used as the analog key signal 2901 in FIG. 29 when generating data for FIG. 37. The analog key signal applied for both encryption and decryption to obtain the results depicted in FIG. 36 are identical, illustrated as the waveform labeled "MATCHED".

The analog key signal applied for encryption and decryption to obtain the results illustrated in FIG. 37 are the waveforms labeled "MATCHED" and "MISMATCHED", respectively. Although only a representative time segment is depicted in FIG. 38, the two signals (labeled "MATCHED"

and "MISMATCHED") applied as analog keys are uncorrelated (r=0.029) over their entire time course.

Frequency Domain

The time domain results illustrate the relationship between signals in the encryption/decryption system as they vary over time. The frequency domain analyses provide another means to examine the relationships between the various encryption and decryption device signals. The power spectrum quantifies the relative power contribution from individual frequencies that comprise the time domain waveform.

Matched Keys

Figure 39:
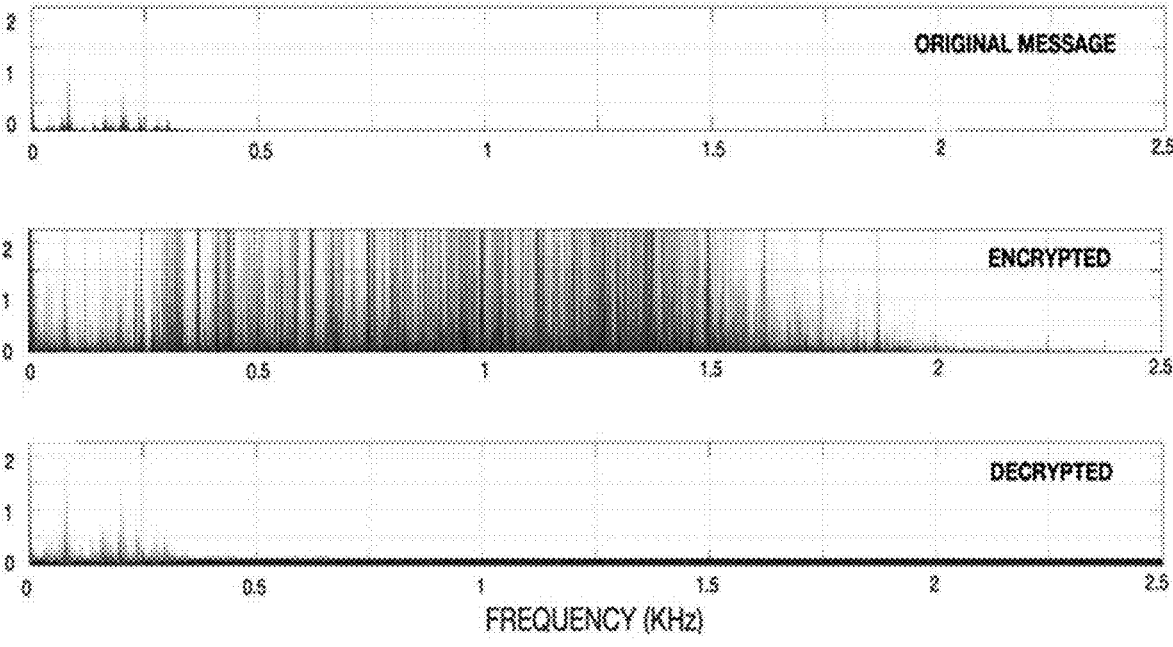
FIG. 39 illustrates an example of power spectra obtained using a simple encryption and decryption circuit with PLTNM mixer using matched keys and includes the spectra for the original message, matching decrypted message, and encrypted message.

FIG. 39 illustrates the power spectrum of the original message signal 200, the decrypted message signal (decrypted) 2952, and the encrypted message signal (encrypted), both 207 and 2907. When the analog key 201 used for encryption matches the analog key 2901 used for decryption, the power spectra of the original message matches the power spectrum of the original message signal 200. The power spectrum of the message signal 200 to which the dynamic carrier is applied in order to generate the encrypted message signal 2907 is more evenly spread across the available bandwidth. Where the message signal 200 had significant energy in a few frequency bands, that energy has been spread across a wider spectrum. There is also additional frequency content from the key-modulated carrier(s). The amount of spectrum used is a tunable parameter in a preferred embodiment and, as such provides an analog key "sensitivity" adjustment that impacts the frequency and phase modulation in the generation of the dynamic carrier and, thus, the encrypted signal. This adjustment facilitates increasing the encrypted signal complexity (strength) by increasing the dynamic carrier bandwidth to accommodate specific user/application related requirements.

Mismatched Keys

Figure 40:
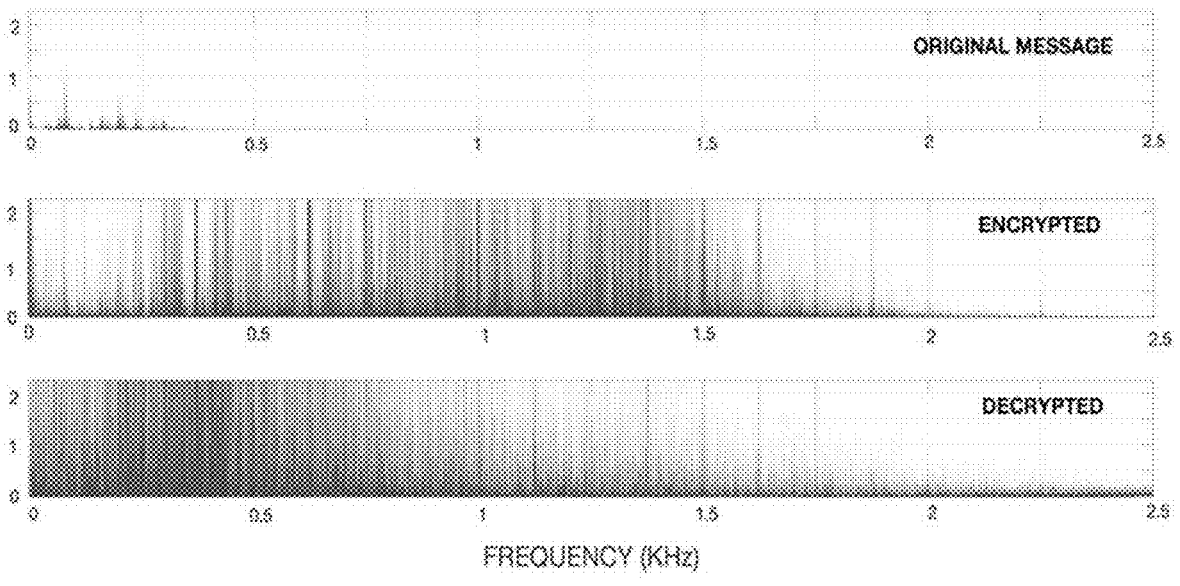
FIG. 40 illustrates an example of power spectra obtained using an encryption and decryption circuit with PLTNM mixer using mismatched keys and includes the spectra for the original message, decrypted message with spectrum that does not match the original message, and encrypted message.

In the frequency domain, the effect of mismatched analog keys is also demonstrated. As a non-limiting example, when the analog key signal presented at 2901 used for decryption is not identical to the analog key signal presented at 201 used for encryption, the power spectrum of the incorrectly decrypted signal will vary significantly from the original message signal. In FIG. 40, the original message signal 200 is shown in the 'Original Message' graph in the top row and the incorrectly decrypted message signal 2952 (decrypted) is shown in the middle row. Note that the power spectrum of each of the two signals is quite distinct. The original message signal is comprised of specific regions of concentrated power at specific frequencies along with other frequency regions displaying much less power. The decrypted message signal has energy spread across a broader spectrum and no longer exhibits the distinctive power spectrum contour of the original message. Although visually the decrypted message signal 2952 appears to be similar to the encrypted message signal at 207 or 2907 in that they both have much broader spectral dispersion than the original message, mathematically, the two signal are relatively uncorrelated (r=−0.212).

The graphs of FIG. 40 were generated using the exact same system and parameters as FIG. 39 except for the application of an analog key signal used for decryption that does not match the analog key signal used for encryption. FIG. 40 illustrates the scenario in which an encrypted signal may be intercepted in transmission or through unauthorized access to a data storage system. However, without the correct (matching) analog key, as well as any required synchronization control signals, the analog encrypted signal cannot be decrypted and the original message signal cannot be deciphered/recovered.

Figure 41:
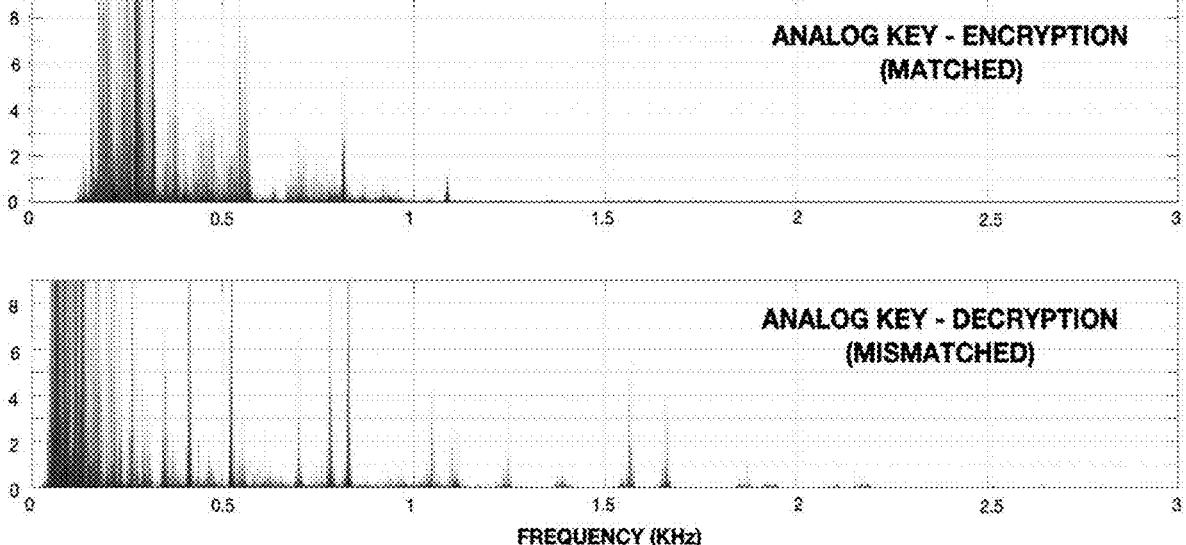
FIG. 41 illustrates the power spectra of the two analog keys used to generate the preceding figures, a matched key for encryption and a mismatched key used for decryption, with the matched key used for both encryption and decryption and, where mismatched keys are used, the matched key is used for the encryption side and the mismatched key is used for decryption.

Power spectra of the two keys used to generate the power spectra illustrated in FIGS. 39 and 40 are shown in FIG. 41 for reference. The 'Matched Key' signal is used for both analog key signal 201 in FIG. 2 and analog key signal 2901 to generate the matched key graphs of FIG. 39. To generate the mismatched power spectrum graphs of FIG. 40 the top matched key was used for analog key signal 201 in FIG. 2, and the lower mismatched key was used for analog key signal 2901 in FIG. 29.

Description of the First Disclosed Embodiment with Data

Encryption/Decryption System Model Results

Note that in the following discussion the pairs of terms "analog key" and "analog key signal," "encrypted signal" and "encrypted message signal," and "decrypted message" and "decrypted message signal" have identical meaning and may be used interchangeably.

Figures 42, 43:
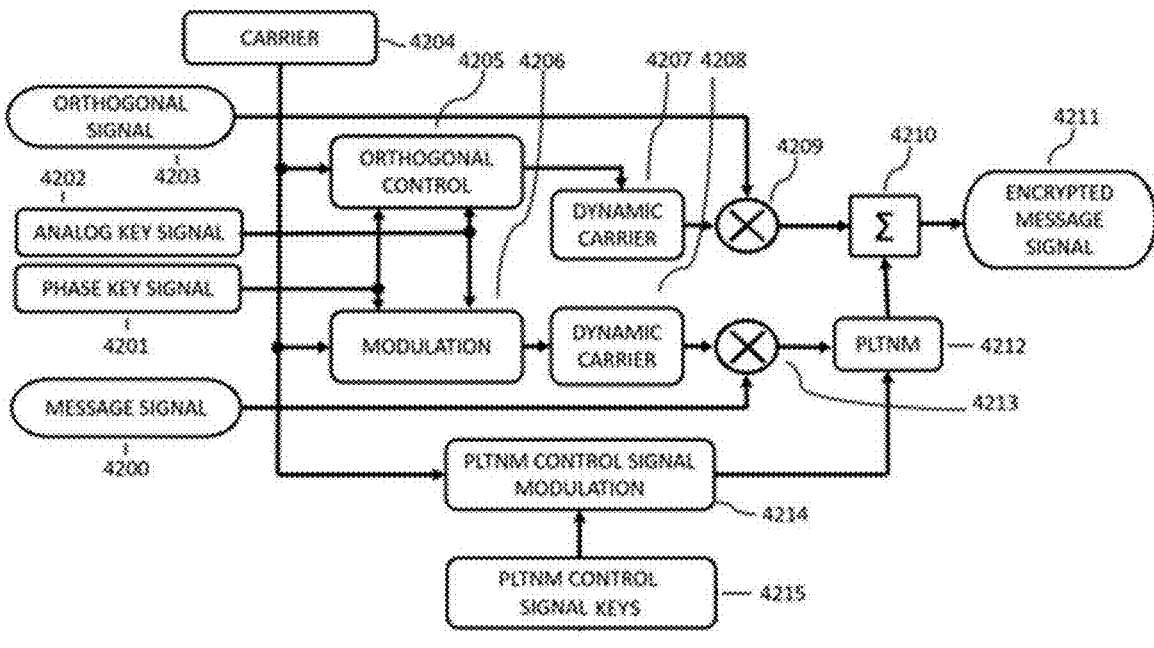
FIG. 42 illustrates the process flow diagram for an encryption system with multiple analog key signals, an orthogonal signal, and a message signal applied.
FIG. 43 illustrates the process flow diagram for a decryption system that corresponds to the encryption system of FIG. 42.

Inputs, outputs, and intermediate signals from a system of FIG. 1 form an encryption device of FIG. 42, combining the basic encryption process illustrated in FIG. 2, with keys converted to dynamic carriers, orthogonal signaling as shown in FIG. 8, and PLTNM circuit utilized with control signals such that if the control signals do not match, encrypted signal complexity and thus security, is maintained. In addition, the PLTNM circuits have, per FIG. 22, a plurality (four (4) shown in this example) of control points possible. This embodiment employs two controls each at both the encryption system and decryption system for each of the PLTNM, where the resistive elements in the resonant circuit and feedback may be varied. Two controls are additionally utilized for the inverse function of PLTNM for both the encryption system and the decryption system. FIG. 43 illustrates the corresponding decryption system where keys are required to match keys utilized for encryption. As presented in the other two detailed embodiments described, an analog key signal 4202 and an additional analog key signal (in this embodiment) termed "Phase Key Signal" 4201 are presented to a modulation block 4206 where the keys modulate, either in frequency or phase as their names imply, a carrier 4204 signal. This modulated carrier (the DC) 4208 is mixed 4213 with the message signal 4200. This is the basic system of the first detailed embodiment described above, but a number of enhancements have been added to this embodiment. The analog key signal 4202 and the phase key signal 4201 are also applied to modulate a carrier 4204 in an orthogonal control block 4205 to produce a second dynamic carrier 4207 that is orthogonal (shifted in phase by 90 degrees or $\pi/2$ radians) relative to the first dynamic carrier 4208, described previously. The $2^{nd}$ dynamic carrier 4207 is mixed, in this specific example using a multiplicative mixer 4209 with the orthogonal signal 4203.

If keys are applied during the decryption process that match keys used during the encryption process, the energy injected into the encrypted signal is removed, otherwise the energy serves as an additional layer making recovery of keys or recovery of the original message more difficult.

A plurality of PLTNM control signals 4215 (four (4) shown in this example) modulate carrier signals 4204 to create modulated carriers for control of the PLTNM circuit in block 4212. This block comprises a series connected pair of PLTNM circuit stages equivalent without limitation to circuits like FIG. 22 and FIG. 23. The mixed 4213 message signal 4200 and DC 4208 passes through the PLTNM circuit and is summed at a summation block 4210 with the signal from mixer 4209 to generate the encrypted message signal 4211.

The encrypted message signal 4211 can be either transmitted to a receiver for decryption or the encrypted signal may be stored for later retrieval. Note that the encrypted message signal is not at baseband but is centered at the carrier frequency. When sent to a receiver device for decryption as depicted in FIG. 43, the encrypted message signal is shown as 4300. Analogous to the encryption system case, an analog key signal 4302 and phase key signal 4301 modulate the frequency and phase of a carrier 4303 via modulator 4304 to produce a dynamic carrier 4305. This DC 4305 is mixed, in this specific embodiment, by a multiplicative mixer 4306 with the encrypted message signal 4300 to produce a version of the encrypted message signal at baseband and at 2× the center frequency. The higher frequency version is filtered 4307 which, if the analog key and phase keys applied for decryption are identical to those applied for encryption, will remove energy contributed by the orthogonal signal 4203 from FIG. 42.

Removal of the orthogonally added signal shown in FIG. 42 originating as 4203 and where the analog key signal 4202 and phase key signal 4201 are modulated in the orthogonal control 4205 is centered in FIG. 43 at orthogonal control 4315. In the decryption case the analog key signal 4302 and phase key signal 4301 along with the encrypted message signal 4300 are shown affecting the orthogonal control 4315. Here rather than an explicit modulation, if the encryption system keys and decryption system keys match, the energy from the orthogonal signal will not be translated at mixer 4306 and will be filtered in filter 4307 so that on further processing at mixer 4308 the signal is no longer present.

This encrypted signal from filter 4307 mixed at mixer 4308 with dynamic carrier 4305 is then shifted from baseband back to the center frequency range by mixer 4308 and dynamic carrier 4305 and is available for processing by the PLTNM circuit represented by block 4309 in which the plurality of control signals (four (4) shown in this example) must match the control signals used in encryption, represented by block 4314 arising from 4313. After completion of PLTNM processing the signal is returned back to baseband by mixer 4310 using dynamic carrier 4305 resulting in decrypted message signal 4312.

This description represents one instant example demonstrating the utility of the methods and devices of the present technology and is not a limiting example. Practitioners skilled in the art will recognize that frequencies and bandwidths can be scaled, thereby increasing or reducing complexity of the various signals and encryption strength based on the needs of the individual application within the bounds of the present technology.

The particular embodiment utilized to generate the data for FIGS. 44-49 includes the basic encryption device of FIG. 2, but with the addition of an orthogonal signal added for increased energy when keys do not match between encryption system and decryption system, and the addition of the PLTNM circuit with multiple parallel independent real-time controls that both require matching between encryption system and decryption system, and where additional energy provided to the encryption signals exhibits higher-order non-linear characteristics.

Time Domain

Matched Keys

Figure 44:
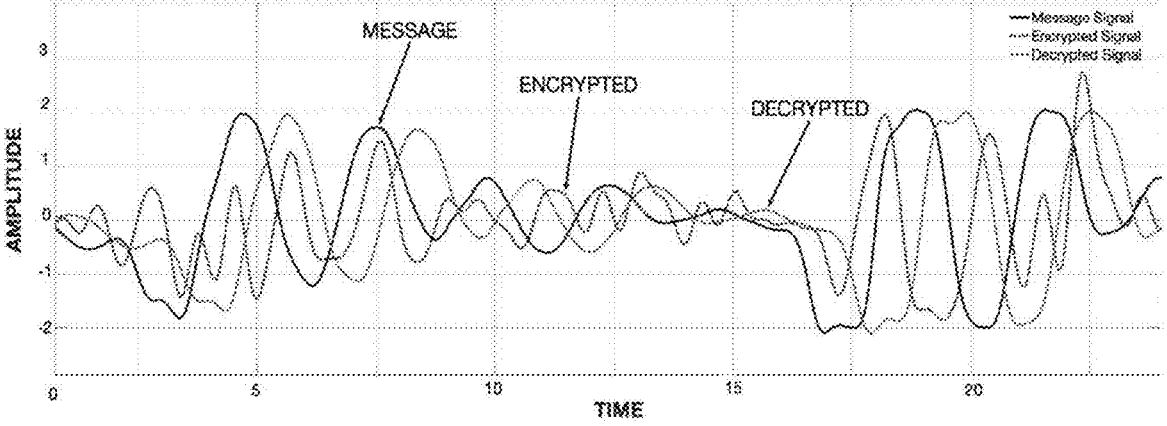
FIG. 44 illustrates the resultant time domain waveforms for the complex encryption-decryption system illustrated in FIGS. 42 and 43 with matching encryption and decryption keys.

FIG. 44 is a time domain (signal amplitude over time rather than a frequency distribution) illustration of the result of reducing to practice FIG. 1 using the encryption device utilizing the general information describing the encryption process depicted in FIG. 42, and the decryption process depicted in FIG. 43. The analog key(s) presented to both the encryption device and the decryption device as well as the control signals must match in order to successfully recover the original message.

As described previously, the Pearson correlation coefficient (Pearson r) provides an objective means to quantify how well two waveforms correlate to each other—it essentially quantifies the similarity between the waveforms.

Note that the decrypted signal (somewhat time-delayed relative to the message signal, due to filter 4311 shown in FIG. 43) is highly correlated with the message signal (r=0.996). In this case, the analog key signal (uncorrelated with the message (r=0.048) (see FIG. 46), decrypted (−0.001) and encrypted (−0.001) signals) is applied to the encryption device 4202 in FIG. 42. The message signal (FIG. 42), applied as signal 4200 to produce the encrypted signal 4211 (FIG. 42).

The encrypted message signal 4211 4300 does not correlate with either the message signal 4200 (r=0.040), the analog key signal 4202 4302 (r=−0.001), or the decrypted message signal 4312 (r=0.042).

Mismatched Keys

In a key-based encryption system, the key used for decryption must match (be identical to) the key used for encryption in order for the message signal to be retrieved. "Retrieved", in this context, means that the encrypted signal is decrypted to recover the original message. If the signal applied as a key for decryption does not match the key used for encryption, the original message cannot be decrypted or recovered.

Figure 45:
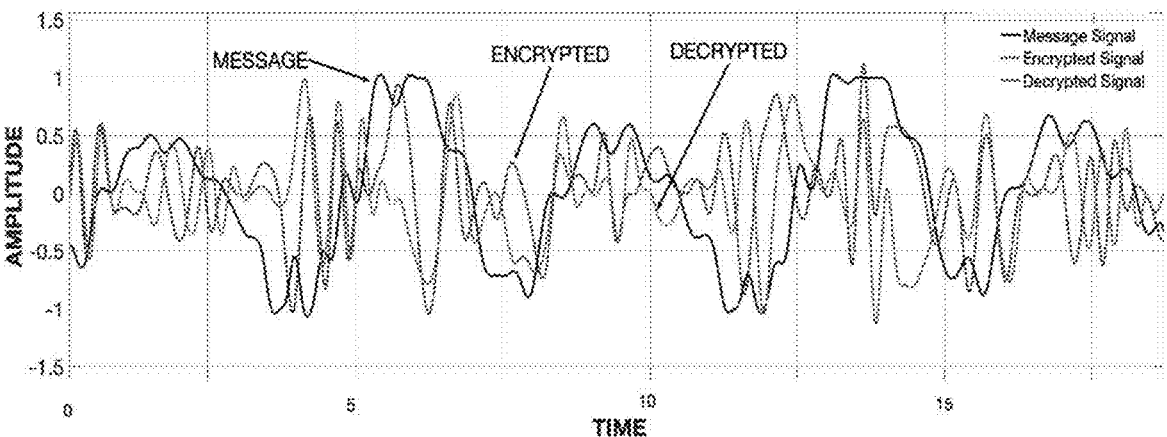
FIG. 45 illustrates the resultant time domain waveforms for the complex encryption-decryption system illustrated in FIGS. 42 and 43 with the encryption and decryption keys mismatched.

FIG. 45 illustrates the signals produced from the system depicted in FIG. 1 and the encryption process utilizing the general information depicted in FIG. 42, and decryption process depicted in FIG. 43, in which the key applied for decryption is not identical (mismatched) to the key applied for encryption. FIG. 45 illustrates a message signal 4200 encrypted by an analog key 4202 to generate an encrypted message signal 4211. The message signal and encrypted signal (encrypted message signal) are highly uncorrelated (r=0.040).

When the encrypted message signal 4211 is presented as encrypted message signal 4300 to the decryption device (FIG. 43), and the analog key signal 4302 is not identical to analog key 4202 utilized for encryption, the decrypted message signal 4312 (decrypted signal, decrypted) in FIG. 45, as a non-limiting example, is generated that has essentially no correlation with the original message signal 4200 (r=0.023) (i.e. it bears no resemblance to the original message signal 4200 waveform). The original message signal 4200 cannot be detected or recovered (decrypted) from the encrypted signal using the wrong key, 4302 (not identical to the key applied for encryption) and is thus protected from unauthorized access.

Figure 46:
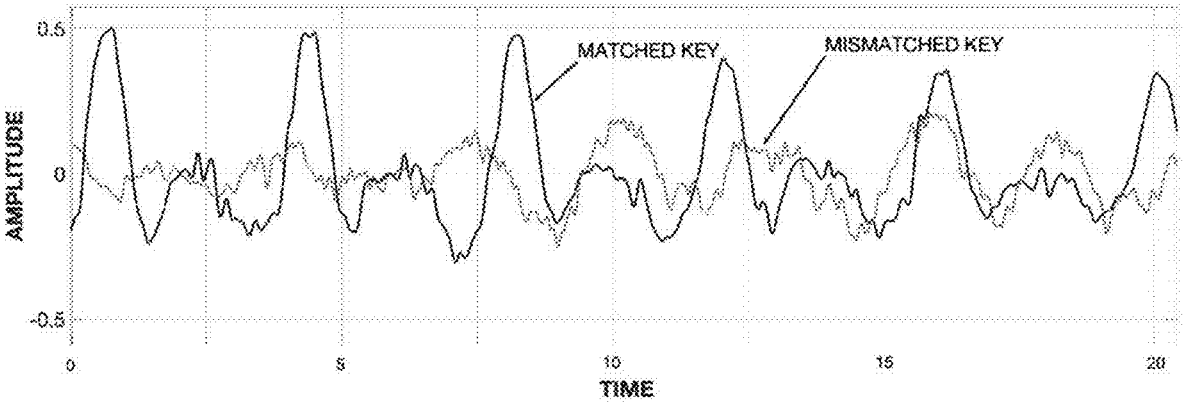
FIG. 46 illustrates the matched key used for both encryption and decryption, and the mismatched key used for decryption over a representative time segment only for the encryption system of FIG. 42 and decryption system of FIG. 43.

FIG. 46 compares representative time segments of both the matched key shown in FIG. 44 and utilized when generating the data for FIG. 36 for both analog key signal 4202 in FIG. 42 and analog key signal 4302 in the decryption process depicted in FIG. 43. The "mismatched key" or signal shown in FIG. 46 is used for analog key signal 4301 in the decryption process depicted in FIG. 43 when generating data for FIG. 45.

The analog key signal applied for both encryption and decryption to obtain the results depicted in FIG. 44 are identical, illustrated as the waveform labeled "MATCHED KEY." The analog key signal applied for encryption and decryption to obtain the results illustrated in FIG. 45 are the two different waveforms labeled "MATCHED KEY" and "MISMATCHED KEY," respectively. Although only a representative time segment is depicted in FIG. 46, the two signals (labeled "MATCHED KEY" and "MISMATCHED KEY") applied as analog keys are uncorrelated (r=−0.029) over their entire time course.

Frequency Domain

The time domain results illustrate the relationship between signals in the encryption/decryption system as they vary over time. The frequency domain analyses provide another means to examine the relationships between the various encryption and decryption device signals. The power spectrum quantifies the relative power contribution from individual frequencies that comprise the time domain waveform.

Matched Keys

Figure 47:
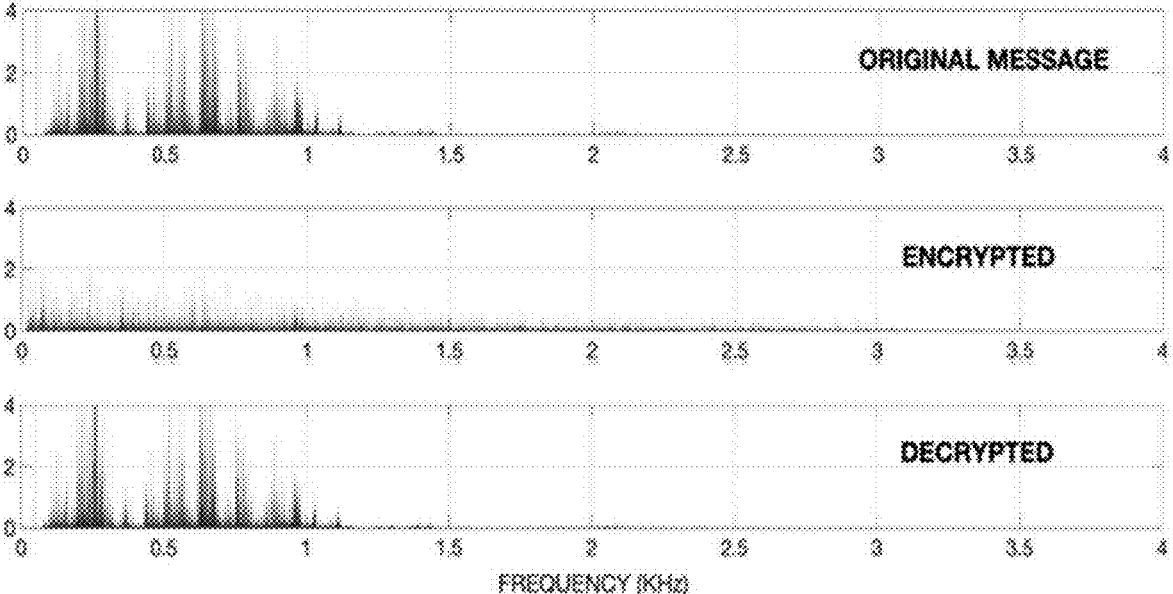
FIG. 47 illustrates the power spectra from the complex encryption-decryption system.

FIG. 47 illustrates the power spectrum of the original message signal 4200, the decrypted message signal (decrypted) 4312, and the encrypted message signal (Encrypted), both 4211 and 4300. When the encryption analog key 4202 matches the analog key 4302 used for decryption, the power spectrum of decrypted message 4312 matches the power spectrum of the original message signal 4200. for the encrypted message signal 4211, the power spectra are more evenly distributed across a broader bandwidth as compared to the original message signal 4200. Where the message signal 4200 had significant energy in fewer frequency bands, that energy has been spread across a wider spectrum. There is also additional frequency content from the key-modulated carrier(s). The amount of spectrum used is a tunable parameter in a preferred embodiment and, as such provides an analog key "sensitivity" adjustment that impacts the frequency and phase modulation in the generation of the dynamic carrier and, thus, the encrypted signal. This adjustment facilitates increasing the encrypted signal complexity (strength) by increasing the dynamic carrier bandwidth to accommodate specific user/application related requirements.

Mismatched Keys

Figure 48:
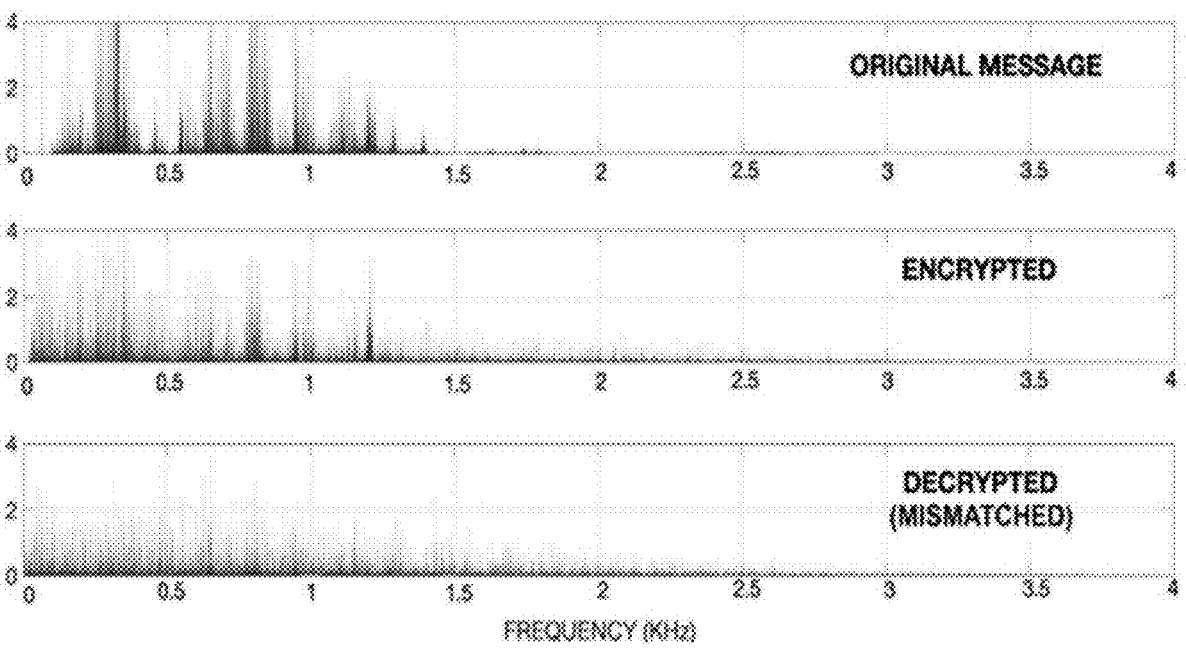
FIG. 48 illustrates an example of power spectra from the complex encryption-decryption system and PLTNM analog key-driven additional protection.

In the frequency domain, the effect of applying mismatched analog keys is also demonstrated. As a non-limiting illustration, when the analog key signal presented at 4202 for encryption is not identical to the analog key signal presented at 4302 for decryption, the power spectrum of the incorrectly decrypted signal will vary significantly from the original message signal. In FIG. 48, the power spectra of the original message signal 4200 is shown in the 'Original Message' graph in the top row and the power spectra of the incorrectly decrypted message signal 4312 (decrypted) is shown in the middle row. Note that the power spectrum of each of the two signals is quite distinct. The original message signal is comprised of specific regions of concentrated power at specific frequencies along with other frequency regions with much less power. The decrypted message signal has energy spread across a broader spectrum and no longer exhibits the distinctive power spectrum contour of the original message. Although visually the decrypted message signal 4312 appears to be similar to the encrypted message signal at 4211 or 4300 in that they both have much broader spectral dispersion than the original message, the Pearson cross-correlation analysis indicates that the two signals are uncorrelated (r=−0.021).

FIG. 47 and FIG. 48 illustrate the output of systems identical in all aspects, except, in FIG. 47, the encryption and decryption analog keys match. In FIG. 48 the encryption and decryption analog keys do not match. FIG. 48 illustrates the scenario in which an encrypted signal may be intercepted in transmission or through unauthorized access to a data storage system. However, without the correct analog key, as well as any required synchronization control signals, the analog encrypted signal cannot be decrypted and the original message signal cannot be recovered.

Figure 49:
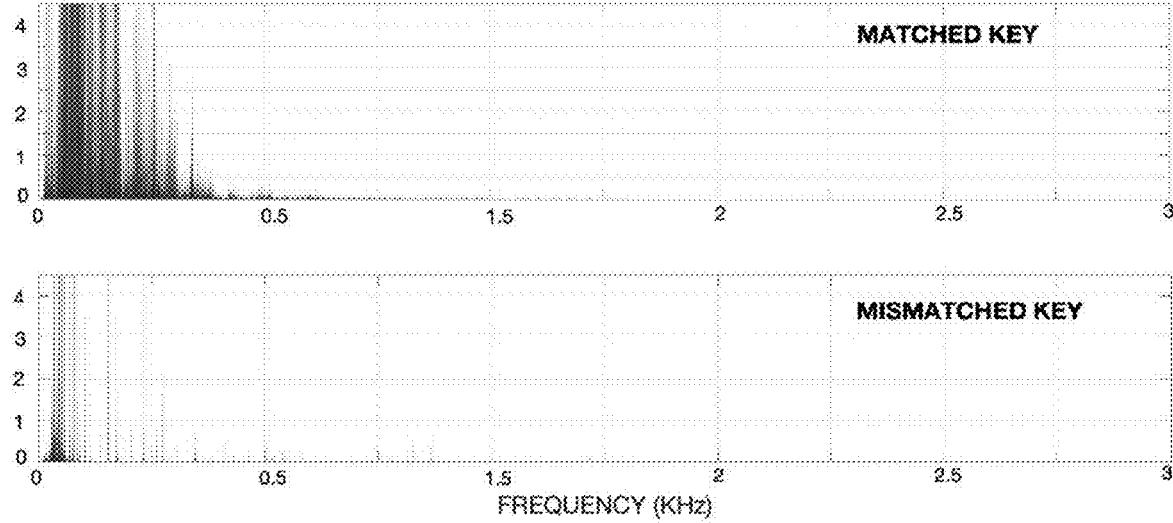
FIG. 49 illustrates the power spectra of the two analog keys used to generate the preceding figures.

Power spectra of the two keys used to generate the signals analyzed in FIGS. 47 and 48 are shown in FIG. 49 for reference. The 'Matched Key' signal is used for both analog key signal 4202 in FIG. 42 and analog key signal 4302 to generate the matched key graphs of FIG. 47. To generate the mismatched power spectrum graphs of FIG. 48 the top matched key was used for analog key signal 4202 in FIG. 42, and the lower mismatched key was used for analog key signal 4302 in FIG. 43.

Expanded Configurations of PLTNM for Encryption

The PLTNM blocks in FIGS. 42 and 43 (4212 and 4309 respectively) can be made to indicate a number of configurations of PLTNM circuits for different levels of encryption. In a first embodiment both could be simple PLTNM as shown in FIG. 22 for example, resulting in matched delays at both encryption system and decryption system. In a second embodiment the circuit at 4212 could be made to match FIG. 22, while 4309 on the other side of the encryption barrier is made to match FIG. 23.

Additional opportunities arise when block 4212 contains a circuit of FIG. 22 followed by a circuit of FIG. 23, and block 4309 then also contains the circuitry of FIG. 22 followed by FIG. 23. Order of the two circuits indicated by the figures within either block is not important. If component values and analog control keys all match, then the message signal simply passes through with gain, but with changes in analog control key values and component values encryption may be enhanced. In particular, the configuration where component values of the FIG. 22 of 4212 match FIG. 23 of 4309, and these are different from what are another matched set of FIG. 23 of 4212 and FIG. 22 of 4309 provides enhanced encryption. Determination of what types of analog control keys to apply to what control points also plays a critical role, but is beyond the scope of this document.

Additional Results Analyses: Spectral Coherence and Cross-Spectrum Phase

As discussed previously two additional signal analyses compare the original message signal to both the encrypted and decrypted signal following the application of both "Matched" (identical to the key used for encryption) and "Mis-Matched" analog security keys for decryption. These analyses support assertions regarding simultaneous effects of the encryption process on multiple signal characteristics (e.g., frequency and phase) on the original message signal depicted relative to both the encrypted and decrypted signals.

Spectral Coherence quantifies the frequency-domain correlation between signals from zero ("0") (uncorrelated) to one ("1") representing the correlation (y-axis) plotted against frequency (x-axis).

Figure 50:
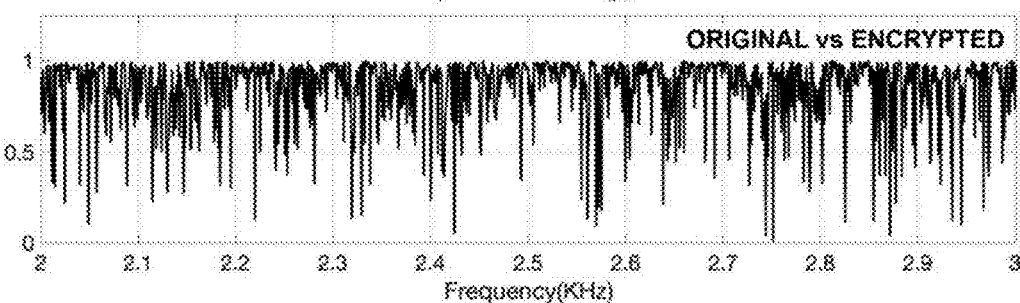
FIG. 50 illustrates the spectral coherence for a PLTNM plus multiplicative mixer encryption-decryption system with matching analog keys.
Figure 50:
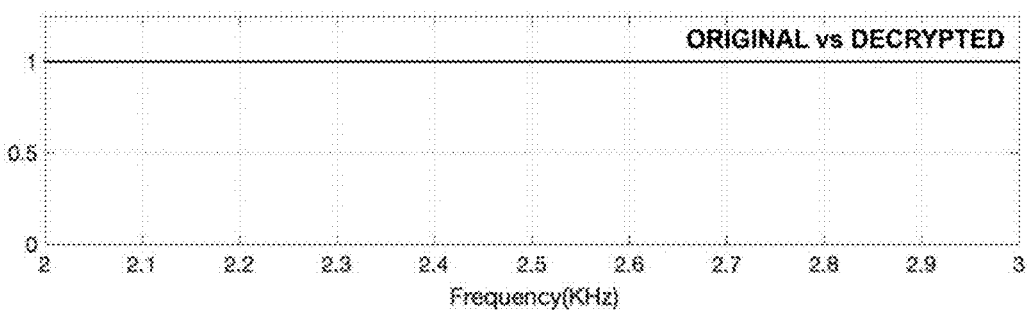

The spectral coherence results for a PLTNM plus multiplicative mixer encryption-decryption system (including FIGS. 21 and 22) in which the encryption and decryption keys match is illustrated in FIG. 50 for a limited frequency band (2.0 kHz-3.0 kHz). The top illustration depicts the spectral coherence between the original message signal and the encrypted signal. The bottom illustration depicts spectral coherence relative to frequency between the original message signal and the decrypted signal.

Figure 51:
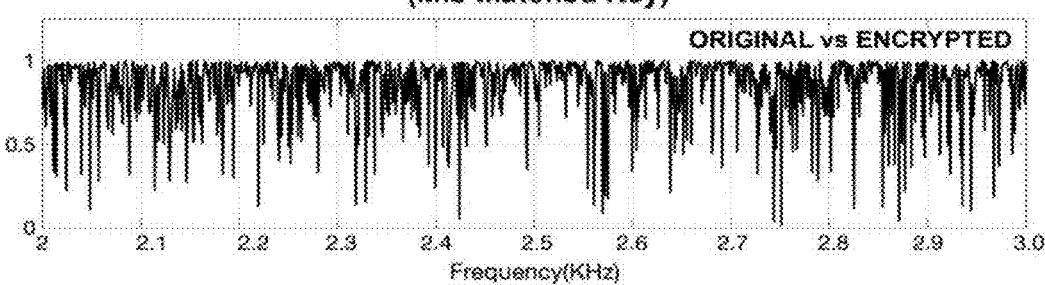
FIG. 51 illustrates the spectral coherence for a PLTNM plus multiplicative mixer encryption-decryption system with mis-matching analog keys.
Figure 51:
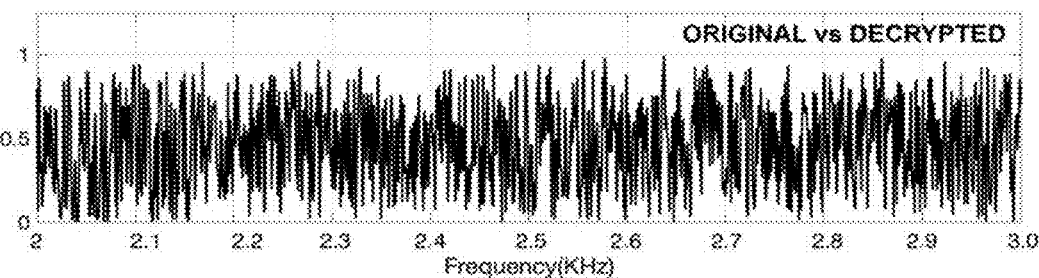

The spectral coherence results for a PLTNM plus multiplicative mixer encryption-decryption system (including FIGS. 21 and 22) in which the encryption and decryption keys do not match are illustrated in FIG. 51 for a limited frequency band (2.0 kHz-3.0 kHz). The top illustration depicts the spectral coherence relative to frequency between the original message signal and the encrypted signal. The bottom illustration depicts spectral coherence relative to frequency between the original message signal and the decrypted signal.

Figure 52:
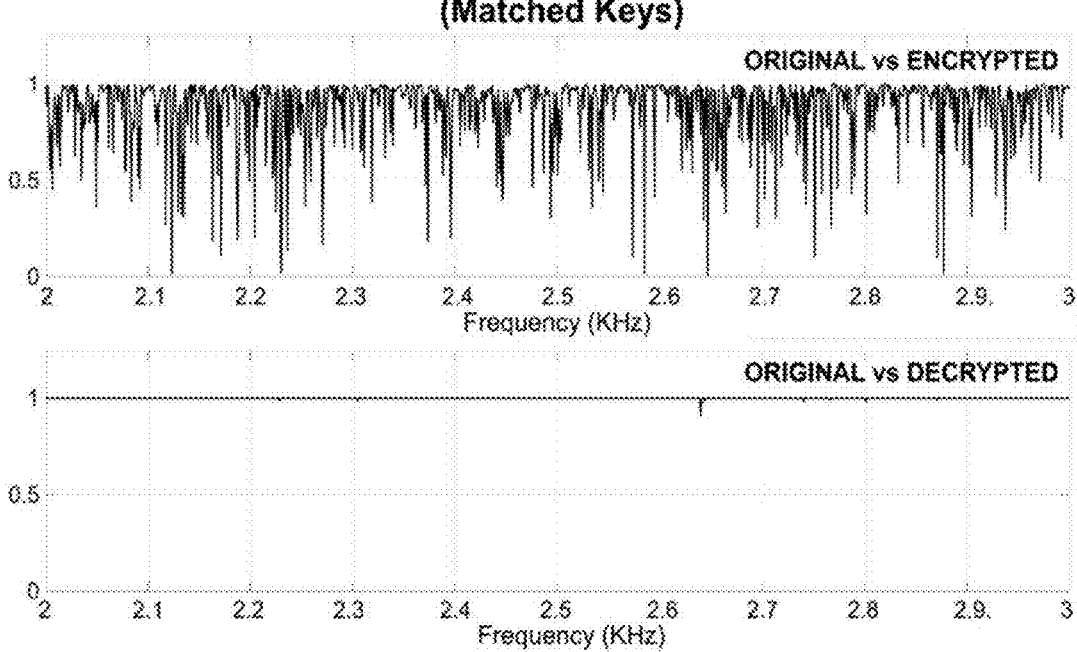
FIG. 52 illustrates the spectral coherence for a PLTNM plus multiplicative mixer encryption-decryption system with orthogonality and with matching analog keys.

The spectral coherence results for a PLTNM plus multiplicative mixer encryption-decryption system with orthogonal masking added, in which the encryption and decryption keys match, are illustrated in FIG. 52 for a limited frequency band (2.0 kHz-3.0 kHz). The top illustration depicts the spectral coherence relative to frequency between the original message signal and the encrypted signal. The bottom illustration depicts spectral coherence relative to frequency between the original message signal and the decrypted signal.

Figure 53:
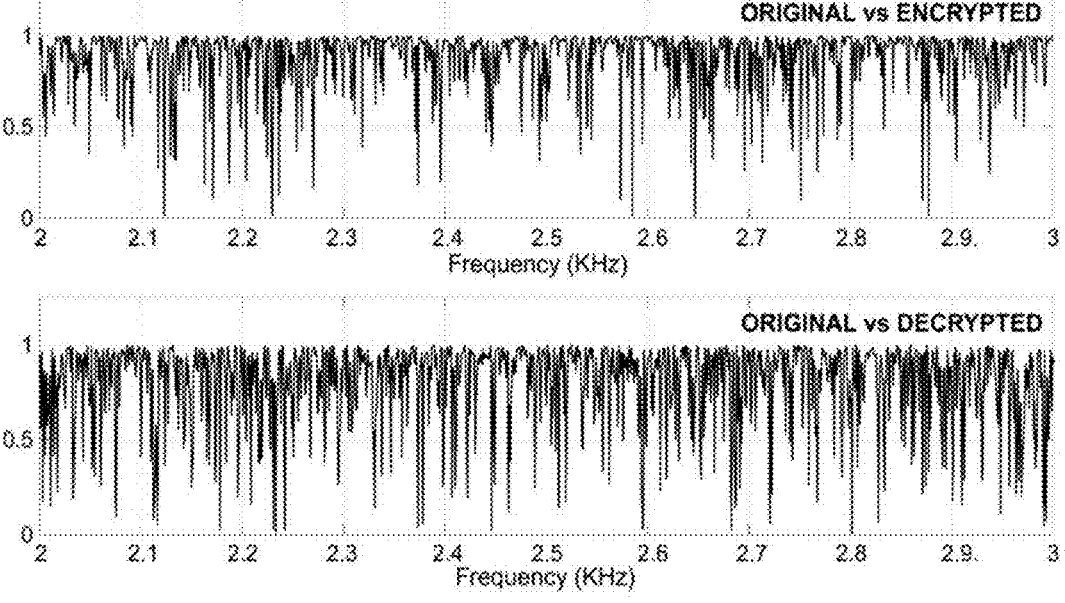
FIG. 53 illustrates the spectral coherence for a PLTNM plus multiplicative mixer encryption-decryption system with orthogonality and with mis-matching analog keys.

The spectral coherence results for a PLTNM plus multiplicative mixer encryption-decryption system with orthogonal masking added, in which the encryption and decryption keys do not match, are illustrated in FIG. 53 for a limited frequency band (2.0 kHz-3.0 kHz). The top illustration depicts the spectral coherence relative to frequency between the original message signal and the encrypted signal. The bottom illustration depicts spectral coherence relative to frequency between the original message signal and the decrypted signal.

Cross-Spectrum Phase: estimates the relative phase in degrees (y-axis) between the signal spectral (frequency) components (x-axis).

Figure 54:
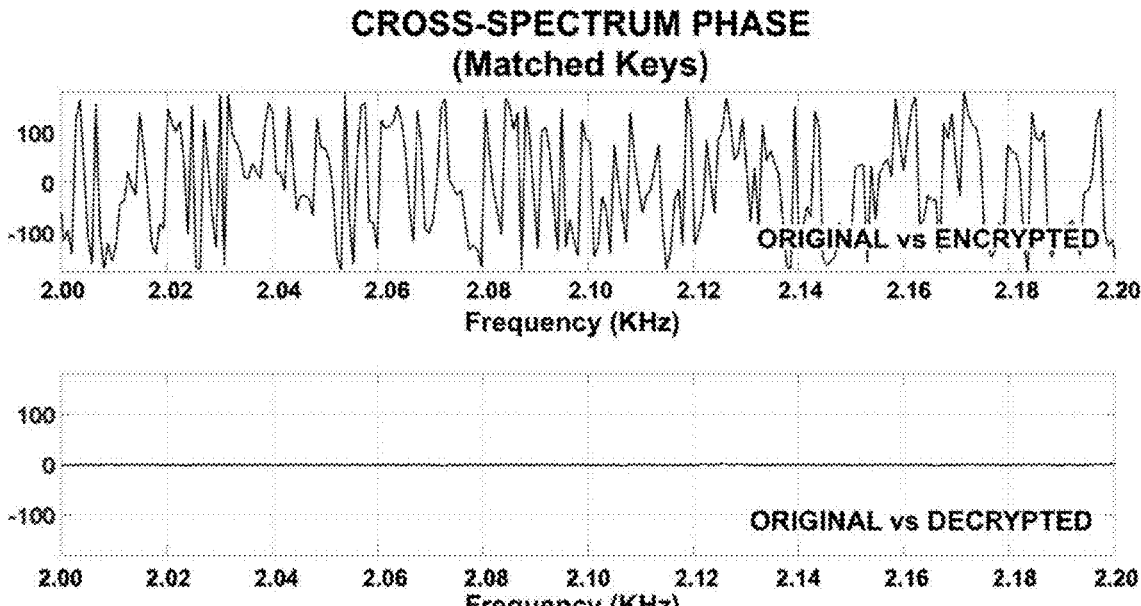
FIG. 54 illustrates the cross-spectrum phase plots for the spectrum of FIG. 50.

The cross-spectrum phase results for a PLTNM encryption-decryption system (FIGS. 21 and 22) in which the encryption and decryption keys match are illustrated in FIG. 54 for a limited frequency band (2.0 kHz-2.2 kHz). The top illustration depicts the cross-spectrum phase relative to frequency between the original message signal and the encrypted signal. The bottom illustration depicts cross-spectrum phase relative to frequency between the original message signal and the decrypted signal.

Figure 55:
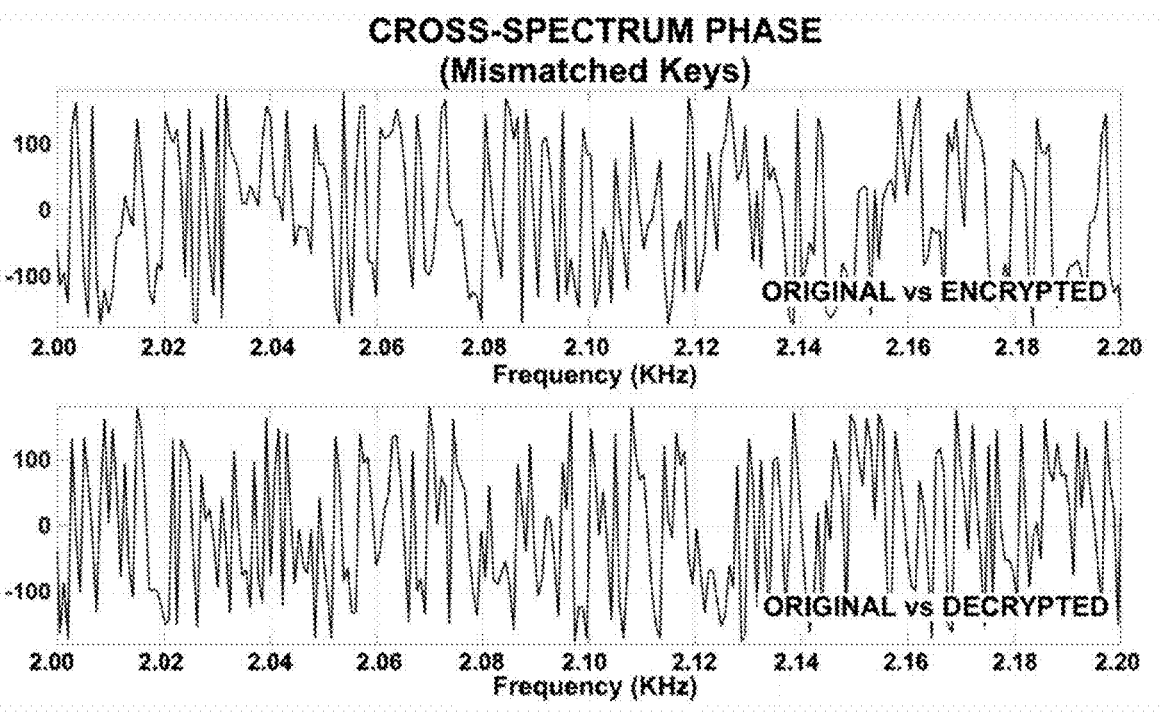
FIG. 55 illustrates the cross-spectrum phase plots for the spectrum of FIG. 51.

The cross-spectrum phase results for a PLTNM encryption-decryption system (FIGS. 21 and 22) in which the encryption and decryption keys do not match are illustrated in FIG. 55 for a limited frequency band (2.0 kHz-2.2 kHz). The top illustration depicts the cross-spectrum phase relative to frequency between the original message signal and the encrypted signal. The bottom illustration depicts cross-spectrum phase relative to frequency between the original message signal and the decrypted signal.

Figure 56:
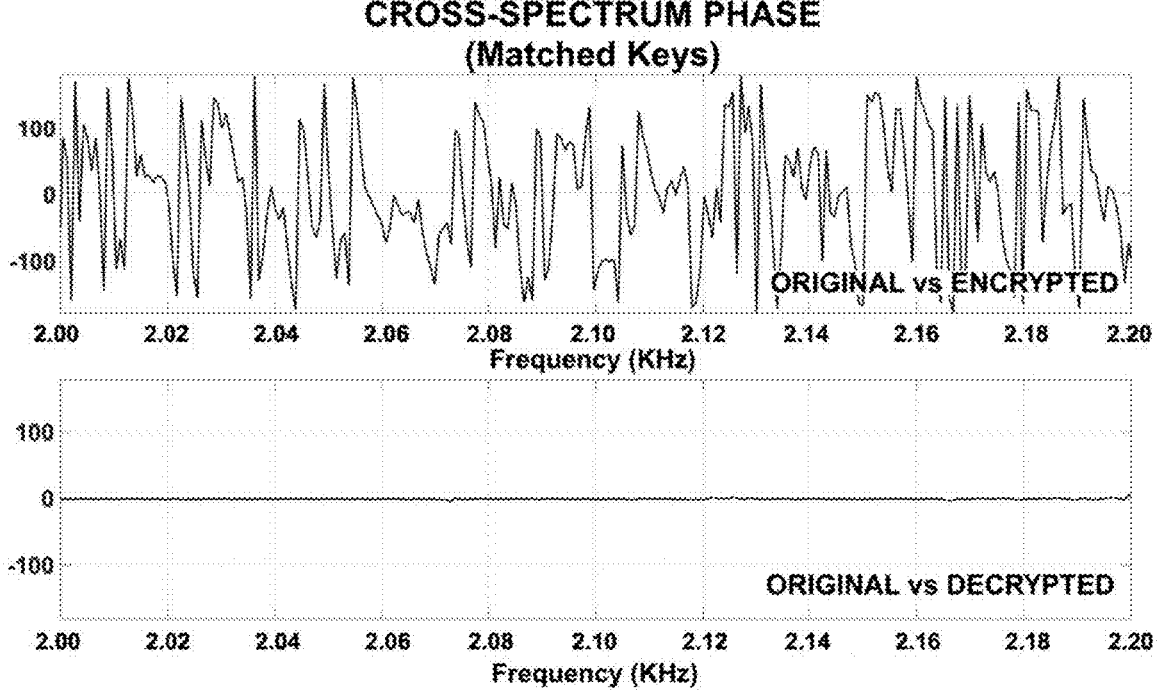
FIG. 56 illustrates the cross-spectrum phase plots for the spectrum of FIG. 52.

The cross-spectrum phase results for a PLTNM encryption-decryption system with orthogonal masking added, in which the encryption and decryption keys match, are illustrated in FIG. 56 for a limited frequency band (2.0 kHz-2.2 kHz). The top illustration depicts the cross-spectrum phase relative to frequency between the original message signal and the encrypted signal. The bottom illustration depicts cross-spectrum phase relative to frequency between the original message signal and the decrypted signal.

Figure 57:
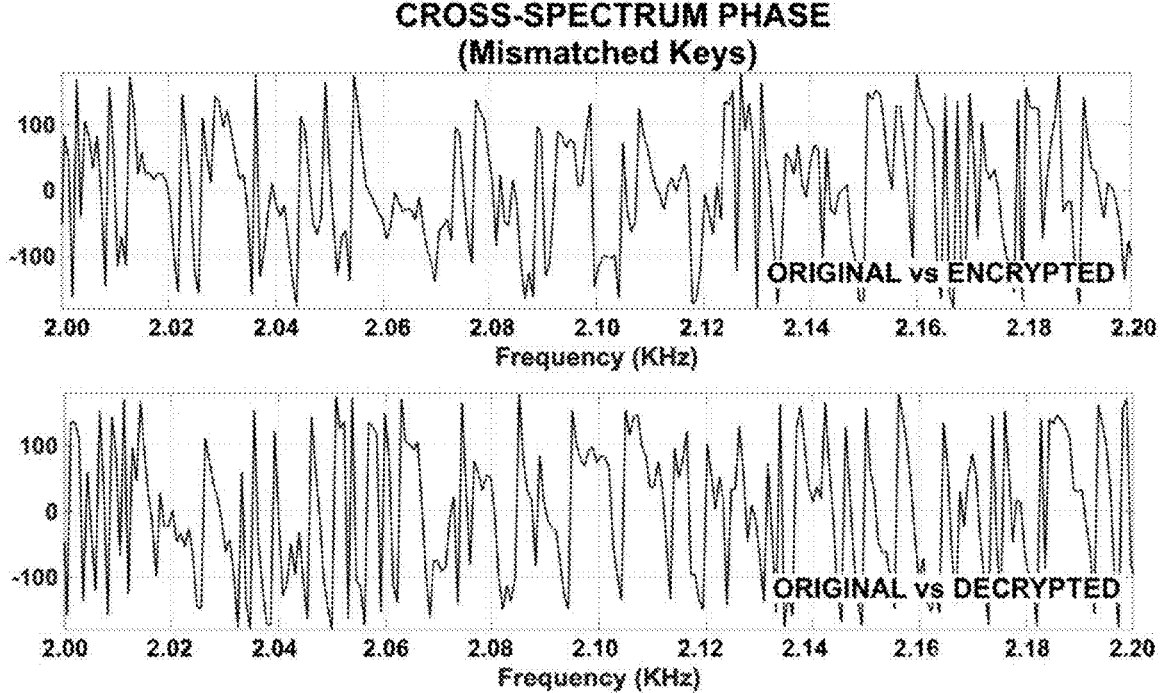
FIG. 57 illustrates the cross-spectrum phase plots for the spectrum of FIG. 53.

The cross-spectrum phase results for a PLTNM encryption-decryption system with orthogonal masking added, in which the encryption and decryption keys do not match, are illustrated in FIG. 57 for a limited frequency band (2.0 kHz-2.2 kHz). The top illustration depicts the cross-spectrum phase relative to frequency between the original message signal and the encrypted signal. The bottom illustration depicts cross-spectrum phase relative to frequency between the original message signal and the decrypted signal.

Additional Results Analyses: Bit Error Rate (BER)

Systems utilizing or handling digital data are concerned with the integrity of that data, and one commonly utilized measure of that integrity is Bit Error Rate (BER). BER is generally used for communication channels rather than encryption systems, but it is a useful measure when looking at the fidelity of correctly decrypted signals relative to the original message signal. BER is defined as the percentage of bits in a stream of bits that are incorrect over a given time period.

BER results for an embodiment of the present technology utilizing binary phase-shift keying (BPSK) to translate digital bits to analog for presentation to the encryption system (and the reverse at the end after decryption) are BER=0.485546875 for original message versus encrypted message, and 0.000000000 for original message versus decrypted message. This simulation used matching encryption and decryption analog keys. The BER for original message versus encrypted message will trend to 0.50 over large samples as this is the probability of a "1" changing to a "0" or a "0" changing to a "1" randomly.

BER results for an embodiment of the present technology utilizing binary phase-shift keying (BPSK) to translate digital bits to analog for presentation to the encryption system in the analog domain (and the reverse at the end after decryption) are BER=0.485578125 for original message versus encrypted message, and 0.47859375 for original message versus decrypted message in which the simulation applied mis-matching encryption and decryption analog keys. In this case because the keys for encryption and decryption did not match, the decrypted signal should not match the original message, and the BER shows that it does not, with an error rate approaching 50% which is to be expected.

BER results for an embodiment of the present technology utilizing 1) binary phase-shift keying (BPSK) to translate digital bits to analog for presentation to the encryption system (and the reverse at the end after decryption) and 2) applying partial (50%) orthogonal masking, are BER=0.48565625 for original message versus encrypted message, and 0.127953125 for original message versus decrypted message. In this simulation, the encryption and decryption analog keys matched, but partial orthogonal masking was applied. Although the keys for encryption and decryption match, the decrypted signal should still not completely match the original message with a BER of about 13% while the BER between the original message and the encrypted indicated the expected error rate approaching 50%.

In contrast with, for example, a simple communication system utilizing orthogonal carriers, the present system does not require generation of the orthogonal carrier for decryption, as the second encryption signal is used to add additional energy to increase encryption strength rather than carry a separate channel of data. If the analog key signal used for encryption matches the analog key signal for decryption, the 'in-phase' channel will be decoded and the orthogonal channel will be removed.

PLTNM

The PLTNM or Phase Linked Non-linear Modulation circuit, as described hereinabove, is a versatile circuit element for encryption and decryption. In a disclosed embodiment with reference to FIG. 58 hereinbelow and the associated description, encryption is facilitated comprising two blocks, each block comprising multiple components. Each of the two PLTNM sub-circuits (PLTNM$_A$ and PLTNM$_B$) each has an input, an output, and a control input. The reason for using pairs of PLTNM circuits will become apparent later in this description.

PLTNM is a circuit where the overall transfer function from each input to output can be varied in two different ways. The first is by variation of the analog control signal at each control input. A particular embodiment will be described later where each control input controls a variable resistance to modify circuit characteristics. A second method is by use of different circuit component values. A combination of these methods may be used.

Where variation of the overall transfer function is performed by changes in the analog control signal, it is important that the circuit transfer function for the sum of both parts of PLTNM in series, when the analog control signal is at some neutral value, be unity to pass the input signal through to the output unchanged, except in response to the control input(s). The two serial blocks or parts (PLTNM$_A$ and PLTNM$_B$ of the PLTNM circuit) do not each have unity gain and frequency response, but by combining the two circuits (PLTNM$_A$ and PLTNM$_B$) serially, unit gain/frequency responses are obtained. This requires that the transfer function of one of the blocks be the reciprocal (inverse) of the other. In this way signals passing from the PLTNM input through both PLTNM$_A$ and PLTNM$_B$ where the analog control signals for both parts are at a static value chosen from values across the range of control input values, will arrive at the PLTNM output unchanged from the PLTNM input.

Extending the Dynamic Frequency Range of PLTNM Circuits

The PLTNM circuits each have values that, at one or more frequencies, cause the denominator of the transfer function of the circuit to be zero, generating a resonant frequency ("pole"). The non-linear dynamic PLTNM modulation occurs within limited frequency bands adjacent to the circuit resonant frequency or frequencies (See FIGS. 15A/B).

The frequency range of the dynamic bandwidth of a PLTNM circuit that produced $2^{nd}$ order (or greater) non-linear modulation can be increased by the following, non-limiting examples of methods:

1) using two (2) PLTNM sub-circuits with different dynamic bandwidths to extend the frequency range over which $2^{nd}$-order (or greater) modulation occurs.
2) implementing a PLTNM circuit with two or more different center frequency ranges (FIGS. 16A/B) or
3) by cascading multiple PLTNM circuits (FIG. 17).

PLTNM Circuit Detailed Description

Figure 58:
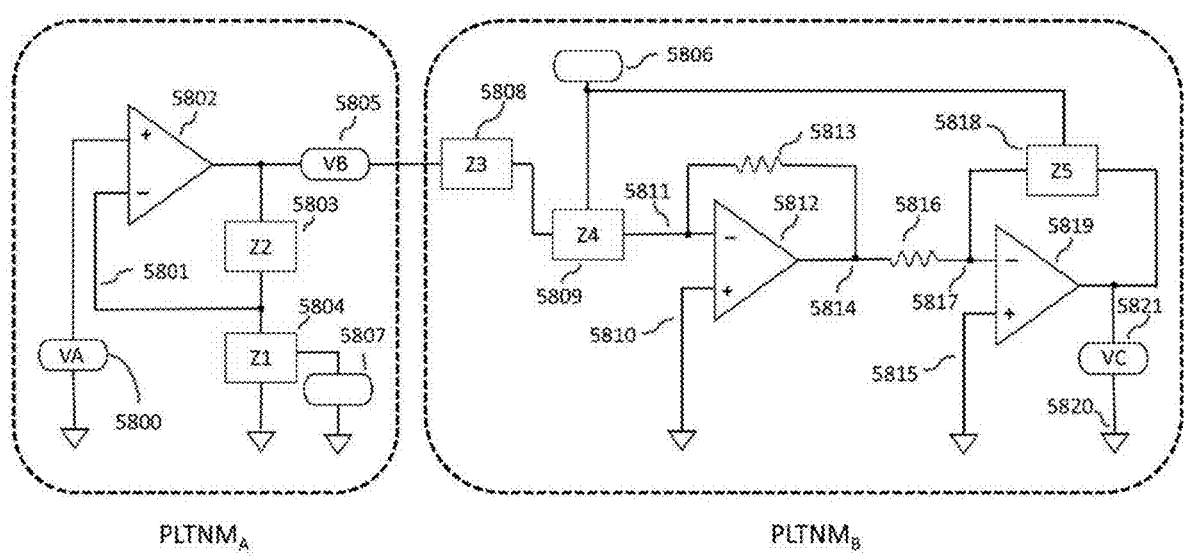
FIG. 58 illustrates an example of a PLTNM circuit diagram.

FIG. 58 shows a non-limiting example of a PLTNM circuit comprised of two PLTNM circuits disposed in series, PLTNM$_A$ and PLTNM$_B$ sections. PLTNM$_A$ is the section from PLTNM input signal 5800 indicated as VA up to an intermediate output signal 5805 indicated as VB. This corresponds to the circuit described hereinabove with respect to FIG. 20 used for encryption. PLTNM$_B$ is the section from 5808 indicated as receiving an input from the PLTNM$_A$ output VB to provide a PLTNM$_B$ output signal 5821 indicated as VC. This PLTNM$_B$ circuit corresponds to the circuit of FIG. 23.

PLTNM$_A$ is a non-inverting amplifier configuration with operational amplifier 0102, an input to the non-inverting input of the amplifier 5800 designated as VA, and a feedback loop from amplifier output to negative input 0101 through impedance Z2 indicated as 5803. Completing the non-inverting amplifier configuration is an impedance to signal ground from the amplifier inverting input. This impedance, Z1, indicated as 5804, has its impedance controlled by control voltage 5807. Control voltage 5807 is the dynamic control voltage input for PLTNM$_A$. Note that both Z1 and Z2 are compound impedances, and where Z1 includes a variable component. The overall transfer function for PLTNM$_A$ where control voltage 5807 is at a nominal value is:

$$TF_{PLTNMA} = \frac{V_B}{V_A} = 1 + \frac{Z_2}{Z_1} = \frac{Z_1 + Z_2}{Z_1}$$

Where the term 'nominal value' is given, it is intended, without limitation, as either zero volts or another static voltage that causes the remainder of the circuit to operate within normal limits. The nominal value is a level that allows other changes to occur where the results of those changes can be observed.

PLTNM$_B$ is a composite of two amplifiers with input at 5805 indicated as VB, and output at 5821 indicated as VC. The first section is a classic inverting amplifier with gain– 1*resistance 5813 divided by the sum of Z4 indicated as 5809 and Z3 indicated as 5808. Elements 5808 and 5809 are placed in series from the stage input at VB or 5805 to the inverting input of operational amplifier 5812. The non-inverting input of the amplifier goes to signal ground or through some balancing impedance to signal ground. Element 5813 is in the feedback loop from operational amplifier 5812's output to the inverting input at signal 5811. Element 5809 and (explained hereinbelow) 5818 have variable impedances that are controlled by control voltage 5806. Control voltage 5806 is the dynamic control voltage input for PLTNM$_B$. Although it is possible for the control voltages for elements 5818 and 5809 to be different, for this non-limiting example and to illustrate possible transfer functions, the same signal (analog control voltage), 5806 is applied at both inputs. Following the output of operational amplifier 5812 is another inverting amplifier stage with gain set at G=−1 (variable impedance Z5 designated 5818)/(resistor 5816). Although the general case could be calculated by one skilled in the art, it is more illustrative to calculate a non-limiting specific case of the transfer function where control voltages are nominal and:

$$Z3 = Z2$$

$$Z4 = Z5 = Z1$$

$$5813 \text{ Impedance} = 5816 \text{ Impedance}$$

The overall transfer function for PLTNM$_B$ then is:

$$TF_{PLTNMB} = \frac{V_C}{V_B} = (-1) * \left(-\frac{Z_1}{Z_1 + Z_2}\right) = \frac{Z_1}{Z_1 + Z_2}$$

At nominal values of the control voltages, the overall transfer function for PLTNM with the combination of PLTNM$_A$ and PLTNM$_B$ is then:

$$TF_{OVERALL} = \frac{V_C}{V_A} = \frac{V_B}{V_A} \times \frac{V_C}{V_B} = \frac{Z_1 + Z_2}{Z_1} \times \frac{Z_1}{Z_1 + Z_2} = 1$$

Thus, if the transfer function of PLTNM$_B$ is the inverse transfer function of PLTNM$_A$, it would be expected that the overall transfer function would be unity. As such, an input signal input of PLTNM$_A$ would result in the same input signal on the output of PLTNM$_B$. If PLTNM$_A$ is used to encrypt a message signal for output on output 5805, VB, then PLTNM$_B$ will decrypt that signal. As long as the impedance values are the same for both the non-inverse and inverse transfer functions, the overall transfer function of the combined PLTNM$_A$ and PLTNM$_B$ transfer function will be unity. For encryption/decryption, all that is required is to have the same impedance values that were present in encryption in PLTNM$_A$ for a given value of the message at a given time in the decryption circuit, PLTNM$_B$. If the impedance values in the decryption operation are varied, that variation will need to be mirrored in the impedance values in the decryption operation at that given time. It is noted that it is possible to use PLTNM$_B$ on the encryption side and PLTNM$_A$ on the decryption side. The key is utilized to create a dynamic baseband control signal for the encryption/decryption process.

As will be described hereinbelow, Each of the PLTNM$_A$ and PLTNM$_B$ receive a key signal as the dynamic control signal on the respective input 5807 to vary impedance Z1 and the respective input 5806 to vary impedances Z4 and Z5. If these key signals are identical, the overall transfer function is unity. What is required is that, for a message processed through a non-inverse transfer function on the encryption side, there has to be a corresponding inverse transfer function on the encryption side through which to process the encrypted signal with the "same" key in order to extract the message therefrom.

Signal Descriptions and Transfer Functions for PLTNM$_A$ and PLTNM$_B$.

FIGS. 60-65 illustrate the magnitude, phase, and group delay of the transfer function for both PLTNM$_A$ and PLTNM$_B$, noting that these transfer functions are at least second order transfer functions or higher. For each of these figures the transfer function is the output over the message input, with the control signal (key signal) input at three static levels. Note that the message input may be receiving the analog encoded version of incoming data. The three static levels are indicated as 0V, −1.15V, and −2.5V. These three voltages are the control voltage Vgs (voltage, gate to source) of the controlling FET (Field Effect Transistor), used to vary the impedance or conductance of the circuit. (In this disclosed embodiment, the impedances can be realized with an FET.) The three represent fully on, partially on, and fully off states of the FET, respectively. This can also be indicated as low impedance, middle impedance, and high impedance respectively. Circuit values and frequency ranges are chosen for illustrative purposes and are not limiting on the invention.

Figure 60:
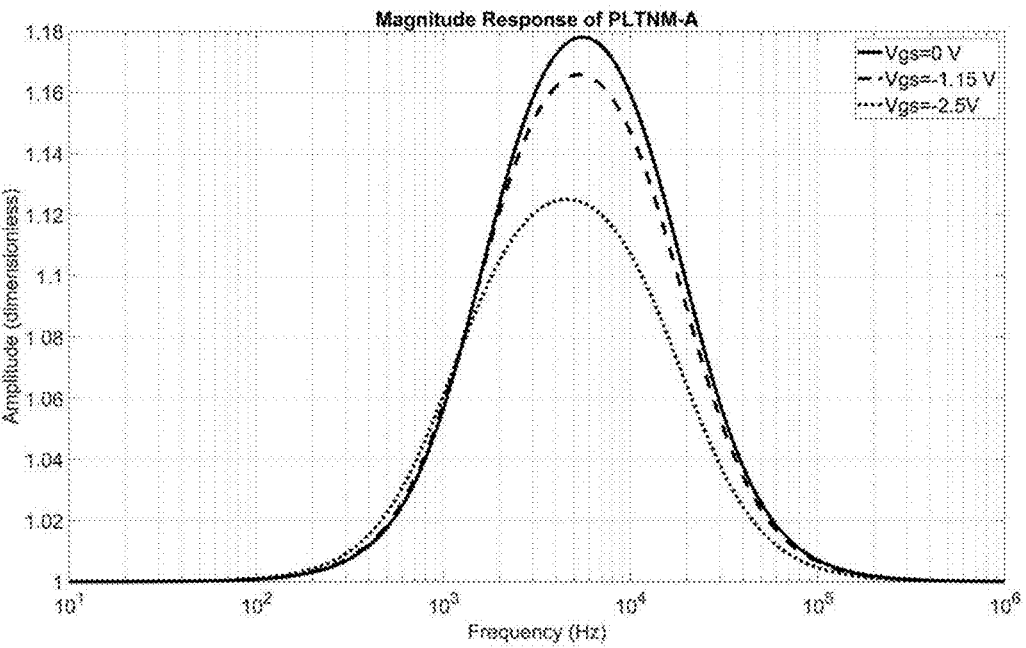
FIG. 60 illustrates the magnitude response versus frequency of the $PLTNM_A$ circuit output versus message input at three levels of control signal input.

FIG. 60 illustrates the output over message input magnitude response of PLTNM$_A$ for three levels (amplitudes) of the control signal input. It is instructive to compare FIG. 60 with FIG. 63, the output over message input magnitude response for PLTNM$_B$. The magnitude versus frequency response shown in FIG. 60 is essentially the inverse of that shown in FIG. 63, which is a requirement for recovering data from encryption.

Figure 61:
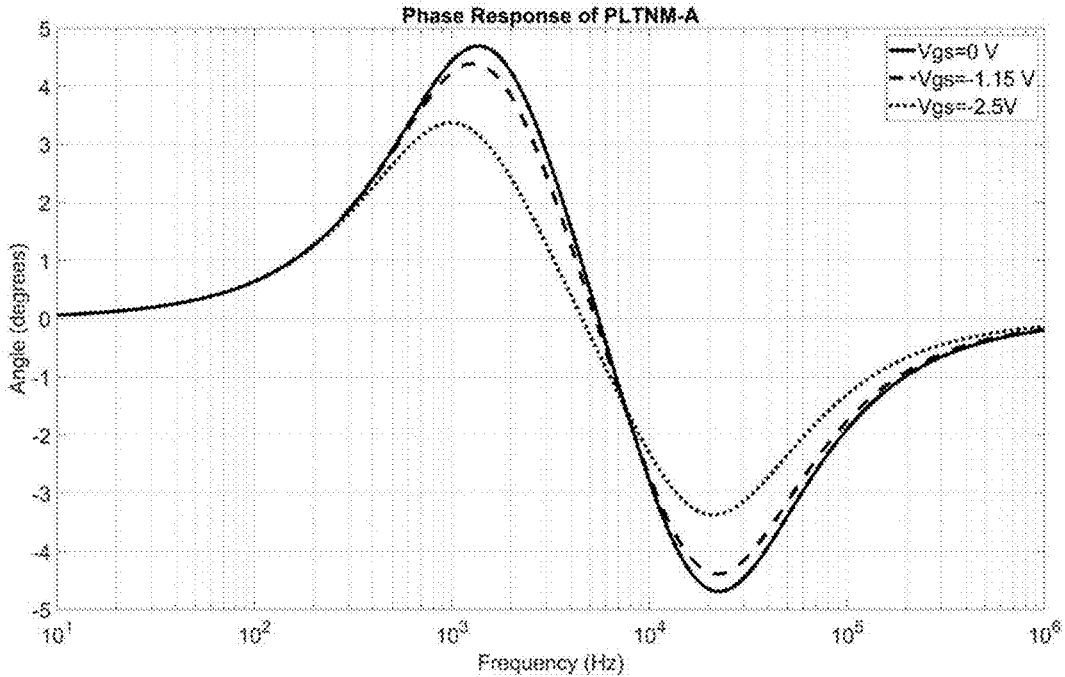
FIG. 61 illustrates the phase response versus frequency of the $PLTNM_A$ circuit output versus message input at three levels of control signal input.
Figure 64:
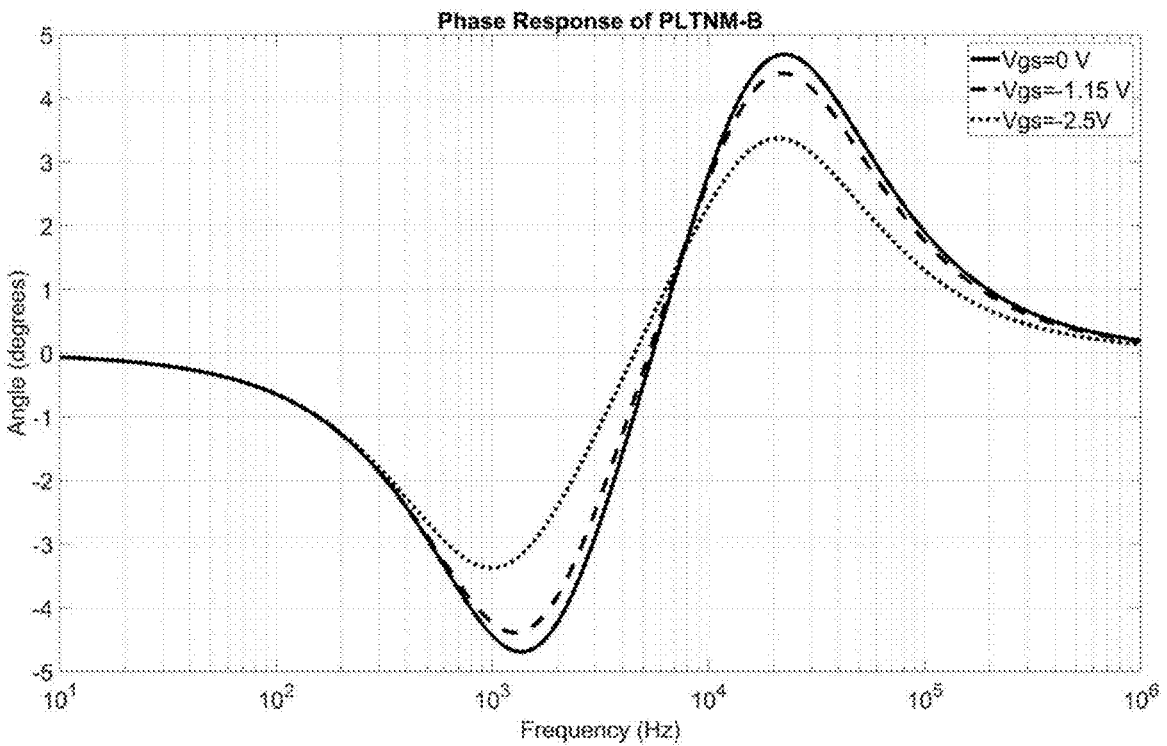
FIG. 64 illustrates the phase response versus frequency of the $PLTNM_B$ circuit output versus message input at three levels of control signal input.

FIGS. 61 and 64 are the corresponding phase response plots for PLTNM$_A$ and PLTNM$_B$, respectively, and while they are different it is noted that the difference in phase response across frequency and across levels of control input are small. The level of phase (and magnitude) response can be modified by change in component values in the PLTNM$_A$ and PLTNM$_B$ circuits illustrated in FIG. 58 and according to the requirements of the control signal bandwidth and the data signal bandwidth.

Figure 62:
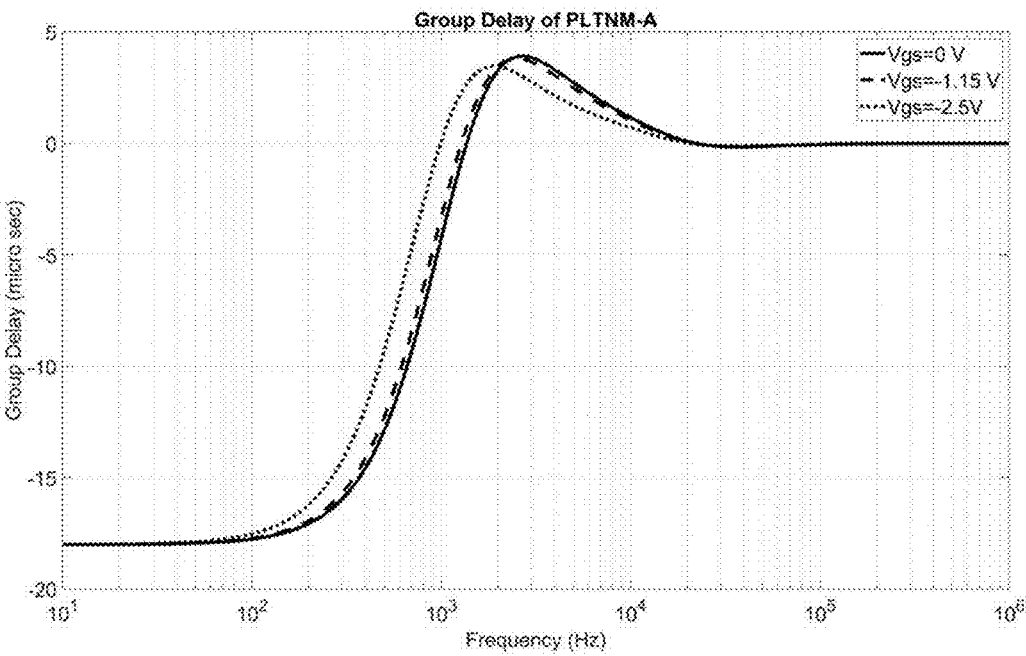
FIG. 62 illustrates the group delay versus frequency of the $PLTNM_A$ circuit output versus message input at three levels of control signal input.
Figure 63:
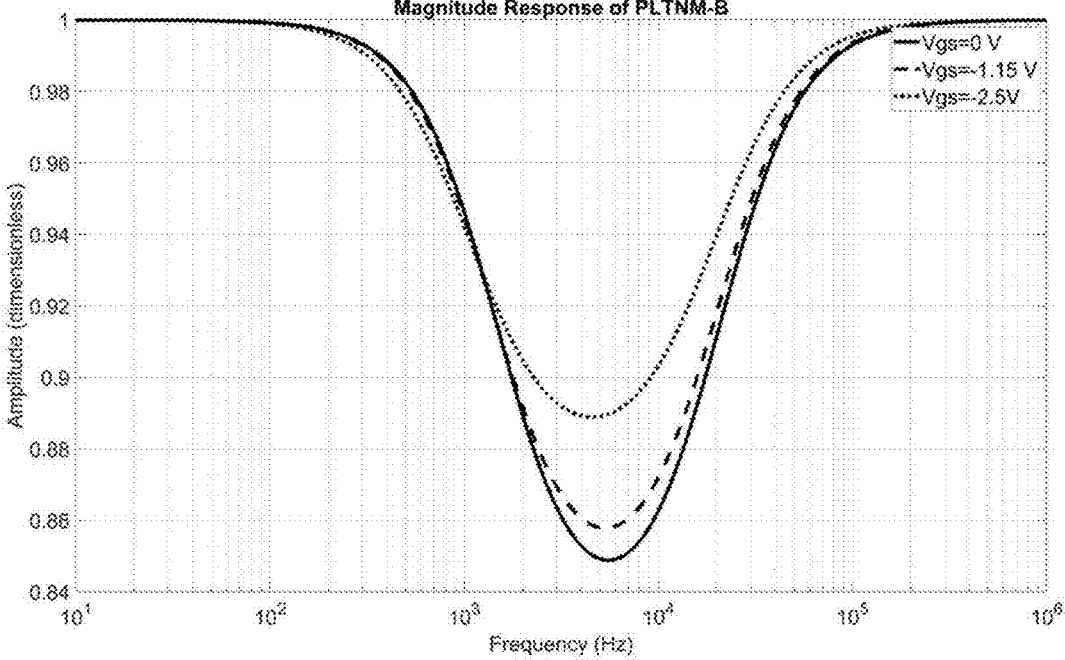
FIG. 63 illustrates the magnitude response versus frequency of the $PLTNM_B$ circuit output versus message input at three levels of control signal input.
Figure 65:
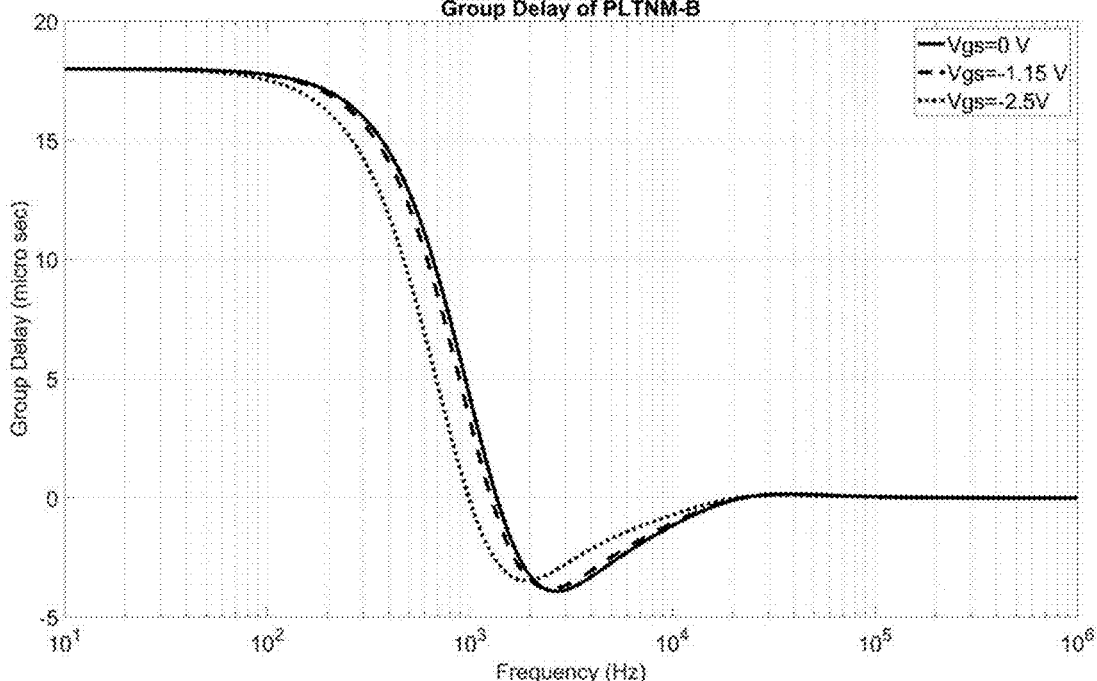
FIG. 65 illustrates the group delay versus frequency of the $PLTNM_A$ circuit output versus message input at three levels of control signal input.

FIGS. 62 and 65 show the group delay (negative of change in phase per change in frequency) for PLTNM$_A$ and PLTNM$_B$, respectively, at three static levels of control input. Note that each of the graphs has a region where the group delay is negative. Negative group delay (NGD) is a characteristic of the PLTNM circuits. In two parts, PLTNM$_A$ and PLTNM$_B$, the negative group delay response occurs in different frequency regions.

Vgs And Impedance Control

FIGS. 60-65 each have associated data that are indicated at three levels of a parameter Vgs. As noted above, Vgs is the gate to source voltage of a Field Effect Transistor (FET) utilized to realize the respective impedances. The particular FET used in the embodiment associated with FIGS. 60-65 appears as a variable impedance, where the impedance changes from a few hundreds of Ohms to millions of Ohms as the control voltage goes from its minimum of 0V to its maximum (negative always) of −2.5V. The impedance values and voltages given are a factor of the particular circuit values and component types chosen and may easily be changed for different values and component types given the operating frequencies of interest and the particular application. The FET appears in FIG. 58 as a component of Z1 (5804) for PLTNM$_A$ controlled by control signal 5807, and Z4 and Z5 indicated as 5809 and 5818 for PLTNM$_B$ controlled by signal 5806.

Control Input Transfer Functions for PLTNM$_A$ and PLTNM$_B$

Figure 66:
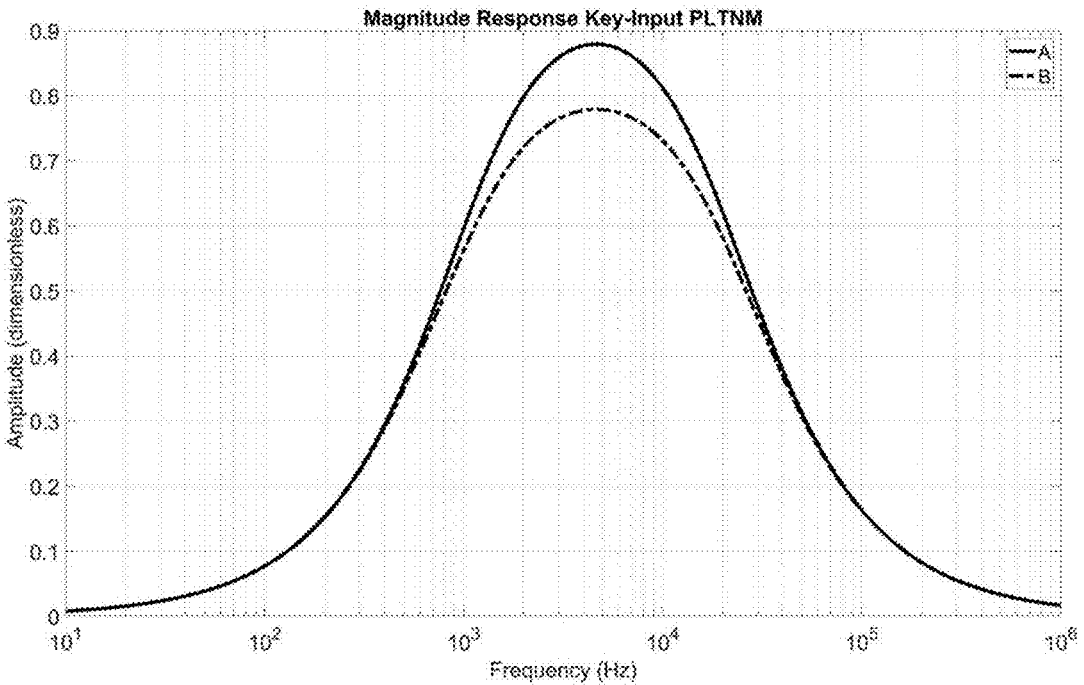
FIG. 66 illustrates the magnitude response versus frequency of the $PLTNM_A$ and PLTNMB circuit outputs versus control input with message input at zero.
Figure 67:
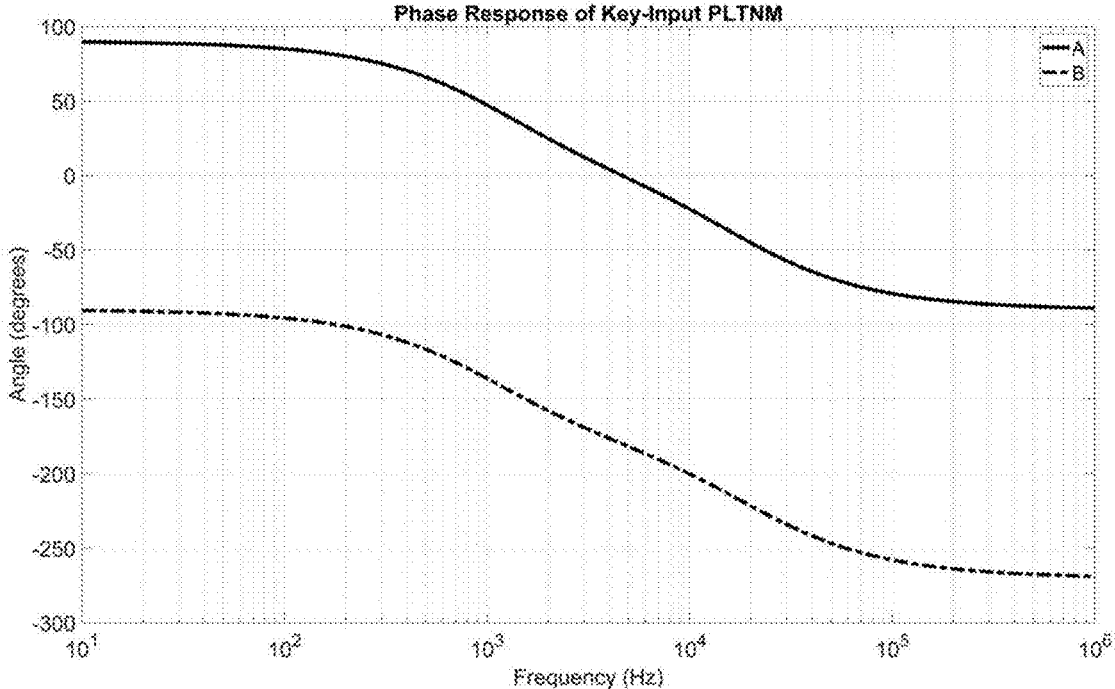
FIG. 67 illustrates the phase response versus frequency of the $PLTNM_A$ and PLTNMB circuit outputs versus control input with message input at zero.
Figure 68:
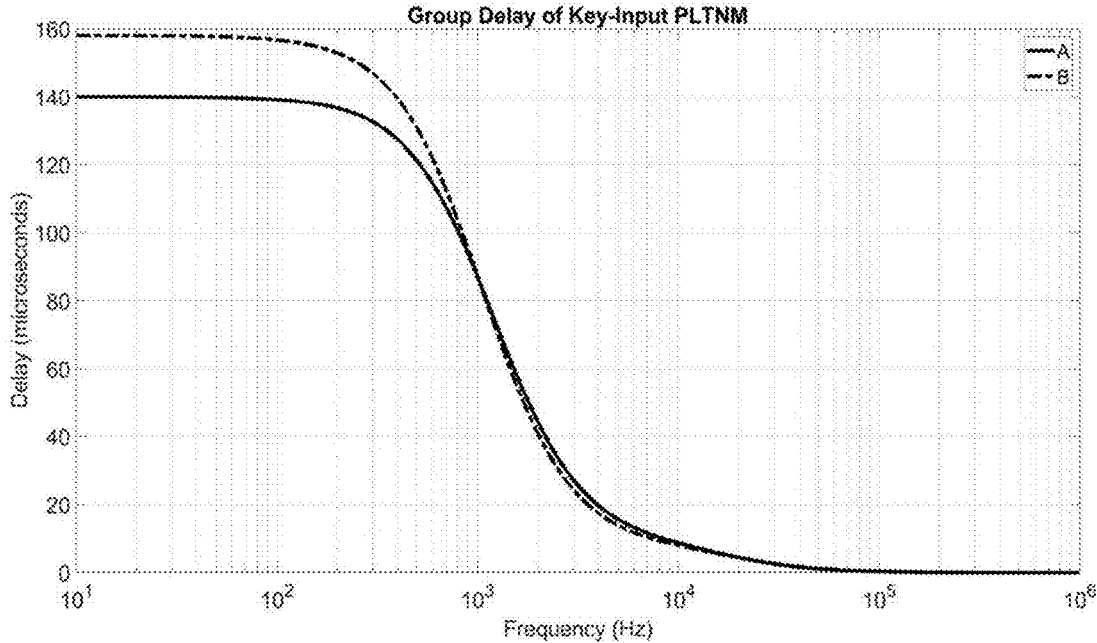
FIG. 68 illustrates the group delay versus frequency of the $PLTNM_A$ and PLTNMB circuit

FIG. 60 through FIG. 65 show the PLTNM$_A$ and PLTNM$_B$ transfer functions of circuit output relative to message input at different "static" levels of the control input. PLTNM circuits have two inputs, indicated as data and control, and therefore have two transfer functions. FIG. 66 through FIG. 68 show the magnitude, phase, and group delay versus frequency characteristics of PLTNM$_A$ which can be compared to PLTNM$_B$ at a single (zero) level of the message input. As opposed to the message input transfer functions, the magnitude response of these transfer functions are of roughly the same magnitude, and where one is monotonically increasing or decreasing, the other is as well.

The phase response illustrated in FIG. 67 of the two parts of the circuit, however, are different in that they are 180 degrees out of phase with one another across the spectrum of interest. This means that although the magnitude responses are in the same direction, the two parts act in opposition because of their phase response.

FIG. 68 illustrates the group delay of PLTNM$_A$ and PLTNM$_B$ circuits with outputs over control inputs at a static level of message input and over the spectrum of interest for this illustration.

Encryption/Decryption with PLTNM

A disclosed objective of the encryption/decryption process is that the original signal or data is reproduced exactly following the decryption process. This requires that the overall transfer function of the system including encryption on the encryption side and decryption on the encryption side be unity or 1. It also requires that the transfer function of the encryption component not be unity or 1, as this would imply no encryption. Given the two methods of varying the transfer function of PLTNM, there are two general methods of utilizing PLTNM for encryption disclosed herein. There are two methods to vary the overall transfer function of the PLTNM circuit on both the encryption and decryption side. The first is to utilize variations in analog control signal to change characteristics, and the other is to utilize differing circuit component values. These methods are not exclusive and may be used together.

Figure 69:
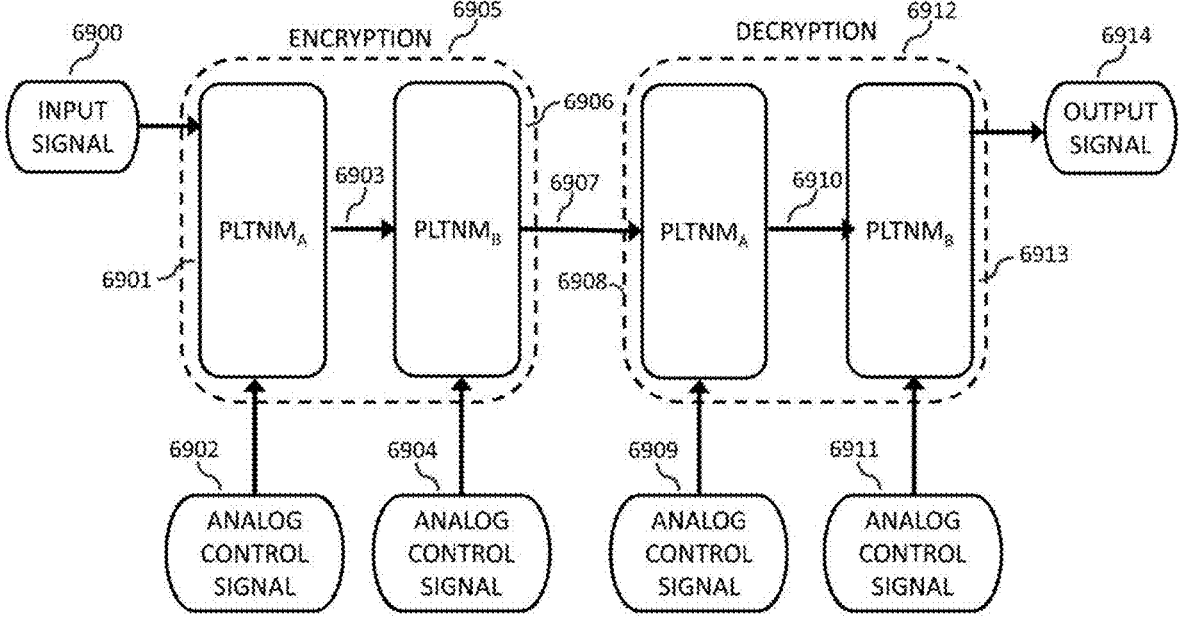
FIG. 69 shows a block diagram of a complete encryption/decryption system with independent analog control signals for all PLTNM components.

As illustrated in FIG. 69, the PLTNM encryption and decryption process comprises PLTNM block sub-circuit pairs with PLTNM$_A$ 6901 and PLTNM$_B$ 6906 in encryption block 6905, and PLTNM$_A$ 6908 and PLTNM$_B$ 6913 in decryption block 6912. Signal 6900 passing through PLTNM$_A$ 6901 to produce signal 6903 which is applied to PLTNM$_B$ 6906 resulting in analog encrypted signal 6907 before storage or transmission. Following encrypted file transmission or retrieval from storage, the analog encrypted signal 6907 is then passed through both PLTNM$_A$ 6908 and PLTNM$_B$ 6913 of the decryption PLTNM block pair 6912, producing the decrypted output signal 6914. PLTNM$_A$ and PLTNM$_B$ can be in either order from a circuit design perspective.

Component Modification of the PLTNM Transfer Function

The first method takes advantage of the fact that there is a PLTNM$_A$ and PLTNM$_B$ of the overall PLTNM circuitry for the Encryption process (6901 and 6906 respectively), and a PLTNM$_A$ and PLTNM$_B$ of PLTNM circuitry for the Decryption process (6908 and 6913 respectively). If Analog Control Signal 6902 and Analog Control Signal 6904 are identical, and the transfer function $H_{PEPLTNMA}=f(s)$ for PLTNM Encryption PLTNM$_A$ (PEPLTNM$_A$) is the reciprocal of the transfer function for PLTNM Encryption PLTNM$_B$ (PEPLTNM$_B$) where $H_{PEPLTNMB}=1/f(s)$, a signal passing from 6900 through 6901 to 6903; through 6906 to 6907 will at 6907 be identical to the signal originating from 6900. This is not helpful for encryption, as the transfer function through the encryption process must be other than unity. This basically passes the message through a non-inverse transfer function in series with a corresponding inverse transfer function.

Consider for encryption if $H_{PEPLTNMA}=f_1(s)$, and the reciprocal is not Encryption PLTNM$_B$, but rather Decryption PLTNM$_B$, or $H_{PDPLTNMB}=1/f_1(s)$. Or:

$$H_{PEPLTNMA} = f_1(s); H_{PDPLTNMB} = 1/f_1(s)$$

This also implies that for Encryption PLTNM$_B$ (PEPLTNMB) the reciprocal transfer function will be located in Decryption PLTNM$_A$ (PDPLTNMA). As an equation, this implies that:

$$H_{PEPLTNMB} = f_2(s); H_{PDPLTNMA} = 1/f_2(s).$$

In terms of FIG. 69, this means 6913 (the inverse transfer function of 6901) undoes the circuit action of 6901, and 6908 (the inverse of transfer function 6906) undoes the circuit action of 6906. All of this implies that the analog control signals 6902, 6904, 6909, and 6911 are identical.

Changes to the transfer function must be within the bounds of a negative group delay function, and changes are typically different resistor or capacitor values or both. Changes in variable component types are also possible but have a more complex effect on the transfer function.

Control Signal Modification of the PLTNM Transfer Function

The second method to utilize PLTNM for encryption also takes advantage of the fact that there is a $PLTNM_A$ and $PLTNM_B$ of PLTNM for the Encryption process, and a $PLTNM_A$ and $PLTNM_B$ for the Decryption process. If the transfer function for Encryption $PLTNM_B$ is the reciprocal (inverse) of the transfer function for Encryption $PLTNM_A$ when both $PLTNM_A$ and $PLTNM_B$ analog control signals are equal and at nominal values, no encryption will occur. If the analog control signals for $PLTNM_A$ and $PLTNM_B$ are made different, the transfer functions are now no longer reciprocals of one another, and the signal is modified as it passed through $PLTNM_A$ then $PLTNM_B$ on the encryption side.

Utilizing this method the disclosed embodiment provides the same two sets of control equations:

$$H_{PEPLTNMA} = f_1(s); H_{PDPLTNMB} = 1/f_1(s)$$
$$H_{PEPLTNMB} = f_2(s); H_{PDPLTNMA} = 1/f_2(s).$$

The difference between this method and the previous method is that rather than changing the transfer function by changing circuit static component values, the value of a variable resistive element is changed by the analog control voltage derived from the analog security key signal. Here $PLTNM_A$ of Encryption is undone by $PLTNM_B$ of Decryption, and $PLTNM_B$ of Encryption is undone by $PLTNM_A$ of Decryption. This is accomplished by making the analog control signal drive to $PLTNM_A$ of Encryption 6902 the same as $PLTNM_B$ of Decryption 6911, where this pair is different from the pair of $PLTNM_B$ of Encryption 6904 and $PLTNM_A$ of Decryption 6909 which are made the same.

Figure 70:
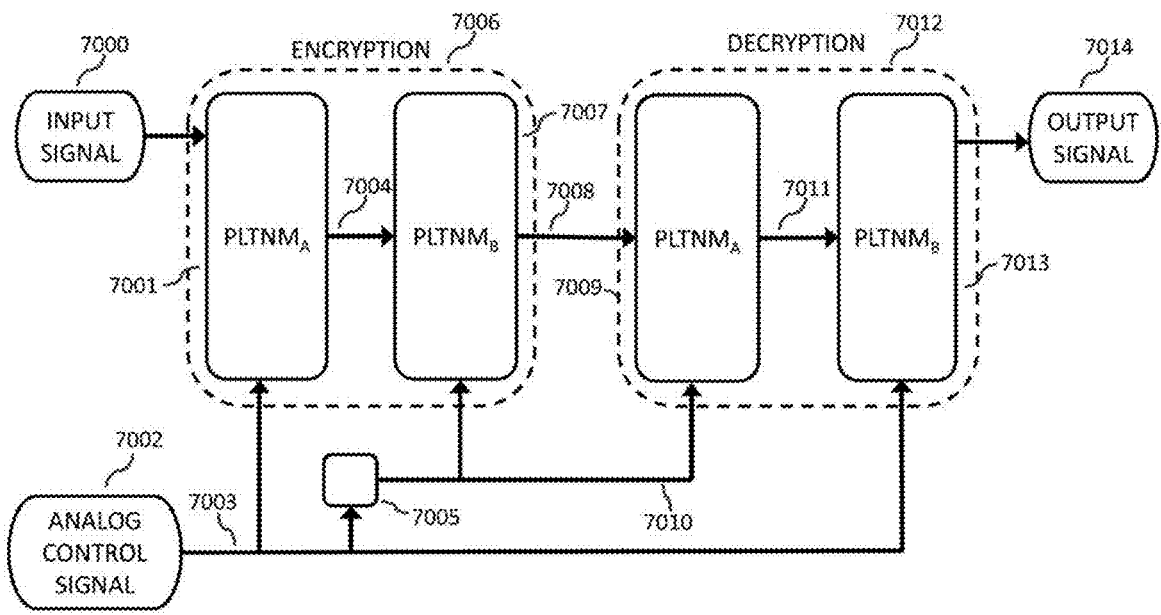
FIG. 70 shows a block diagram of a complete encryption/decryption system with coordinated analog control signals for PLTNM components.

This last method is illustrated by FIG. 70 where analog control signal 7002 drives $PLTNM_A$ of Encryption 7001 as well as $PLTNM_B$ of Decryption 7013 directly as signal 7003, and a modifier 7005 creates a modified second analog control signal 7010 driving $PLTNM_B$ of Encryption 7007 and $PLTNM_A$ of Decryption 7009.

Both methods described accomplish the dual goal of having the encryption/decryption overall transfer function result in being equal to unity or 1, and the transfer function for encryption results in being not equal to unity or one. Thus, when viewing the overall transfer function, it is comprised of, on the encryption side, $TF_{EncA}$ in series with $TF_{EncB}$, and, on the decryption side, $TF^{-1}_{DecA}$ in series with $TF^{-1}_{DecB}$. Thus, on the encryption side, the transfer function is $TF_{EncA}+TF_{EncB}$ to provide an encrypted signal and, on the decryption side, the transfer function is $TF^{-1}_{DecA}+TF^{-1}_{DecB}$, which decrypts the encrypted signal.

Encryption Vs Encoding/Decoding

Figure 71:
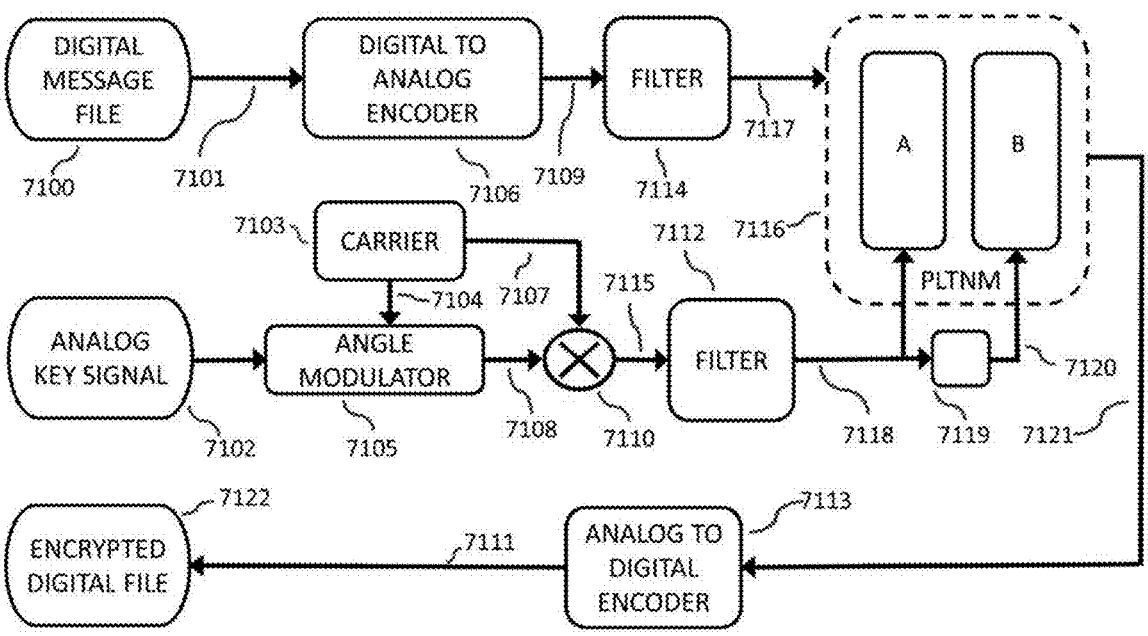
FIG. 71 illustrates a block diagram of an analog encryption system for data files.

FIG. 71 illustrates an encryption system including encoding a digital message file to generate a continuous analog signal followed by encryption processing then decoding the continuous analog signal representing the data back to a digital file for subsequent transmission or storage.

Figure 72:
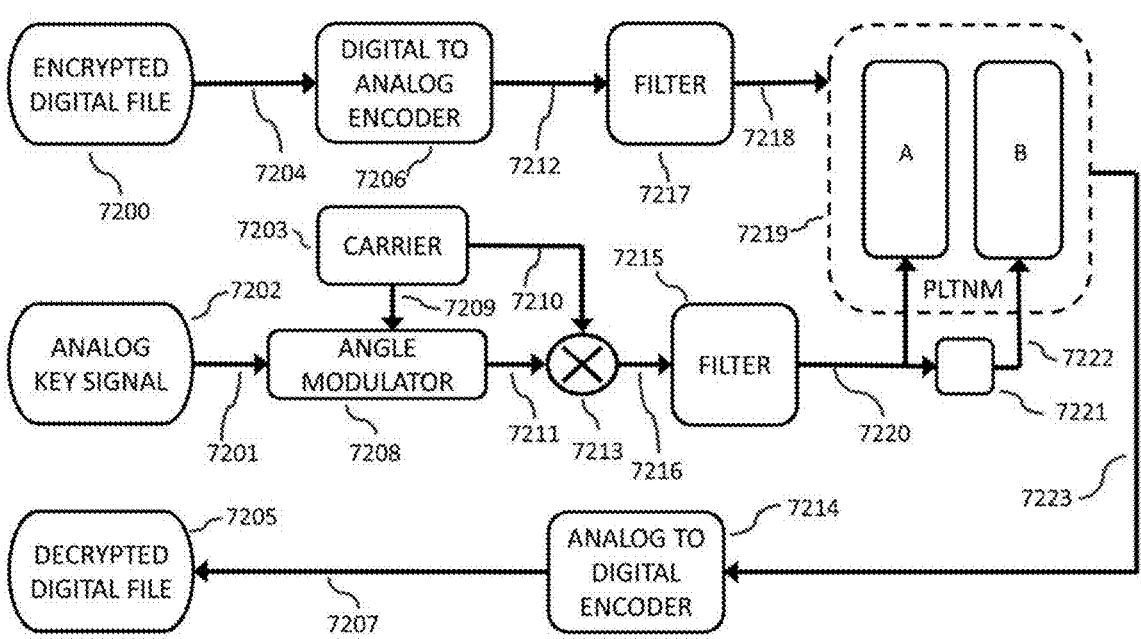
FIG. 72 illustrates a block diagram of an analog decryption system for data files.

FIG. 72 illustrates a decryption system that takes that digital file, decodes it as a continuous analog signal, performs the decryption process, then encodes the continuous analog signal into a digital file. The common elements between the two figures are that A) there is a transformation section at both the front end and the back end that does not do a frequency transformation, but transforms between digital and analog domains; and B) the 'middle portion', including key input, modulation, frequency translation back to baseline and filtering, as well as the PLTNM circuit block and any analog control signal manipulation required, performs the actual encryption.

In both the encryption and decryption operations, there is an encoding related operation and an encryption related operation. Encryption and Encoding are terms often interchanged and sometimes used incorrectly, but they have distinct differences. Encryption is a process used to convert simple readable data known as plain text to unreadable data known as ciphertext which can only be converted to plain text if the recipient knows the encryption key. The main purpose of encryption is to convert data in such a form that it is garbage for the recipient who does not know the encryption key. It is used to prevent unauthorized access. The reverse of encryption is decryption, and it is used to get back the plain text from the ciphertext. For decryption, the recipient must know the encryption key and the encryption algorithm. Encoding, by comparison, is the process to transform data in such a format that it can be easily used by different types of systems. The algorithm used to encode the data is publicly available and it can be easily decoded in the readable form if the recipient knows the algorithm. It does not require any key to decode the information. The main purpose is data usability instead of confidentiality. The main aim of encoding is to transform the data so that it can be properly used by a different type of system. It is not used to protect the data as it is easy to reverse in comparison to encryption. Thus, the digital/analog operation is an encoding operation.

FIG. 71 and FIG. 72 taken together comprise a complete system for encryption and decryption of digital message files stored on a computer, but the encryption system illustrated is not limited to that particular data source and target. For example, without limitation, the digital source could be streaming and the target for encrypted information would be a stream as well. In this case the system would be configured essentially as shown. That is, streaming bits would be selected into words by a parser as shown in FIG. 71 item 7101 and then converted to analog for encryption.

The type of digital message or file is also flexible in that it can be without limitation any digital file type (e.g. text file, binary file, image file, database file, system file, binary encryption key, etc.).

Baseband Encryption

FIG. 71 illustrates a system and method for encryption of a digital computer file using an analog key signal to produce an encrypted digital computer file. Both the original file and encrypted file may be stored in digital form or digitally transmitted over networks in the same way as any standard binary or text file. A digital file is a collection of 1's and 0's generally organized as 8-bit words (bytes) or multiples thereof.

For encryption starting at the beginning of the digital file 7100 the digital data 7101 is encoded into an analog signal by digital to analog encoder 7106. Digital to analog encoder 7106 produces a continuous analog signal 7109. The term digital to analog "encoder" and analog to digital "encoder" may be interchanged throughout the following description with digital to analog "converter" and analog to digital "converter." A digital to analog converter is operable to select a group of bits and convert that group of bits to a binary value. The rate that the bits are output is defined as the bit rate of the encoder and the rate of generation of the group of bits is defined as the "data rate." Since each group of bits will correspond to an analog value, it follows that conversion back to a digital value will require the analog value to be sampled at least the data rate. However, the operation of an analog to digital encoder requires a sample and hold operation. The well known Nyquist criterion for the sampling operation requires that the sampling frequency be at least twice the highest frequency contained in the analog signal, or information in the analog signal will be lost. As such, the data rate needs to be selected based upon the frequency of the resulting analog signal.

Analog output voltage 7109 from digital to analog encoder 7106 is filtered for removal of high frequency components by smoothing filter 7114 to produce filtered analog signal 7117 and presented to the PLTNM circuit 7116, which is the structure described hereinabove with respect to FIG. 58. PLTNM circuit operation requires that input signals be band-limited. This signal 7117 is considered the input signal to the PLTNM circuit.

Information, and consequently energy, is added to the analog encoded message by applying the PLTNM modulation using the baseband dynamic control signal derived from (one or more) analog key signals and their various modulations. The specific form and amount of data arising from encoding to an encrypted data-stream to generate an encrypted data file may not be the same as the original digital message file. That is, the encrypted file size may differ from the message file.

At the same time data 7101 from the digital file 7100 is being sent to the digital to analog encoder 7106, the analog key signal 7102 is presented to angle modulator 7105 where it modulates a carrier 7104 resulting in a dynamic carrier 7108. As noted hereinabove, the temporal relationship between the analog key signal 7102 and the digital message file 7101 is important to the decryption operation. Carrier generator 7103 generates identical carriers 7104 and 7107 used separately within the baseband dynamic control signal generation method. The carrier 7104, also indicated as signal 7107 is presented to both the angle modulator and mixer 7110 respectively, which may, without limitation, be a multiplicative mixer. Dynamic carrier 7108, since it is already at the carrier frequency, when mixed again with carrier 7107 produces the dynamic carrier frequency content at baseband, and at two times the carrier frequency.

$$\cos(\omega_1 t) * \cos(\omega_2 t) = \frac{[\cos(\omega_1 + \omega_2)t]}{2} + \frac{[\cos(\omega_1 - \omega_2)t]}{2}$$

Note that an alternative embodiment for generation of a baseband dynamic control signal is through the use of direct digital synthesis (DDS). Integrated circuits are available to perform this function across a wide range of frequencies.

The combined signal from mixer 7110 identified as baseband signal 7115 is applied to filter 7112, which may be a low pass or band-stop filter without limitation, to remove the high frequency component and leaves the baseband component now available at 7118. Signal 7118 is a baseband dynamic control signal and is utilized by PLTNM as an analog control signal.

The control drive of the A and B sides of PLTNM is described hereinabove with respect to FIG. 58, as in one embodiment the baseband dynamic control signal can drive $\text{PLTNM}_A$ while $\text{PLTNM}_B$ by an inverted (multiplied by −1) version of the same control signal, or other modifications. In addition, differences in component values within the PLTNM circuit are possible. $\text{PLTNM}_A$ is driven by signal 7118 and $\text{PLTNM}_B$ is driven by signal 7120, modified from the signal of 7118 by circuit element 7119. Within the PLTNM circuit block any biasing, coupling, or offset required, typical in analog circuit design, may be applied. Item 7119, a non-limiting modification of the baseband dynamic control signal between $\text{PLTNM}_A$ and $\text{PLTNM}_B$, may be a simple pass-through. It should be understood that the dynamic control signals on 7118 and 7120 could be independently generated from the same analog key signal with two different circuits 7105-7112 and even two different analog key signals.

The PLTNM circuits 7116 modulate the signal 7117 per the two control signals 7118 and 7120 applied, to generate an analog output signal 7121. Signal 7121 is the modulated analog signal that is converted to digital values by analog to digital encoder 7113. Acquisition of the analog signal 7121 by analog to digital encoder 7113 is synchronized with the digital to analog encoder 7106, with one sample passing through at a time, though filter delays may result in a sampling delay. These now digital values 7111 are written to the encrypted digital file 7122. Thus, the sampling clock for the analog to digital encoder 7113 is synchronized such that for each analog value generated by the digital to analog converter 7100, the resultant modulated signal 7121 will be sampled at the same time. This is a closed system such that no intervening signal transfer function is applied between unencrypted analog signal 7109 and encrypted analog signal 7121. No additional energy has been added in the signal other than that associated with the operation of the PLTNM circuit 7116.

It has been previously noted that the energy of the analog signal representing the message (7117) is combined with energy from the dynamic control signal (7118) derived from the analog security key signal(s) (7102). This additional energy may result in the generation of an encrypted file or data set (7122) that is larger than the unencrypted file (7100). This increase in file size, should it be required, does not come at the cost of computation time. No additional computational time is required to pass through the combined message/key signal. Encryption is accomplished as the signal passes from the digital to analog encoder output 7101 through the PLTNM circuitry 7116 to the analog to digital encoder output 7111. Encryption speed is then limited by data transfer speeds rather than a calculation speed.

Baseband Decryption

FIG. 72 illustrates decryption of an encrypted digital file using an associated analog key signal. One might expect the decryption system to perform functions in the reverse order relative to the encryption system, thereby 'undoing' changes the encryption system made to the original message to create the encrypted message. This would be incorrect, in that the decryption system organization is essentially the same as the encryption system, with some notable exceptions that will be detailed below.

As illustrated in FIG. 72, the encrypted digital file 7200 is transmitted to digital to analog encoder 7206 where the range of digital inputs is converted to a range of encrypted analog output amplitudes at signal 7212, where the encrypted analog value is continuous and updated with each encrypted data word. This now stepped encrypted analog signal is smoothed by filter 7217 to form filtered encrypted analog signal 7218 as the input to the PLTNM circuit block 7219.

PLTNM circuit block 7219 has two analog control signals, for $PLTNM_A$ (7220) and $PLTNM_B$ (7222). Analog control signals and the PLTNM circuit parameters are chosen to essentially reverse the modulation applied in the encryption operation of FIG. 71 (changes made by the PLTNM circuit and associated analog control signals in the encryption system), yielding decrypted analog signal 7223. Decrypted analog signal 7223 is sampled and converted to digital values using analog to digital encoder 7214 producing decrypted digital data 7207. Decrypted digital data 7207 is stored in decrypted digital file 7205 in the computer's operating system file storage system.

As with the encryption system, the decryption system requires a baseband dynamic control signal. This signal is generated by modulating with an analog key signal 7202 received at 7201 by modulator 7208, a carrier 7209 produced by carrier generator 7203. The resulting modulated signal 7211 is mixed by mixer 7213 with a carrier 7210 produced by carrier generator 7203 and identical to carrier 7209 to produce the unfiltered baseband complex analog control signal 7216. This signal 7216 is filtered by a low pass, or alternatively band-stop, filter 7215 which removes the high-frequency sideband, to produce complex analog control signal 7220. Complex analog control signal 7220 and its alternate version 7222 modified by circuit 7221 are the analog control signals for the PLTNM components 7219.

The start of the analog key signal 7202 entering the modulator 7208 must be synchronized with the start of the output of the digital to analog encoder 7206. This signal is indicated as 7212. Synchronization of these two signals is required for proper performance of the decryption process.

In addition, a further deterministic delay must be added to the start of the analog key signal 7202 or at some point before it is utilized in the decryption process to account for encoding delays in the encryption system after encryption and when converting from the encrypted analog signal to a digital signal for storage or transmission. The timing of delay is determined by word length and serial transmission speed and is application dependent. As an example, consider that the first word of the unencrypted digital message is converted to an analog value and the filtered unencrypted value arrives at the input 7117 to the PLTNM circuit 7116 at to and is encrypted with the value of the dynamic control signal on input 7118 at $t_0$. The encrypted analog output of the PLTNM circuit 7116 is then converted to an encrypted digital value and represents the encrypted digital value of the first digital word output from the unencrypted digital file for the encryption process, encrypted at $t_0$. It is important that this first word in the encrypted digital file be converted to an encrypted analog value at the input 7218 at a time to ensure that the value of the analog control signal on input 7220 and the encrypted and filtered analog signal correspond in time to the time that the corresponding unencrypted signal was encrypted.

The use of PLTNM in the encryption and decryption devices along with analog key signal(s) used to modulate carriers, whether the final signal remains at passband or baseband, gives an opportunity for manipulation of the message across multiple dimensions that enables strong encryption. Modulation of frequency, variations in phase response given changes in key value, and the non-linear characteristics of the variable components used in the PLTNM circuits cause all of these to increase, when appropriate analog keys are utilized, the strength of encryption of the overall system.

Baseband Dynamic Control Signals

The devices of FIG. 71 and FIG. 72 operate generally at baseband, in that the intent of the device of FIG. 71 is to produce an encrypted data file that may be stored or transmitted rather than immediately transmitting the encrypted signal at passband without the production of an encrypted file. After being stored or transmitted, the encrypted file may be decrypted by the device of FIG. 72 to retrieve a copy of the original (unencrypted) message or data file. In this disclosure, the term 'message' is used for reference, although the source data or message file may be any type of stored file including a previously encrypted file, binary file, text file, image file or other type.

While key-based encryption is known, analog key-based encryption is not widely used. In addition, analog key-based encryption described in this present disclosure operates indirectly by controlling the PLTNM circuitry and, as such, is distinguishable over prior solutions. A feature of the present disclosed embodiment illustrated in FIG. 71 and FIG. 72 is frequency expansion of the analog key signal. Given the bandwidth of the analog key, when applied to a modulator such as a VCO or in this case KCO (Key Controlled Oscillator), a gain factor can be applied so that voltage changes in the analog key signal result in K times the analog key signal changes in frequency content at the output of the angle modulator. In this way voltage changes in the key produce frequency changes in the resulting modulated signal, but the rate of change of voltage in the key (frequency content of the key) produces variations in the rate of change of frequency in the resulting modulated signal.

Figure 59:
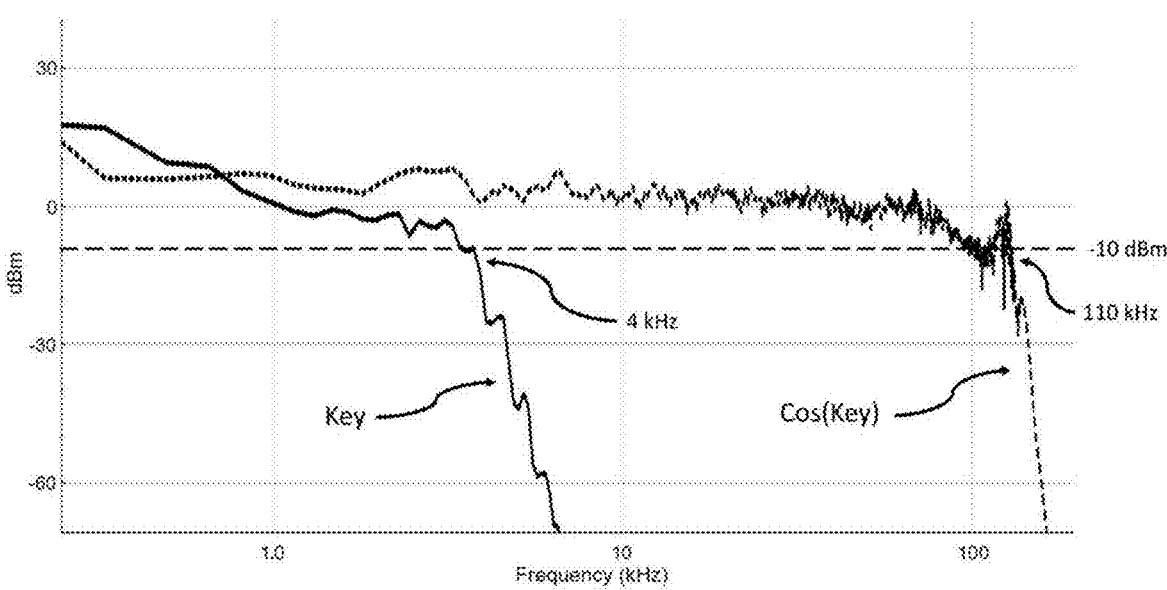
FIG. 59 shows a non-limiting example of a Dynamic Baseband Control Signal along with the key signal used to generate the Dynamic Baseband Control Signal.

FIG. 59 illustrates the frequency expansion of a baseband dynamic control signal. A relatively narrow bandwidth and corresponding amplitude excursions of the analog key signal results in a much larger bandwidth of the dynamic baseband control signal. The analog security key, the input signal to the KCO (angle modulator 7105 in FIG. 71, or 7208 in FIG. 72, or 7304 in FIG. 73) is an analog waveform, in this embodiment originally in the form of a .WAV file representation of a short audio sequence, and where the KCO gain K is approximately 150,000. These numbers are for illustration purposes only, are not limiting on the disclosed embodiment, and will vary depending on application. Note that the analog key amplitude transitions extend to over 150 kHz of frequency content, and the frequency and amplitude change characteristics of the key are reflected in changes in the magnitude of the spectrum within the entire 0 Hz to 150 kHz range.

Modified Baseband Control Signal Generation

In applications referenced herein, the analog key signal angle (or other form of modulation) modulates a carrier and then is utilized as a dynamic carrier to control the PLTNM modulation of the message signal. In the baseband application above, a dynamic carrier may also be mixed with the original carrier and filtered to remove an upper sideband, producing a baseband dynamic control signal. Additionally, the dynamic carrier may be mixed with the original carrier and filtered to produce a baseband dynamic control signal that is subsequently mixed with the original key or a different key, producing a protected key at baseband.

In the present disclosed embodiment the baseband dynamic control signal is further mixed with the original key or another key and this mixed signal is then summed with the baseband dynamic control signal to produce a modified baseband dynamic control signal. The modified baseband dynamic control signal (MBDCS) is a complex and flexible analog signal that can be used as control signals for encryption circuits such as PLTNM.

Figure 73:
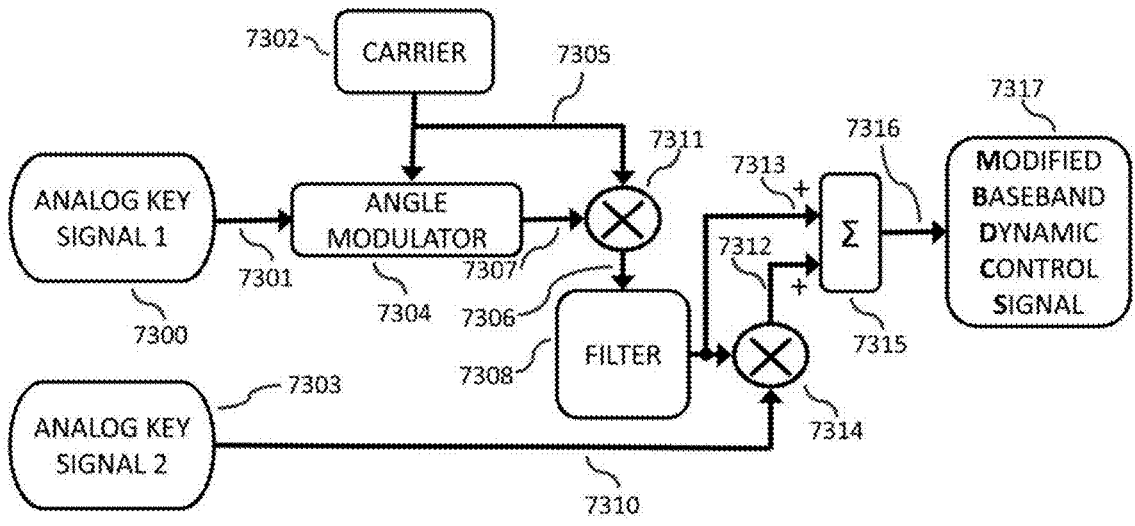
FIG. 73 illustrates a block diagram of the portion of an encryption or decryption system that generates a modified baseband dynamic control signal from an analog key signal.
Figure 74:
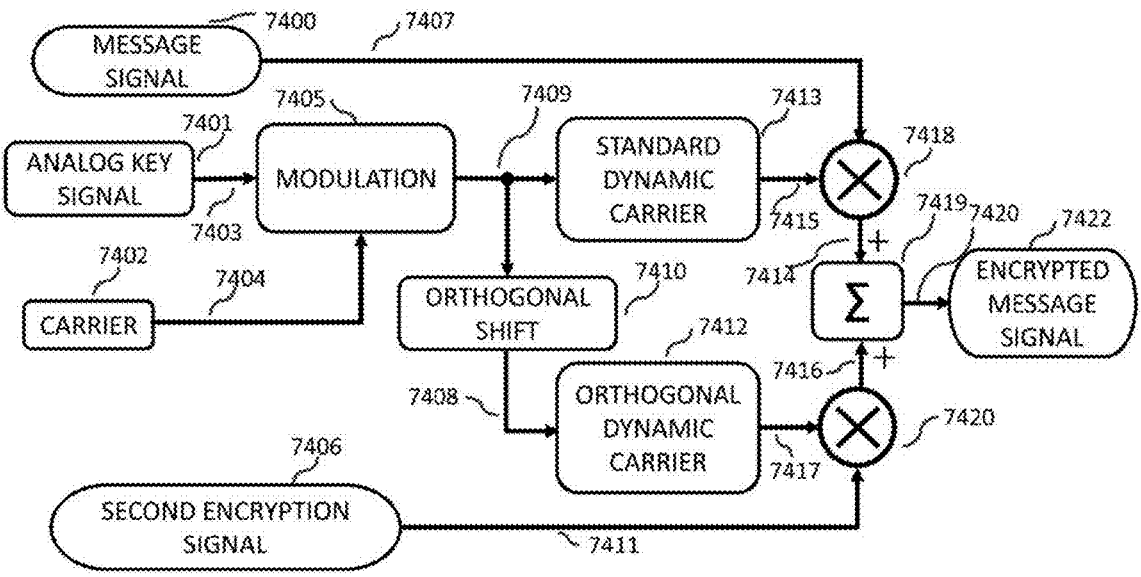
FIG. 74 illustrates a block diagram of an encryption device with orthogonal carriers.

Referring now to FIG. 74, there is illustrated a block diagram of an additional method for generation of a complex control signal at baseband from an analog key signal. The control signal will control the level of action of a circuit for the duration of a message transmittal through the circuit and starts at the same time that the message starts, and ends at the same time that the message ends. The exception to the previous statement is where encoding of single samples of the message signal from a digital file takes the transit time of some number of bits of the message signal into the encoder. These serial-to-parallel and parallel-to-serial as well as other encoding delays must be accounted for in the encryption/decryption process, as the timing relationship or synchronization between the message and analog key signals is critical. The analog key signal 7300 is received by the modulation circuit as signal 7301 and angle (or other form of modulation) modulates with modulator 7304 a first carrier 7302, creating a first modulated signal 7307. The first modulated signal 7307 and the carrier 7305 are then mixed with a mixer 7311. In this preferred embodiment the mixer is a multiplier that produces signal 7306. Signal 7306 is filtered with filter 7308 to produce signal 7313. Signal 7313 is the signal described as a "dynamic control signal" in the encryption device and decryption device diagrams of FIG. 71 and FIG. 72 and can be utilized directly as a control signal for PLTNM and other encryption processes. In FIG. 73, however, signal 7313 is subsequently mixed, in this disclosed embodiment by multiplicative mixer 7314, with a second analog key signal 7303 applied as signal 7310 to produce a complex baseband signal 7312. The analog key signal 7303 may alternatively be analog key signal 7300. To generate a final modified baseband dynamic control signal, the processed key 7313 is summed additively with signal 7312 via adder 7315 to produce signal 7316, which is output as 7317 the baseband dynamic control signal.

Encrypted File Size and Encoding

Although most operating system files, whether text or binary, are stored as bytes or words, encoding for encryption from digital to analog, and from analog to digital do not have to utilize the same word or byte boundaries. That is, a message text file stored as a series of bits or 8-bit Bytes or 16-bit Words may be taken n-bits (e.g. 2-bits, or 4-bits, or 5-bits, etc.) at a time for encoding into an analog signal. In each of these cases, a full range of analog signal is divided into $2^n$ parts, where n is the number of bits taken at a time, and the encryption system then processes analog signals with larger or smaller step sizes depending on the number of bits.

As a specific, non-limiting, example, the previously mentioned 8-bit per byte message file may be read four (4) bits at a time, and the digital to analog encoder 7106 would then produce $2^4$ or 16 levels of analog output. Generally, for a digital to analog encoder, zero (0) produces the smallest analog output, and $2^n$ produces the largest analog output, though other cases exist. This analog output signal 7109 is smoothed by filter 7114.

Analog to digital encoder 7113, referring back to FIG. 71, converts an analog signal with a prescribed range into a range of digital values. Consider the analog signal with a prescribed range as having a fixed range. For example, this range can be +/−2 volts. If the analog to digital encoder 7113 utilized $2^n$ bits to encode the voltage range, and the sample rate remains the same as was used to encode the original digital signal into an analog signal, the encrypted file size will be the same as the original unencrypted file size. That is, if at the end of the encryption process analog to digital encoder 7113 takes analog signal 7121 and converts it into $2^n$ bits of data, the size of the data file will be equal to the original file, since encoder 7113 produces one data byte or word for every data byte or word that goes into digital to analog encoder 7106, and the sizes of the data words in and out are the same.

If at the end of the encryption process analog to digital encoder 7113 takes analog signal 7121 and converts it instead to $2^m$ bits of data, the size of the resulting file will change depending on the ratio of m to n.

$$\text{Ratio of file sizes} = m/n$$

If m is larger than n, the encrypted file will be larger than the original file. If m is smaller than n, the file size will be smaller. A consideration for choice of m and n is the amount of energy that is added to the original file by the encryption operation. Addition of energy may require a larger file size to store the new, encrypted file with fidelity.

The encryption process mixes energy from the analog key modulating a carrier with the message signal, resulting in more energy than occurred in the original message signal. This requires either more samples (faster sample rate) or more depth to samples (more bits per sample). In the present embodiment, more bits of data are acquired per sample in analog to digital encoding, resulting in a larger file size. Utilization of more bits in the analog to digital encoding than the digital to analog encoding means m is generally larger than n for encrypted signals resulting in the encrypted file being larger than the original file by a ratio of m/n.

Effect of the Ratio "m/n", Analog Signals, and the Analog Device

Referring to an encryption device represented, though not constrained, by FIG. 71, the digital message file 7100 generally represents a data file that may contain many data components or may be a single 'sequence' of numbers. In any case, these components or the sequence are composed at the most basic level of numbers of a representative size. Generally, the smallest size is a byte or 8 bits, but 16, 32, or 64-bit numbers are possible. Although it is possible for it to be larger, the value of n in embodiments shown is a smaller value than the number of bits in each number comprising the digital message file.

When these n bits of the message stream at 7101 are encoded into analog values at 7109, the sequence creates a signal envelope that is not the original message, and is not in the shape of the analog key 7102 or the dynamic control signal at 7118 or 7120, but is unique. This is the signal envelope that is filtered by filter 7114 and passed as 7117 to the PLTNM A and B system 7116. This now-modified signal 7121 is an analog signal envelope that is encoded by an m-bit analog to digital encoder 7113, creating another digital signal 7111 that comes from the original message, but does not have the characteristics of the original message 7100 due to the energy of the dynamic control signal added to the original unencrypted digital signal 7101.

Figure 85A:
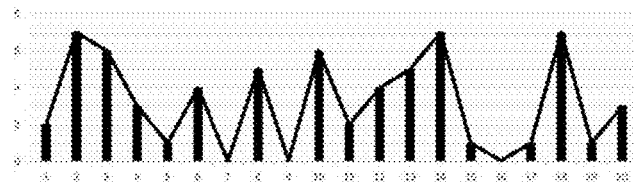
FIGS. 85A-C illustrates the effect of bit segmentation encoding on resulting digital to analog encoder waveforms.
Figure 85B:
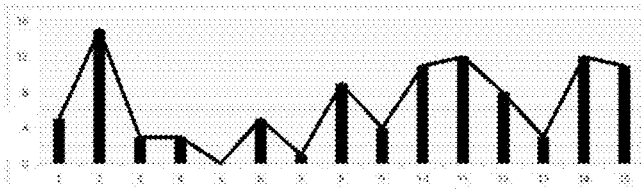
Figure 85C:
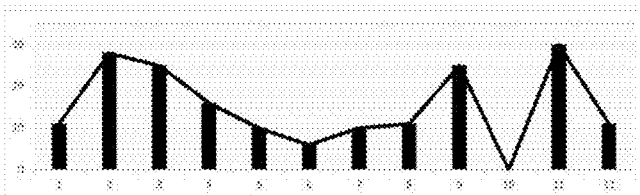

The information below and FIGS. 85A-C show the effect of streaming binary data from a digital message file, and segmenting or using a few bits at a time to encode the digital data stream to an analog waveform. From an example set of bytes from an example file might be obtained:

Original Data Read as Stream:
    0101111100110011000001010001100101001011110010
      00001111001011
3-Bit Segments:
    010 111 110 011 001 100 000 101 000 110 010 100 101
      111 001 000 001 111 001 011
    The digital to analog encoded waveform for 3-bit segmentation is shown in FIG. 85A.
4-Bit Segments:
    0101 1111 0011 0011 0000 0101 0001 1001 1001 0100
      1011 1100 1000 0011 1100 1011
    The digital to analog encoded waveform for 4-bit segmentation is shown in FIG. 85B. Note that the waveform resulting from using the data points as time samples of an analog waveform is different between the 3-bit and 4-bit segmentation.
5-Bit Segments:
    01011 11100 11001 10000 01010 00110 01010 01011
      11001 00000 11110 01011
    The digital to analog encoded waveform for 5-bit segmentation is shown in FIG. 85C. This waveform is different from either of 3-bit or 4-bit segmentation, and all three of these are different from encoding of the data one full byte at a time.

Just as use of different numbers of bits for encoding from digital to analog produces different waveforms, n-bit digital to analog encoding is not the opposite of m-bit analog to digital encoding, but the m-bit encoding produces a different digital sequence than was originally present. In addition, even if the digital message file 7100 were the digital representation of an audio file, for example a .WAV format file, the analog envelope at 7117 would not be the same as the analog signal that the .WAV file represents.

In the particular embodiment disclosed herein both m and n are fixed, so the ratio m/n is also fixed. Although the ratio at any point in time during encryption and decryption must be known, it is possible to modify m and/or n, thus modifying their ratio, during the course of encryption and thus decryption.

Analog Key Input

A typical digital security key is derived using a random number generator that then produces a sequence of "1's" & "0's" or binary data. A disclosed aspect of the current disclosed embodiment is its use of complex analog waveforms as security keys. Analog security keys are continuous, not discrete, and therefore contain a number of variable signal dimensions or characteristics such as amplitude, phase, frequency and time.

To further distinguish a complex continuous analog security key and a discrete digital security key, rather than being limited to two discrete binary values (0's or 1's) that simply represent logic states, an analog signal used as a security key, has, at any point in time, amplitudes that are not limited to only two discrete values, but can have values between "1" and "0" (e.g., 0.15, 0.9, 0.57), as well as values greater than "1" or less than "0". Also, a "strong" digital key may be represented by 256 bits (and perhaps larger, e.g., 3072). In comparison, the digital representation of analog security keys could easily exceed 50,000 bytes (or 400,000 bits) even for relatively short keys. Whereas a digital key has a fixed value and sequence, an analog key has a time-varying component where along its 'length' (over time) there are complex variations that can occur in the signal characteristics (e.g., phase frequency, time, amplitude). To summarize, the variation of analog security key waveforms are orders of magnitude more complex than a digital security key, and have a number of additional signal characteristics, well beyond those of a digital security key based on a random number sequence.

As described previously, the analog security key signal is used to create a dynamic control signal that modulates the analog-encoded data file by, in addition to other methods, controlling variable components comprising the "Phase-Linked Temporal Non-linear Modulation" (PLTNM) technology. This technology, embodied in analog circuitry, simultaneously modulates multiple signal characteristics of the analog key waveform and the analog representation of the data stream (message) resulting in 2nd-order or higher, non-linear, manipulations of various waveform characteristics including amplitude, phase, frequency and time.

Analog keys are utilized within the present invention as complex modulators of carriers that may or may not be brought back to baseband depending on application, and that, in either case, are then utilized to further drive the changes in value of variable components in PLTNM circuits, thereby enabling modulation of a message signal in a complex manner that can be essentially reversed or "undone" (decrypted) with the appropriate analog security key, but is complex enough that other methods (particularly digital) cannot.

Requirements for a successful Analog Key signal include that the signal continuously varies or, in other words, the Key not have substantially zero or substantially 'dead' periods on the waveform, as an unchanging analog key will generate changes of the signal characteristics (e.g., frequency) of the dynamic carrier, and, as a result, encryption may be less effective or compromised. Activity in both the amplitude and frequency domains is important, and the more random and dynamic the changes in the analog Key signal, the better the resultant encryption "strength". As an opposing example, a single sine wave has amplitude changes, but makes a sub-standard key as it covers only select frequency areas in the frequency domain as a dynamic carrier.

For both encryption and decryption, the analog key must start at the same time as the message, or for decryption of the encrypted message, and end when the message concludes. This may be accomplished by a single run of the key from start to finish, or it is also possible for a shorter key to be 'replayed', or started over again, when the end is reached. The critical element is that the length of the message being encrypted or decrypted and the key used for encryption or decryption must be of at least the same length.

Where the encryption/decryption system is equipped to handle the signal directly as an input, it is possible to use an analog signal that has not been previously converted to digital for storage. It is also possible to use recorded analog signals that are stored as digital files but can be 'played back' or output as an analog signal.

Cascading of Encryption/Decryption Blocks

A simple encryption/decryption system described by the present invention includes the device of FIG. 71 to receive an unencrypted digital file and produce an encrypted digital file for storage thereof. A device of FIG. 72 can then be used to receive that encrypted digital file to return an unencrypted digital file. As with other examples, there can be transmission or transport of data, or other transactions without limiting the scope of this disclosed embodiment.

Additional levels of encryption are also possible, and some simplification of hardware design is possible, if the encryption function is spread out across two or more blocks, also then requiring that decryption be spread across a like number of blocks. As an example, two or more devices according to FIG. 71 can follow one another, where the encrypted output file from one block becomes the input file for the next block. The encryption process is agnostic to whether a file has previously been encrypted or not and so proceeds to encrypt the file as it is just a digital data stream. This, again, may be cascaded for two or more stages. The size of the file increases generally as the ratio of n/m as noted above for each stage. Each of the processes can use either the same or different analog key signals, as their operation is independent.

Decryption must be performed in the reverse order of encryption. That is, any parameters or keys utilized in the last stage of encryption are applied for the first stage of decryption, and stages or devices are applied until the number of decryption stages matches the number of encryption stages. This ordering is generally known as LIFO or Last In First Out.

Reflective of the various serial and parallel configurations available for PLTNM and ADM circuits described hereinabove, it is also possible to split the data-stream from a data file to be encrypted, whether previously encrypted or not, and route shorter data-steam components to multiple parallel FIG. 71 devices. This will produce multiple output files that have to be independently decrypted using individual FIG. 72 devices as well, and then the final decrypted file is reconstructed from the multiple data-stream components.

Description of a Particular Embodiment with Data

Encryption/Decryption System with PLTNM for Data Files
Model Results
Encryption

One particular embodiment of a system for encryption and decryption of digital data including potential storage of an encrypted file utilizes the block diagrams of FIG. 71 and FIG. 72. FIG. 71 comprises a complete encryption device with a digital message file 7100 input, an analog key signal 7102 input, and an encrypted digital file 7122 output. This encryption device does not require availability of the decryption system of FIG. 72 to operate, and as an independent system will generate a stored encrypted data file. This particular embodiment retrieved input files from the local computer operating system and stored output files to the local computer operating system file storage.

The element-by-element description of the encryption device of FIG. 71 is described elsewhere. In this embodiment PLTNM$_A$ of Encryption PLTNM 7116 is driven by a baseband dynamic control signal 7118, and the modification provided by block 7119 is inversion (multiplication by −1) of the signal 7118 to produce signal 7120. This may be expressed as:

$$7120(t) = (-1) * 7118(t)$$

PLTNM 7116 sub-circuits A and B modulate the analog encoded message according to the applied level and frequency of the baseband control signals 7118 and 7120, producing a signal 7121 at baseband that is now unlike the analog encoded message 7117, and that when encoded back to digital by analog to digital encoder 7113 with a set number of bits m per sample, now is an encrypted digital file 7122.

For the encryption process to start data from the digital message file 7100 must transfer via 7101 to the digital to analog encoder 7106 to be converted to an analog signal 7109, and after to analog signal 7117. The first production of a signal at 7117 must coincide with the start of the analog key signal 7102, and the analog key signal 7102 must continue to the end of, and stop at the same time as, the last of signal 7117 produced by data from the digital message file 7100 encoded through digital to analog encoder 7106.
Decryption The decryption system of FIG. 72 is a complete decryption system with an encrypted digital file input 7200 which is the file 7122 produced by the encryption system at some point in the past, an analog key signal input 7202, and a decrypted digital file output 7205. For this embodiment files are not streamed but the encrypted digital file 7200 and the analog key signal 7202 originate from the local operating system file system, and the decrypted digital file 7205 is saved to the local operating system file system. This decryption system requires only the two input files and one output file and does not require the encryption system of FIG. 71 to be operating at the time that it decrypts the encrypted message file.

Analog key signal 7202 for decryption must match analog key signal 7102 used for encryption for the decryption process to work. If signal 7202 does not match signal 7102 in timing, frequency, amplitude, or other parameter, a mismatch condition will occur and the message signal will remain undecrypted and secure.

The element-by-element description of the decryption device of FIG. 72 is described hereinabove. In this embodiment PLTNM$_A$ of Decryption PLTNM 7219 is driven by a baseband dynamic control signal 7220, and the modification provided by block 7221 is inversion (multiplication by −1) of the signal 7220 to produce signal 7222. This may be expressed as:

$$7222(t) = (-1) * 7220(t)$$

PLTNM 7219 sub-circuits A and B modulate the analog encoded encrypted digital file according to the applied level and frequency of the baseband control signals 7220 and 7222, producing a signal 7223 at baseband that is now unlike the analog encoded message 7218, and that when encoded back to digital by analog to digital encoder 7214 with a set number of bits n (generally different from m from the encryption encoding) per full scale voltage range, now is a decrypted digital set of data 7207 that is accumulated and stored into a decrypted digital file 7205.

For the decryption process to start, data from the encrypted digital file 7200 must transfer via 7204 to the digital to analog encoder 7206 to be converted to an analog signal 7212, that transfers to filter 7217 and subsequently to analog signal 7218. The first production of an unencrypted analog message signal at 7218 must coincide in time with the start of the analog key signal 7202, and the analog key signal 7202 must continue to the end of, and stop at the same time as, the last of the unencrypted analog message signal 7218 produced by data from the encrypted digital file 7200 encoded through digital to analog encoder 7206.

Data Results

These results represent one instant example demonstrating the utility of the methods and devices and is not a limiting example. Practitioners skilled in the art will recognize that frequencies and bandwidths can be scaled, thereby increasing or reducing the complexity of the various signals, as well as encryption strength based on the needs of the individual application within the bounds of the present technology.

Time Domain

Matched Keys

Figure 78:
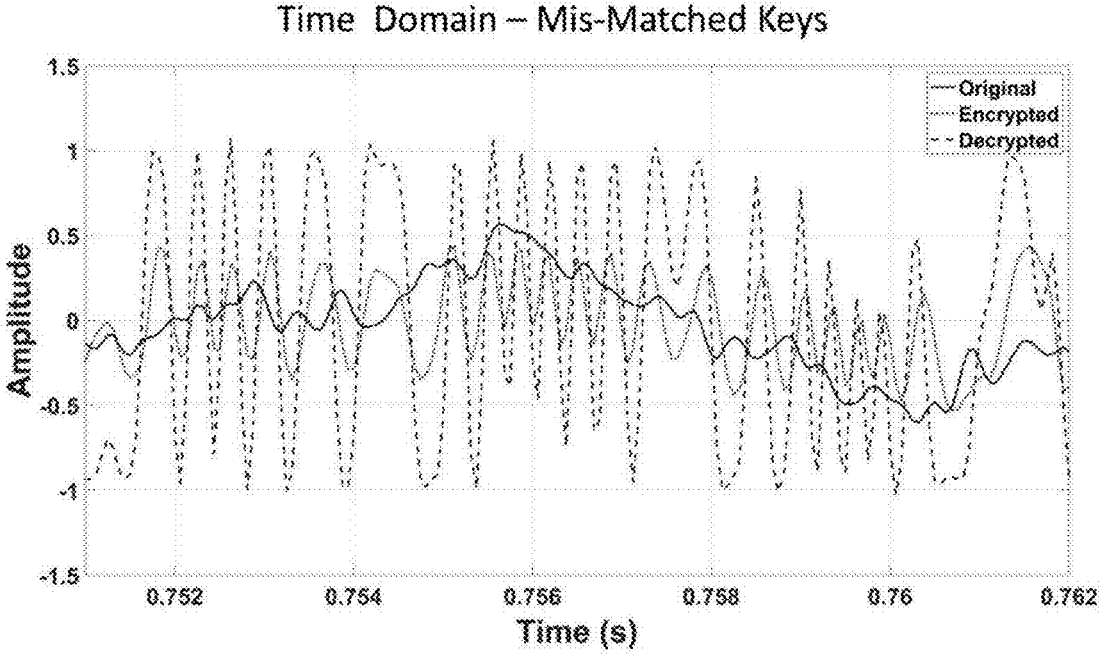
FIG. 78 illustrates the resultant time domain waveforms using the PLTNM-based encryption-decryption system of FIGS. 71 and 72 with mismatched encryption and decryption keys.

FIG. 78 illustrates in the time domain (showing what the analog signals look like over time rather than their frequency content) the result of reducing to practice the combinations of FIG. 71 and FIG. 72 using PLTNM-based encryption and decryption devices, and where the analog key presented to both the encryption device and the decryption device match. The analog encoded representation 7117 (Original) of the digital message file 7100 is a baseband signal, the analog key signal used for encryption 7102 is a baseband signal that is maintained at baseband for use as baseband dynamic control signals 7118 and 7120, and the resulting analog encoded version 7121 (Encrypted) of the encrypted digital file 7122 is additionally a baseband signal.

Likewise on the decryption side, the analog encoded representation 7218 of the encrypted digital file 7200 is a baseband signal, the analog key signal used for decryption 7202 is a baseband signal that is maintained at baseband for use as baseband dynamic control signals 7220 and 7222, and the resulting analog encoded version 7223 (Decrypted) of the decrypted digital file 7205 is additionally a baseband signal.

In this example, the decrypted signal 7223 is slightly time-delayed relative to the message signal 7117 due to filters, for example 7217 following digital to analog encoder 7206 and delays in encoding and decoding. This delay is to some extent a product of the particular encoder method chosen for this embodiment and those skilled in the art may utilize other encoding methods.

The Pearson correlation coefficient ("Pearson r" or "CC") provides an objective means to quantify how well two waveforms correlate to each other-basically how similar they are. The Pearson r ranges from −1 to +1 in which the "1" and "−1" indicate 100% positive and negative correlation, respectively, and a "0" value indicates that there is no correlation between the two waveforms. The correlation coefficient provides an objective indication of the similarity or difference between the original message signal, the encrypted signal, the decrypted signal and the analog key. The following correlation ("r") results are for the matched key case.

The analog key signal used here for both encryption (7102) and decryption (7202) is uncorrelated with the message 7117 (r=0.113), the decrypted message signal 7223 (r=0.113), and encrypted message signal 7121 and 7218 (r=0.0462).

For mismatched keys the only difference is the correlation between the decrypted message 7223 and key 7202 at r=0.043.

Note that the decrypted signal 7223 in FIG. 20 is highly correlated with the message signal 7117 (r=0.999).

The encrypted message signal 7121 and 7218 does not correlate with either the message signal 7117 (r=0.231), the analog key signal 7102 and 7202 (r=0.0462), or the decrypted message signal 7223 (r=0.231).

Mismatched Keys

In a key-based encryption system, the key used for decryption must match (be identical to) the key used for encryption in order for the message signal to be retrieved. "Retrieved", in this context, means that the encrypted signal is decrypted to recover the original message. If the signal applied as a key for decryption does not match the key used for encryption, the original message cannot be decrypted or recovered.

FIG. 78 illustrates the signals produced from the system of the combination of FIG. 71 and FIG. 72, in which the key applied for decryption is not identical (mismatched) to the key applied for encryption. FIG. 78 illustrates a representative portion of a message signal 7117 encrypted by an analog key 7102 to generate an encrypted message signal 7121.

When encrypted message signal 7121 is encoded as a digital message and the re-encoded as an analog signal 7218 and presented to the decryption device (FIG. 72), the analog key signal 7202 in this case is not identical to analog key 7102 utilized for encryption, the decrypted message signal 7223 in FIG. 78, as a non-limiting example, is generated that has essentially no correlation with the original message signal 7117 (r=0.177) (i.e. it bears no resemblance to the original message signal 7117 waveform). The original message signal 7117 cannot be detected or recovered (decrypted) from the encrypted signal using the wrong key, 7202 (not identical to the key applied for encryption, and is thus protected from unauthorized access.

For mismatched keys the only difference is the correlation between the decrypted message 7223 and key 7202 at r=0.043. The message signal and encrypted signal (encrypted message signal) are highly uncorrelated (r=0.231).

Frequency Domain

The time domain results illustrate the relationship between signals in the encryption/decryption system as they vary over time. The frequency domain analyses provide another means to examine the relationships between the various encryption and decryption device signals. The power spectrum quantifies the relative power contribution from individual frequencies that comprise the time domain waveform.

Matched Keys

Figures 79A, 79B, 79C:
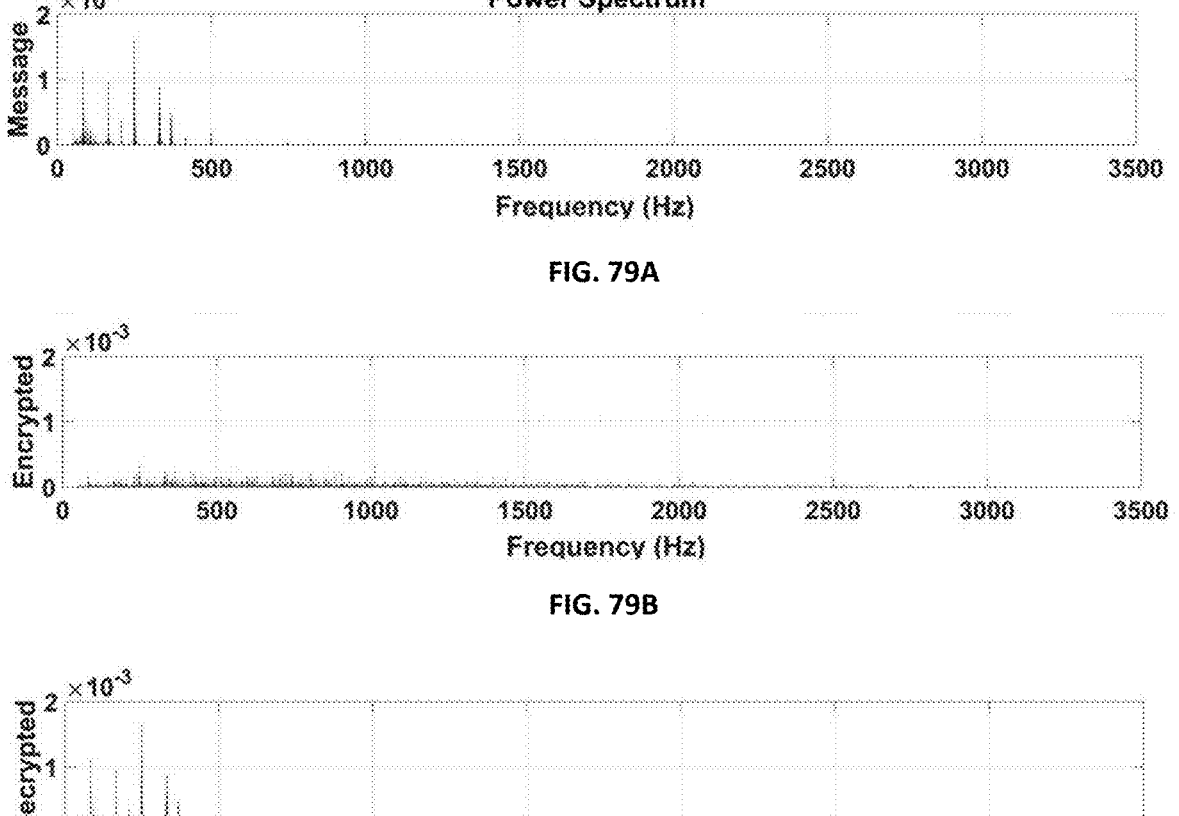
FIGS. 79A-C illustrate the power spectra using the PLTNM-based encryption-decryption system of FIGS. 71 and 72 with matched encryption and decryption keys.

FIGS. 79A-C illustrates the power spectrum of the original message signal 7117, the decrypted message signal 7223, and the encrypted message signal, both 7121 and 7218. When the encryption analog key 7102 matches the analog key 7202 used for decryption, the power spectrum of decrypted message 7223 matches the power spectrum of the original message signal 7117. For the encrypted message signal 7121 and 7218, the power spectra are more evenly distributed across a broader bandwidth as compared to the original message signal 7117. Where the message signal 7117 had significant energy in fewer frequency bands, that energy has been spread across a wider spectrum. There is also additional frequency content from the key-modulated carrier(s). The amount of spectrum used is a tunable parameter in a disclosed embodiment and, as such provides an analog key "sensitivity" adjustment that impacts the frequency and phase modulation in the generation of the dynamic carrier and, thus, the encrypted signal. This adjustment facilitates increasing the encrypted signal complexity (strength) by increasing the dynamic carrier bandwidth (before being referred back to baseband) and thus can be used to accommodate specific user/application related requirements.

Mismatched Keys

Figure 80A:
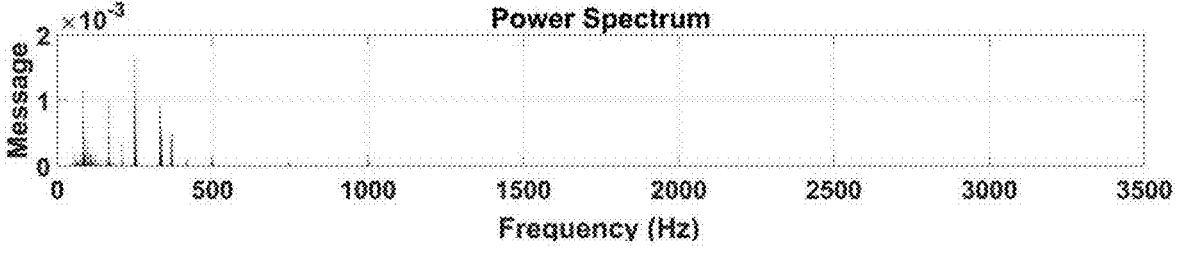
FIGS. 80A-C illustrate representative power spectra using the PLTNM-based encryption-decryption system of FIGS. 71 and 72 with mismatched encryption and decryption keys.
Figure 80B:
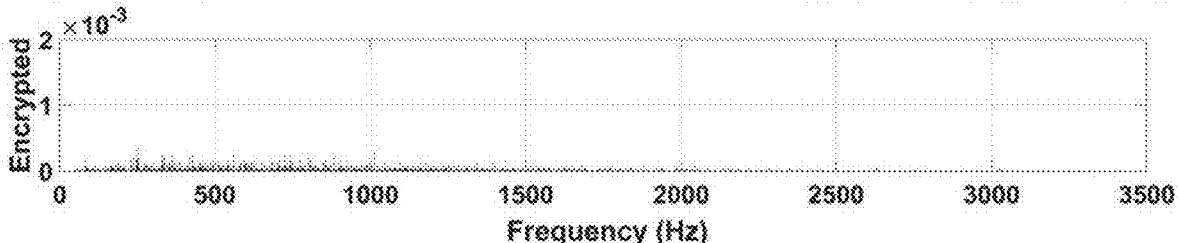
Figure 80C:
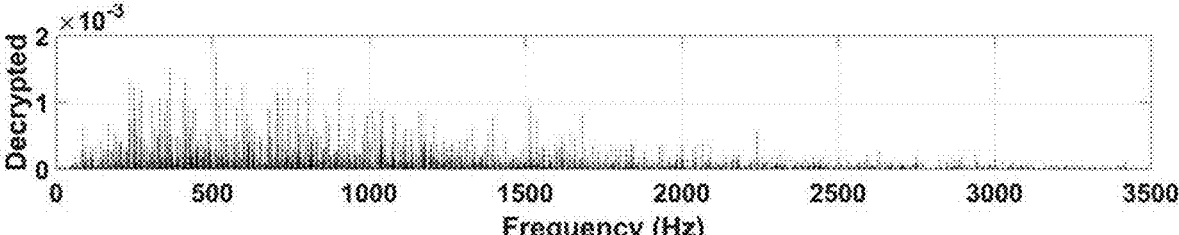

The effect of applying mismatched keys is also demonstrated in the frequency domain. As a non-limiting illustration, when the analog key signal presented at 7102 for encryption is not identical to the analog key signal presented at 7202 for decryption, the power spectrum of the incorrectly decrypted signal 7223 will vary significantly from the original message signal 7117. In FIGS. 80A-C, both the power spectra of the original message signal 7117 and the power spectra of the incorrectly decrypted message signal 7223 are shown. Note that the power spectrum of each of the two signals is quite distinct. For both the encryption device and the decryption device, an analog key signal is received that modulates a carrier. In both devices those modulated carriers are mixed with their respective carriers and filtered to create baseband key-derived signals used to drive PLTNM circuits for encryption. The increased power at each frequency in the graph of the decrypted signal as well as the increased frequency range, are a result of the mismatched key-derived signal applied being multiplicatively mixed with the original key-derived signal and message—as opposed to the analog encryption key-derived signal being removed from the original message. The original message signal 7117 is comprised of specific regions of concentrated power at specific frequencies along with other frequency regions with much less power. The decrypted message signal 7223 has energy spread across a broader spectrum and no longer exhibits the distinctive power spectrum contour of the original message 7117. Although visually the decrypted message signal 7223 appears to be similar to the encrypted message signal at 7121 and 7218 in that they both have much broader spectral dispersion than the original message 7117, the Pearson cross-correlation analysis indicates that the two signals are not highly correlated (r=−0.681).

Additional Results Analyses: Spectral Coherence and Cross-Spectrum Phase

Additional signal analyses compare the original message signal to both the encrypted and decrypted signal following the application of both "Matched" (identical to the key used for encryption) and "Mis-Matched" analog security keys for decryption. These analyses support assertions regarding simultaneous effects of the encryption process on multiple signal characteristics (e.g., frequency, phase, etc.) of the original message signal depicted relative to both the encrypted and decrypted signals.

Spectral Coherence-identifies frequency-domain correlation between signals. The results range from zero ("0") to one ("1"). Similar to correlation, coherence values approaching "O" indicate that corresponding frequency components are uncorrelated; values approaching "1" indicate that the corresponding frequency components are correlated.

Figure 81A:
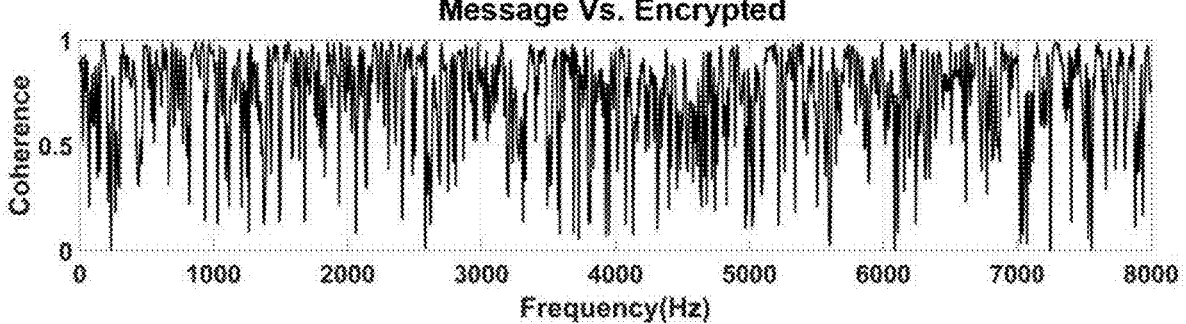
FIGS. 81A-B illustrate representative spectral coherence using the PLTNM-based encryption-decryption system of FIGS. 71 and 72 with matched encryption and decryption keys.
Figure 81B:
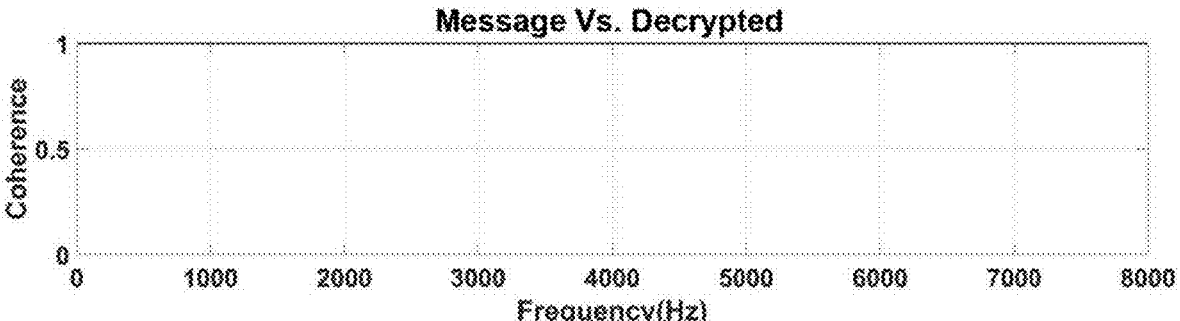

Spectral coherence results for the PLTNM-based encryption-decryption system of FIG. 71 and FIG. 72 with matched and mis-matched keys are shown in FIGS. 81A-B and FIGS. 82A-B, respectively. FIGS. 81A-B show results for matched keys, where the top half of the graph indicates the coherence across frequency between the message signal 7117 and the encrypted signal 7121. The lack of coherence indicates a more detailed analysis providing, with respect to frequency, consistent with the single-number cross-correlation result. The lower graph shows the coherence estimate between the message signal 7117 and the decrypted signal 7223, where again the uniform value across frequencies corroborates the single Pearson's cross-correlation value found between these two signals.

Figure 82A:
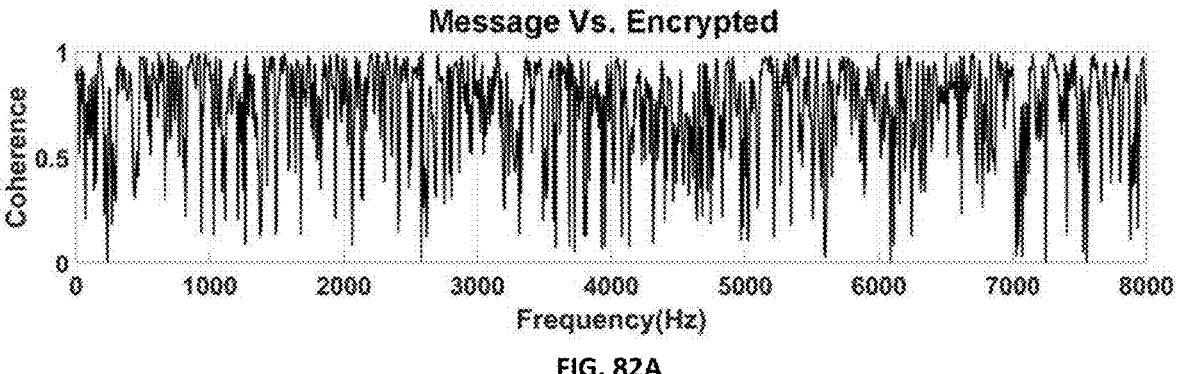
FIGS. 82A-B illustrate representative spectral coherence using the PLTNM-based encryption-decryption system of FIGS. 71 and 72 with mismatched encryption and decryption keys.
Figure 82B:
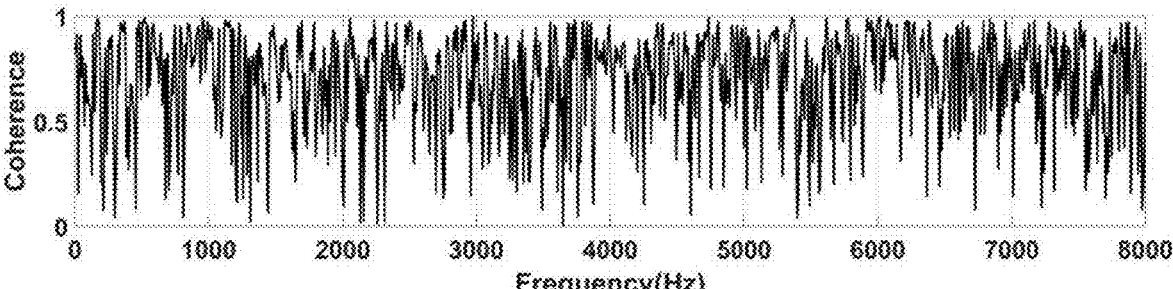
Figure 83A:
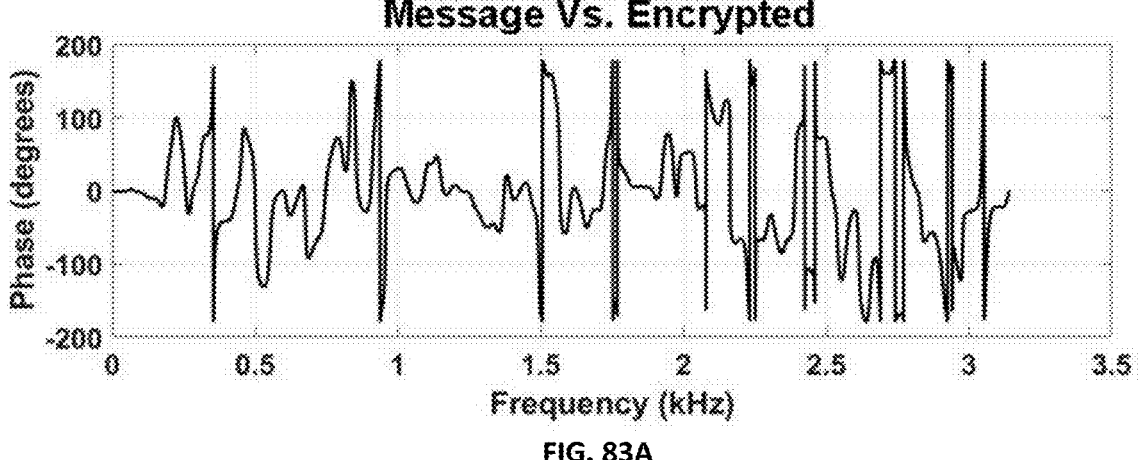
FIGS. 83A-B illustrate the cross-spectrum phase plots for the spectrum of FIG. 81.
Figure 83B:
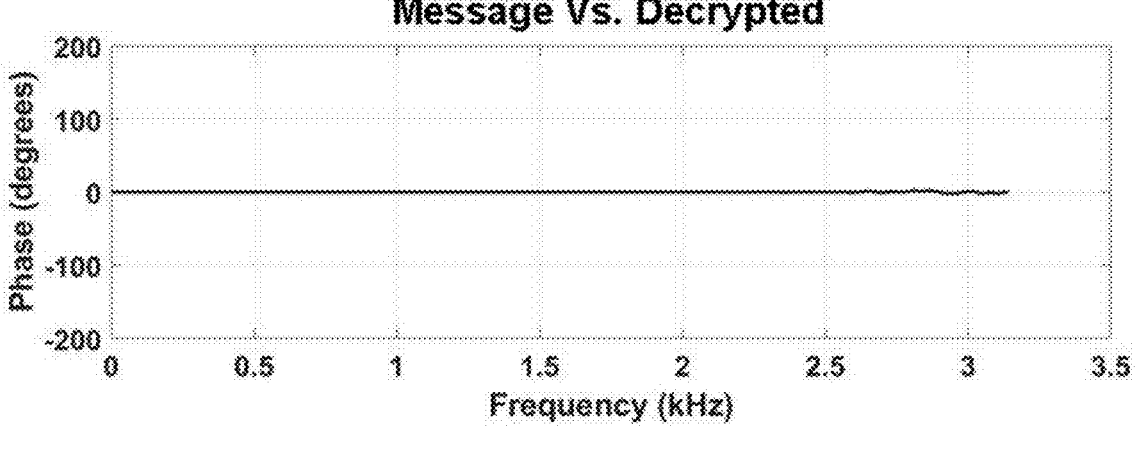
Figure 84A:
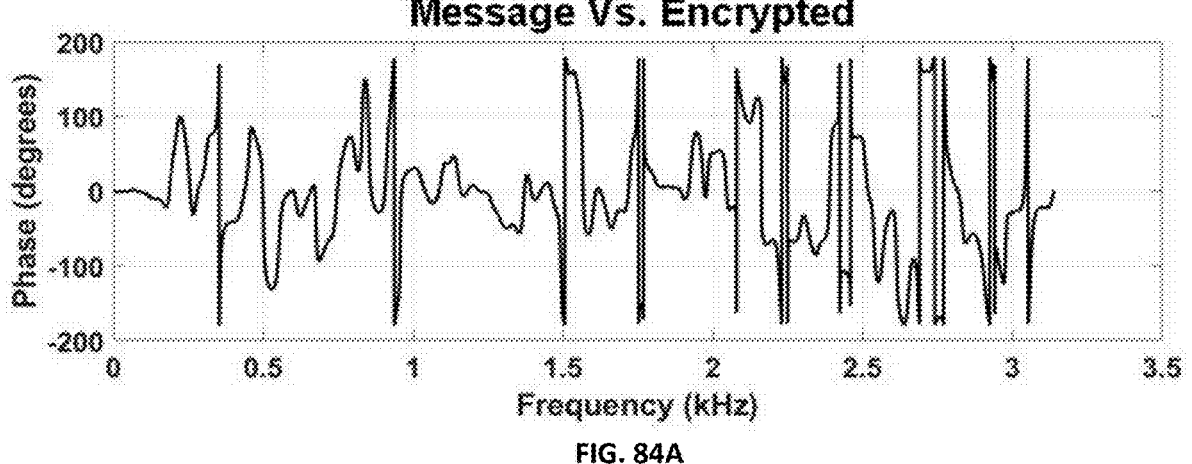
FIGS. 84A-B illustrates the cross-spectrum phase plots for the spectrum of FIG. 82.
Figure 84B:
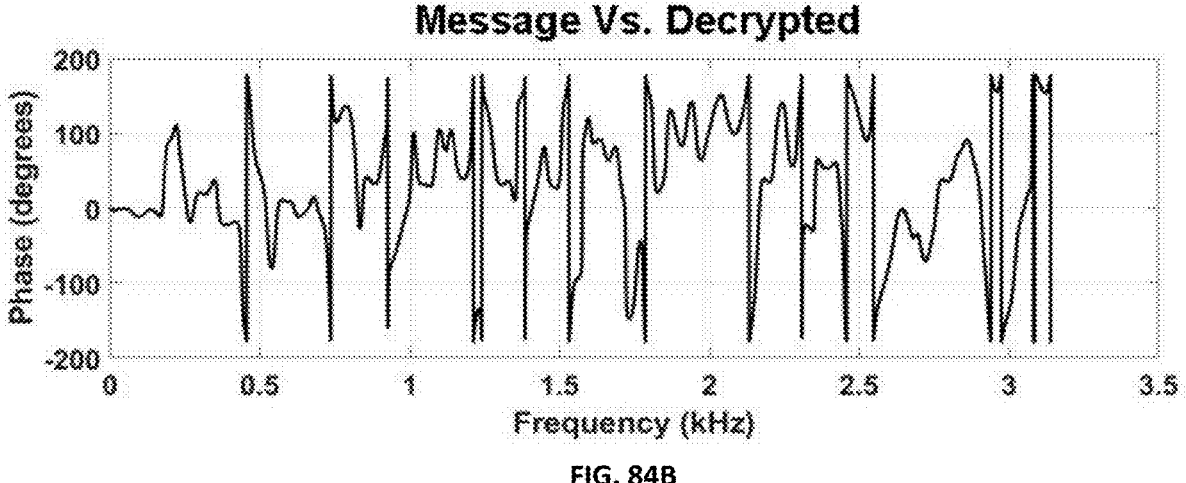

The mis-matched key case is where the analog key 7102 used for encryption does not match the analog key 7202 used for decryption. These results are shown in FIGS. 82A-B. Spectral coherence estimated across frequency for the message signal 7117 versus encrypted signal 7121 and 7218 is the same as for the matched key version, but in the lower pane of FIG. 25 the coherence estimate across frequency of the message 7117 versus the decrypted signal 7223 shows lack of coherence, consistent with the poor correlation value of r=0.681.

Cross-Spectrum Phase: estimates the relative phase in degrees (y-axis) between the signal spectral (frequency) components (x-axis).

The cross-spectrum phase results for the PLTNM-based encryption-decryption system of FIG. 71 and FIG. 72 shows the matched key and mis-matched key cases in FIGS. 83A-B and FIGS. 84A-B, respectively. The top half of each graph shows the relative phase across a range of frequencies from 0 Hz to approximately 3.5 kHz. Key mismatch is caused by changing the key on the decryption process at 7202, and since the key on the encryption side at 7102 is not changed, the top halves of the graphs of FIGS. 83A-B and 84A-B are identical. This is also true for spectral coherence and FIGS. 81A-B and 82A-B. The bottom half of each graph showing the cross spectrum phase between message 7117 and the decrypted signal 7223 does not match, however, as changing from matched to mismatched analog keys (7102 not the same as 7202) changes the phase relationship from a linear one to a relatively chaotic one, again matching the results of the cross-correlation.

Orthogonal Systems

Orthogonal Signals

The above discussion utilizes sinusoids as exemplar signals where orthogonal signals may be obtained. Sinusoids are not the only orthogonal functions, but functions which satisfy the relation:

$$0 = \langle f, g \rangle = 1/L \int_{-L}^{L} f(x)g(x)dx$$

That is, the inner (dot) product must equal zero.

Theory of the Orthogonal Encryption/Decryption System

The orthogonal system of the present invention has a message signal input, an analog key signal input that modulates both a standard carrier to form a standard dynamic carrier, and a carrier orthogonal to that standard carrier used to generate an orthogonal dynamic carrier, and a second encryption signal to be added orthogonally. Optionally, a second key signal input to be used to modulate the orthogonal carrier rather than having the Analog Key Signal modulate both may be used. With this possible second key signal input, the second carrier generated, that is orthogonal to the first carrier, is either modulated by the second key signal if available, or the analog key signal if no second key signal is used. This orthogonal carrier is modulated by either the Analog Key Signal or the Second key signal, depending on availability in the system. The second key signal is not required, and in the present invention drawings only one is shown.

Orthogonal Equations:

For a message signal M mixed with (multiplied by) cos [θ(t)] and a second encryption signal N mixed with sin [θ(t)], an encrypted signal E, a sum of orthogonal components is:

$$E = M\cos[\theta(t)] + N\sin[\theta(t)]$$

where θ(t) is $$\theta(t) = \omega_c t + \varphi_i(t)$$

This is angle modulation comprising one or both frequency and phase components, defined as:

$$\varphi_i(t) = k_f \int \text{key}(t)dt \ \text{(FM)}$$

$$\varphi_i(t) = k_p \cdot \text{Key}(t) \ \text{(PM)}$$

$k_f$ is the key amplitude to frequency conversion constant and $k_p$ is the key amplitude to phase conversion constant. $\omega_c$ is the oscillating frequency of the carrier when the key amplitude is zero and is the center frequency of the angle modulation bandwidth. Note the term carrier is used here as it is common terminology for this type of mathematical/electrical operation, but the utilization may be only for encryption and not transmission.

Here, cos [θ(t)] and sin [θ(t)] are defined to be orthogonal functions on the period interval 0≤θ(t)≤2π. This orthogonality can be defined as there is no mutual interface between them on this interval based on their following orthogonality definition, $$\int_0^{2\pi} \sin[\theta(t)] \cdot \cos[\theta(t)]d\theta(t) = 0$$

FM and PM are using exactly the same physical hardware to generate, which is typically VCO. If FM is selected, then the key must be timely integrated before being applied to the VCO, on the other hand, if PM is selected, the key is applied directly to the VCO. In order to retrieve the message signal M as the Decrypted message D and eliminate N, we mix E with a carrier of frequency as cos [θ(t)] because of its orthogonality with sin [θ(t)] and non-orthogonality with itself:

$$D = E \times \cos(\theta(t))$$

$$D = 0.5M\{\cos(0) + \cos(2\theta(t)\} + 0.5N\{\sin(0) + \sin(2\theta(t))\}$$

Utilizing the Following Identities:

$$\cos(0) = 1$$

$$\sin(0) = 0$$

$$D = 0.5M + [0.5M\cos(2\theta(t)) + 0.5N\sin(2\theta(t))]$$

After Filtering:

$$D = 0.5M$$

The preceding equation indicates that the decrypted message is the original message scaled by ½, along with two higher frequency components that must be removed by filtering.

Orthogonal Encryption/Decryption

Figure 75:
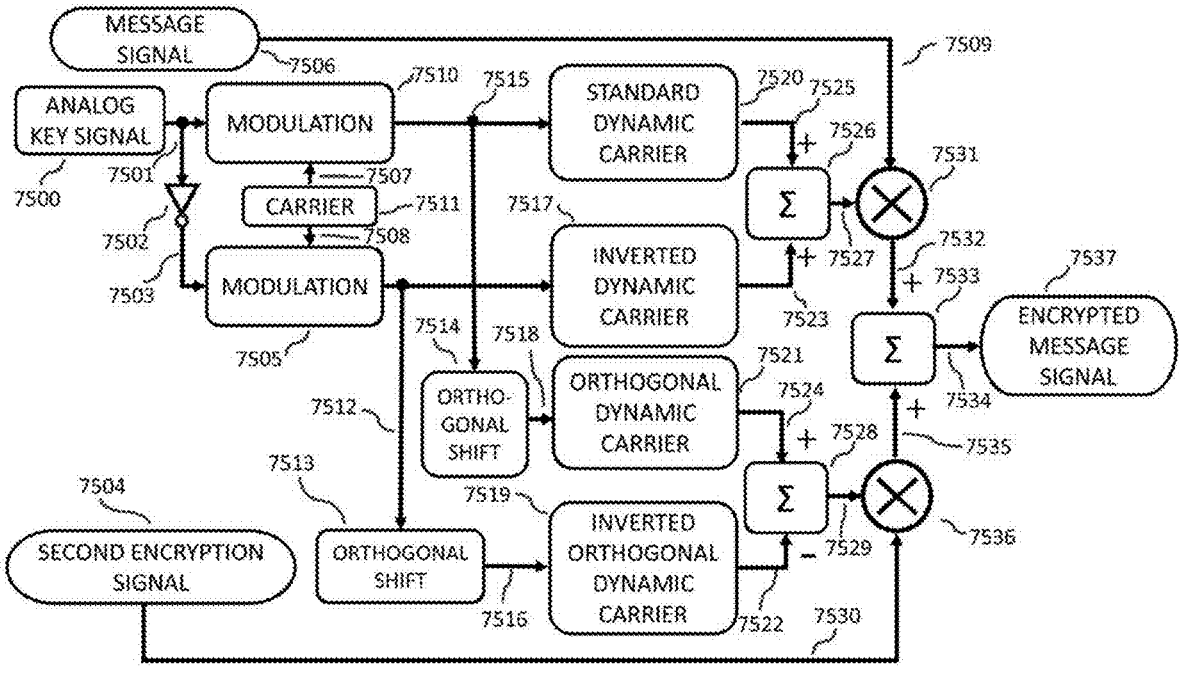
FIG. 75 illustrates a block diagram of an encryption device with orthogonal carriers utilizing inverted and/or processed keys.
Figure 76:
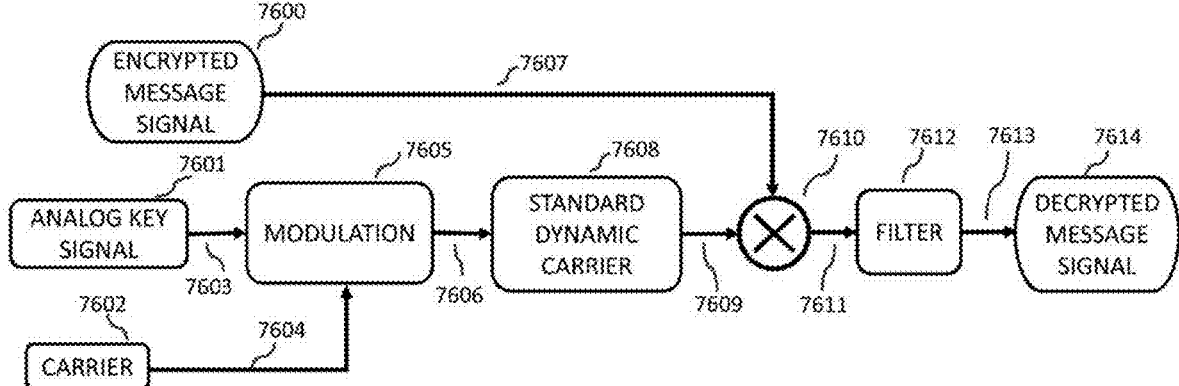
FIG. 76 illustrates a block diagram of a decryption device with orthogonal carriers.

FIGS. 74 and 75 illustrate encryption systems that utilize orthogonal carriers and orthogonally incorporated encryption signals where a standard analog key is used directly (FIG. 74), or where an inverted key is used (FIG. 75). In either case, a processed key may be used in place of the analog key signal. The diagrams of FIGS. 74, 75, and 76 illustrate non-limiting examples of systems with two orthogonal signals, but orthogonality is not limited to two sinusoidal signals. Signals other than sinusoids may be utilized, and more than two signals can also be utilized. For the sake of simplicity, this discussion will show two sinusoidal signals 90 degrees or π/2 radians out of phase.

Increased signal encryption complexity corresponds to improved encryption strength. Increased signal complexity can be achieved through the signal mixing process by use of multiple (two or more) carriers, in which the carriers being modulated are orthogonal to one another.

One channel contains the message of interest and the other contains a second encryption signal combined in an orthogonal manner relative to the message signal. The two channels are configured such that if the identical analog key signal is used for both encryption and decryption, the additional orthogonal second encryption signal is eliminated and only the message of interest is retained in the decrypted message. If the analog key signal used for decryption does not match the analog key signal used for encryption, then some or all of the second encryption signal added by the orthogonal carrier is retained, thereby degrading readability of the received message. During transmission the encrypted signal contains energy not only from the original message signal, but also from the analog key signal and the second encryption signal. As this encryption process tends to spread signal energy over available bandwidth, the use of both analog key and second encryption signal adds additional encryption strength.

Referring now to FIG. 74, the method of orthogonal carriers described above is illustrated. A message signal 7400 is presented to the encryption device illustrated by FIG. 74 concurrently with the analog key signal 7401. The analog key signal 7401 is transported to a modulator 7405 which can be of several types. Here, as a non-limiting example, the modulator 7405 can be an angle modulator, and in a particular case can be a voltage-controlled frequency modulator. The carrier 7402 is generated and presented as 7404 to the modulator 7405, where it is, in this example, frequency modulated by the analog key signal 7401 to produce a dynamic carrier 7409. This dynamic carrier 7409 is utilized as a standard dynamic carrier 7413, and at the same time phase shifted 90 degrees by orthogonal shifter 7410 to produce signal 7408 to be used as the orthogonal dynamic carrier 7412. This description utilizes sinusoids and a 90 degree or $\pi/2$ radian phase shift for illustration of orthogonal signals, but as is noted later in this document, other examples of orthogonal signals are available, having different requirements for variation between them to create orthogonality. Signals 7413 and 7412 are the two orthogonal signals that will be used for mixing with message and second encryption signals respectively.

Message signal 7400 presented through 7407 at mixer 7418 is mixed with the standard dynamic carrier 7413 presented at 7415 to produce a mixed signal 7414. On the orthogonal side, the orthogonal dynamic carrier 7412 presented as signal 7474 to mixer 7420 is mixed with the second encryption signal 7406 presented to the mixer as signal 7411 to produce orthogonal mixed signal 7416.

Mixers illustrated in FIG. 74 can be of several types and to those skilled in electronics and communications, can for explanatory purposes be considered multiplicative mixers. The mixer function is required to be reversible for recovery of signals during decryption.

Mixed signal 7414 and orthogonal mixed signal 7416 are summed additively by summer 7419 to produce the composite signal 7420 designated the encrypted message signal 7422.

Orthogonal Encryption with Inverted Key

In an encryption system, if the encrypted signal or message is captured, and the analog key signal accessed, the encrypted message can be decrypted to obtain the original unencrypted message. This is intended for the user, but to be avoided for others.

One method to provide additional protection for the key within the encrypted signal is to use an inverted (multiplied by −1) version of the analog key signal as an additional analog key signal to be used to modulate a carrier to produce a dynamic carrier. There are then two dynamic carriers available, one from the direct use of the analog key signal to modulate the carrier and the other from the inverted version of the analog key signal also used to modulate the carrier. These can be summed and used as the dynamic carrier for mixing with a message or other signal.

FIG. 75 is a variation of the orthogonal encryption system shown in FIG. 74 but configured additionally with inversion of the analog key for protection from extraction. In this diagram the analog key signal 7500 as signal 7501 modulates via modulator 7510 a carrier 7511 delivered as carrier signal 7511 to produce a signal 7515 designated as the standard dynamic carrier 7520. The analog key signal 7500 delivered as 7501 is also inverted through inverter 7502 to produce signal 7503 which modulates via modulator 7505 (identical in characteristics to modulator 7510) the carrier 7511 delivered as signal 7508 to produce signal 7512, designated as the inverted dynamic carrier 7517. Signals 7520 and 7517 presented as signals 7525 and 7523 respectively are summed by additive summer 7526 to produce summed dynamic carrier 7527. Summed dynamic carrier 7527 is the 'standard' carrier in that it is not the orthogonal version.

A summed orthogonal dynamic carrier 7529 is also created. Referring to the point in the process in which the analog key modulates a carrier to produce a modulated carrier at 7515, an inverted version of the analog key signal modulates a carrier to form an inverted modulated carrier at 7512. The signal at 7515 is, in the case of sinusoidal carriers, phase shifted by 90 degrees or $\pi/2$ radians by phase shifter 7514 to produce signal 7518 designated the orthogonal dynamic carrier 7521. The inverted modulated carrier 7512 is phase shifted by 90 degrees or $\pi/2$ radians by phase shifter 7513 to produce signal 7516, designated the inverted orthogonal dynamic carrier 7519. The inverted orthogonal dynamic carrier 7519 as 7522 is subtracted from the orthogonal dynamic carrier 7521 as signal 7524 by summer 7528, producing as output summed orthogonal dynamic carrier 7529.

Continuing to refer to FIG. 75, summed dynamic carrier 7527 is mixed, in this non-limiting case by a multiplicative mixer 7531 with the message signal 7506 as signal 7509 to produce mixed message signal 7532. The summed orthogonal dynamic carrier 7529 is mixed, in this non-limiting case by a multiplicative mixer 7536 with the second encryption signal 7504 as signal 7530 to produce mixed orthogonal signal 7535. Mixed orthogonal signal 7535 and mixed message signal 7532 are summed additively by summer 7533 to produce signal 7534 designated as the encrypted message signal 7537. This encrypted message signal contains energy from the original message signal, the second encryption signal, as well as the analog key signal, and the combined spectrum has been modified by the intervening processing.

Although FIG. 75 shows a single key that goes through the inversion process for use, it is possible for one skilled in the art to add one or more additional keys to enable use of the second encryption signal, as well as to use, in any position where an analog key is used, a processed key.

Decryption with Orthogonal Carriers

FIG. 76 illustrates an example of a decryption device when orthogonal carriers are utilized in the encryption process as illustrated and described for FIG. 74 and FIG. 75. Note that for decryption where the original message is to be recovered but the second encryption signal will not be recovered there is no requirement to generate the orthogonal carrier.

Figure 77:
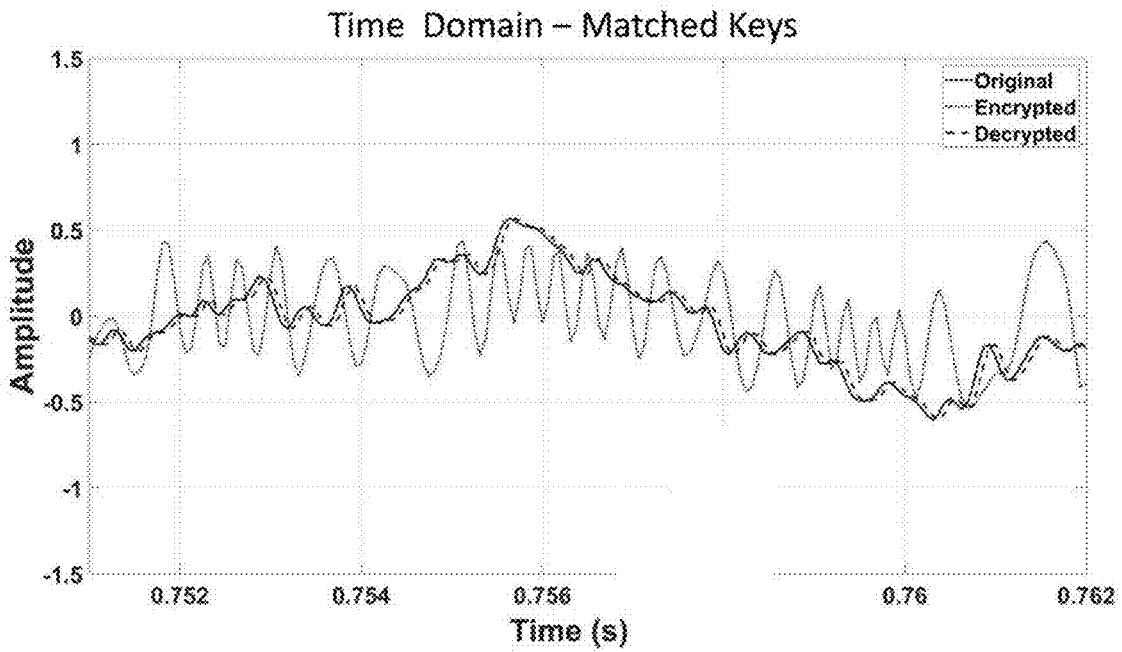
FIG. 77 illustrates the resultant time domain waveforms using the PLTNM-based encryption-decryption system of FIGS. 71 and 72 with matched encryption and decryption keys.

The analog key signal 7601 presented as signal 7603 modulates via modulator 7605 a carrier 7602 presented to the modulator as signal 7604 to produce a standard dynamic carrier signal 7606, shown as standard dynamic carrier 7608. This standard dynamic carrier 7608 is presented to a mixer, which in this non-limiting case may be a multiplicative mixer 7610, as signal 7609, mixing with the encrypted message signal 7600 presented to the mixer as signal 7607 to produce a mixed signal 7611. This mixed signal is filtered by filter 7612, which may in preferred embodiments be a low pass filter to remove upper sideband energy to produce signal 7613 which is designated the Decrypted Message Signal 7614. FIG. 77 illustrates the resultant time domain waveforms using the PLTNM-based encryption-decryption system of FIGS. 71 and 72 with matched encryption and decryption keys.

FIG. 78 illustrates the resultant time domain waveforms using the PLTNM-based encryption-decryption system of FIGS. 71 and 72 with mismatched encryption and decryption keys.

FIGS. 79A-C illustrate the power spectra using the PLTNM-based encryption-decryption system of FIGS. 71 and 72 with matched encryption and decryption keys.

FIGS. 80A-C illustrate representative power spectra using the PLTNM-based encryption-decryption system of FIGS. 71 and 72 with mismatched encryption and decryption keys.

Figure 86A:
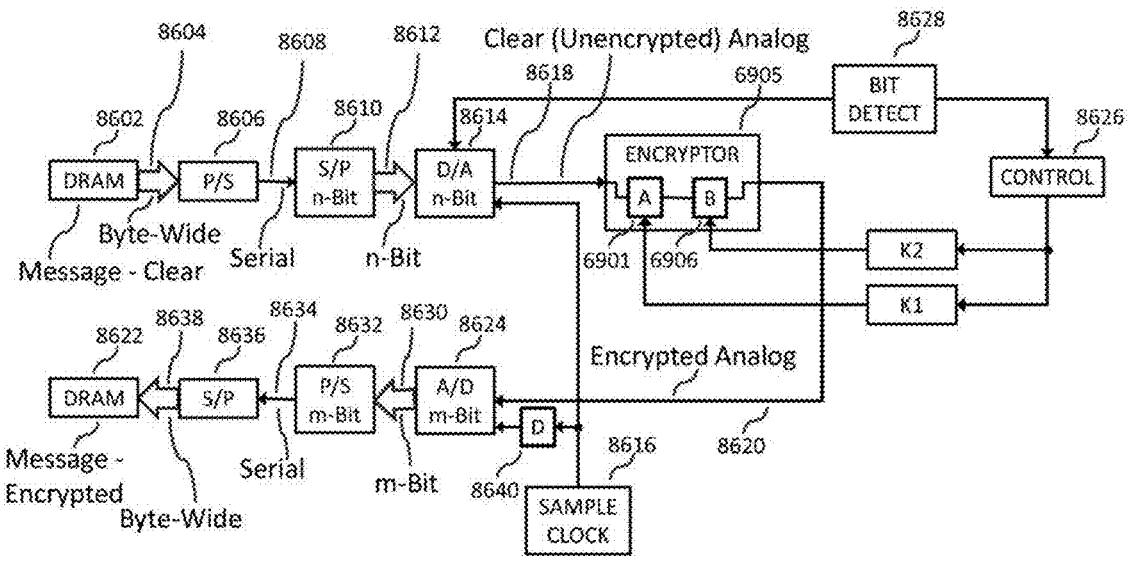
FIGS. 86A-B, illustrate a more detailed diagrammatic view of the encryptor/decryptor.
Figure 86B:
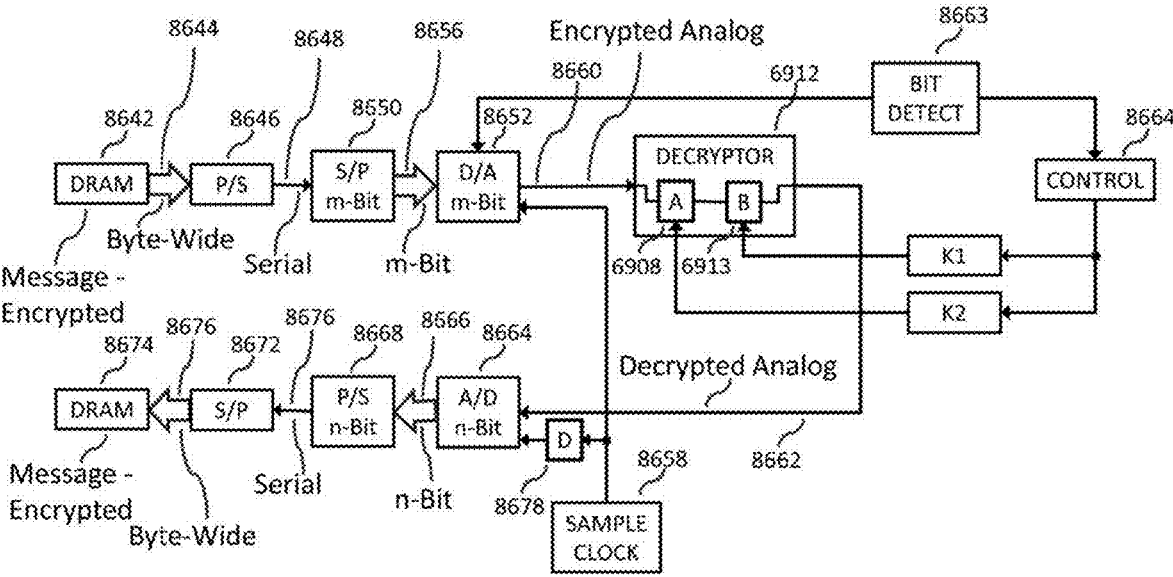

Referring now to FIGS. 86A-B, there is illustrated a more detailed diagrammatic view of the encryptor/decryptor. With specific reference to FIG. 86A, a first message memory 8602 in the form of a DRAM is illustrated. This memory 8602, in this disclosed embodiment, will store a message that is unencrypted in a digital format, this format typically being in a byte-wide format, i.e., 8-bit words. As described hereinabove, the unencrypted message is defined as having a beginning and an end. Thus, the first byte that is extracted will be the initial part of the unencrypted message, this being important as the encryption operation requires an analog key which must be synchronized in time to the message being encrypted. During a Read operation from the memory 8602, the bytes will be sequentially output onto a bus 8604.

As described hereinabove, the digital message is encoded to an analog form thereof for encrypting. To facilitate encoding at a different bit value than the byte-wide bit value of that stored in the DRAM 8602, the byte-wide data on the bus 8604 is input to a parallel/serial converter 8606 to convert the data to serial data on a serial bus 8608. This is then input to a serial/parallel converter 8610 in order to convert the byte-wide data on the bus 8604 to an n-bit value on a bus 8612. This n-bit digital value is input to a n-bit digital-to-analog (D/A) converter 8614 that is controlled by sampling clock 8616. This provides an analog signal output on an analog bus 8618. The D/A converter 8614 could incorporate the serial/parallel converter 8610 therein so as to buffer the data. The sampling clock 8616 defines the rate at which analog samples are output. For each cycle of the sample clock, there must be a bit rate clock either at serial to parallel converter 8610 or in the D/A converter 8614 to clock through n-bits of each digital value received on the bus 8608 for each analog sample generated.

The analog signal on the analog bus 8618 is comprised of an analog encoded version of the digital message stored in the DRAM 8602, though modified in characteristics because each n bits produces an analog output not equivalent to the value that might be represented by a complete byte. Although not shown, this is first filtered to provide a filtered analog signal. This filtered analog signal is then input to the encryptor 6905 illustrated above with respect to FIG. 69 to be processed through the two PLTNM circuits 6901 and 6906 for encryption and output of an encrypted analog signal on an analog bus 8620. For encryption, each of the PLTNM circuits 6901 and 6906 requires a separate analog key—K1 for PLTNM Circuit 6901 and K2 for PLTNM circuit 6906. Each of these analog keys are controlled by a control block 8626 to initiate the encryption operation such that the first sample that is generated by the D/A converter 8614 is synchronized with the beginning of each of the analog keys K1 and K2. To facilitate this, a bit detector 8628 is operable to detect the first n-bit sample that is generated by the D/A converter 8614. The control block 8626 controls the sample clock 8616 and is synchronized therewith. During the encoding operation performed by the D/A converter 8614, an n-bit digital value is encoded in an encoding operation during one cycle of the sample clock to generate a corresponding analog value which is then input to a hold circuit to hold that analog value for the next cycle of the sample clock. During the hold cycle, the next n-bit value is being encoded. Thus, by detecting when the first n-bit value of the message signal is encoded into an analog value and then placed in the hold circuit, this comprises the first analog sample of the unencrypted message and this is point in time at which the analog key signals, K1 and K2, are initiated.

If, at this point in the processing, this encrypted analog signal were input to a decryptor described hereinabove in the analog domain, it could be decrypted at that point. However, this encrypted analog signal is first decoded to a digital value and stored in a DRAM 8622 as an encrypted digitized message in order to allow the encrypted digitized message to be easily transferred for decryption at a different location with a different process or stored for later decryption. To facilitate this digitization, the encrypted analog data from the encrypted analog bus 8620 is input to an m-bit analog-to-digital (A/D) converter 8624. As described hereinabove, the original clear message was encoded to an analog signal using an n-bit D/A converter 8614 which has an associated set of levels for the number of bits utilized to encode the analog signal. The higher the number of bits, the more discrete levels that can be generated for the analog signal. However, as described hereinabove, when the original analog form of the message is input to the encryptor 6905, the analog keys will impart additional energy into the signal thus changing the levels of that signal. In this disclosed embodiment, the value of the m-bit digital value that is associated with the m-bit A/D converter 8624 is a larger number of bits for each sample compared to that associated with the n-bit D/A converter 8614 requiring a lower number of bits for each sample encoded to a digital value. This will require more storage in the DRAM 8622 for the encrypted message, as more information is contained therein. For the m-bit A/D converter 8624, each sample will require the generation of an m-bit digital value, thus requiring a bit clock that will generate m-bits for each sample.

The output of A/D converter 8624 is output on an m-bit data bus 8630 which is input to a parallel/serial converter 8632 to provide serial digital data on a serial bus 8634. This is then input to a serial/parallel converter 8636 to convert the serial data to byte-wide data for output on a byte-wide data bus 8638. This byte-wide data is then input to the DRAM 8622 for storage therein, which provides the encrypted digitized message. Again, there will be more data, i.e., more total bits, since the A/D converter 8624 utilized a higher number of bits to encode each sample, i.e., the m-bit value is higher than the n-bit value.

It is noted that each analog sample that is input to the encryptor 6905 must correlate with each sample that is decoded by the A/D converter 8624. Thus, for example, if an n-bit digital value is converted to an analog sample during a time t0, that value will be encrypted, output on the serial bus 8620, sampled in a sample and hold circuit on the input of the A/D Converter 8624 and then converted to a m-bit digital value. It is important that the sample that is sampled on the input of the A/D converter 8624 is sampled at the same time in the analog signal that the sample was output by the D/A converter 8614. However, there will be some delays associated with processing by the encryptor 6905 and these must be accounted for. Therefore, the sample clock or the A/D converter will be required to be delayed to account for such delay, t0+D. This is provided by a delay block 8642 delayed the output of the sample clock 8616 from the sample clock input to the A/D converter 8614 by "D."

Referring now to FIG. 86B, there is illustrated a diagrammatic view of a corresponding decryptor substantially similar to the encryptor of FIG. 86A. In this disclosed embodiment, a DRAM 8642 substantially similar to the DRAM 8622 contains the encrypted message. In order to decrypt this message, a substantially inverse operation to that utilized for encryption must be utilized. Thus, the byte-wide data from the DRAM 8642 is output on a byte-wide bus 8644 to a parallel/serial converter 8646 to provide serial digital data on a serial bus 8648 for conversion to a m-bit value with a serial/parallel converter 8650. This is then input to a m-bit D/A converter 8652 on an m-bit bus 8656. The D/A converter 8652 is controlled by a sample clock 8658 to encode the m-bit digital values to analog samples for output on an analog bus 8660. Since the D/A converter 8652 operates with m-bits to generate each sample for each cycle of the sample clock 8658, this analog value, the encrypted value, should be identical to that generated for the corresponding sample on the encrypted serial data bus 8620 in the encryption operation.

The encrypted analog signal on the analog bus 8660 is input to the decryptor 6912, described hereinabove with respect to FIG. 69, for processing through the two serially connected PLTNM circuits components 6908 and 6913 to output on an analog bus 8662 a decrypted analog signal. For the decryption operation, this requires the analog keys, the analog key K2 for the PLTNM circuit 6908 and the analog key K1 for the PLTMN circuit 6913. These two analog keys are controlled by a control block 8664 that detects the generation of the first sample from the first m-bit digital value output as encoded analog by the D/A converter 8652 with a bit detector 8663. This thus ensures that the analog keys are initiated at the beginning of the generation of the encrypted message encoded to analog on the serial bus 8660. This will correspond directly to the encryption operation.

The decrypted analog signal on the serial bus 8662 is input to an n-bit A/D converter 8664 to generate an n-bit digital value for output on an n-bit data bus 8666 for input to a parallel/serial converter 8668 for output of serial data on serial data bus 8676 for input to a serial/parallel converter 8672 to convert the serial data to byte-wide data for input to a DRAM 8674 on a byte-wide data bus 8676. During the digital decoding by the A/D converter 8664, the sample clock 8658 is delayed by a delay block 8678, similar to the delay block 8640 in FIG. 86A.

Thus, with the embodiments of FIGS. 86A-B, the encryption operation allows a digital message stored in a memory to be encrypted in the analog domain and then this analog encrypted signal is then converted to a digitized version thereof for storage in the DRAM 8622. This digitized encrypted message can then be stored for later transfer or decryption. All that is required for the decryption is the decryption circuit that corresponds to that circuit which was utilized for encryption and the information as to the values of m and n in addition to the analog keys. Since a digitized message resides in the digital domain, handling of the digitized information, storage thereof or transfer thereof does not change the value of this digitized message. Thus, it is possible to extract the analog information from the digitized and encrypted message. Compare this to the operation described hereinabove wherein the transmission occurred in the analog domain. In that case, it is imperative that no change in the encrypted information is introduced during that transmission.

Figure 87:
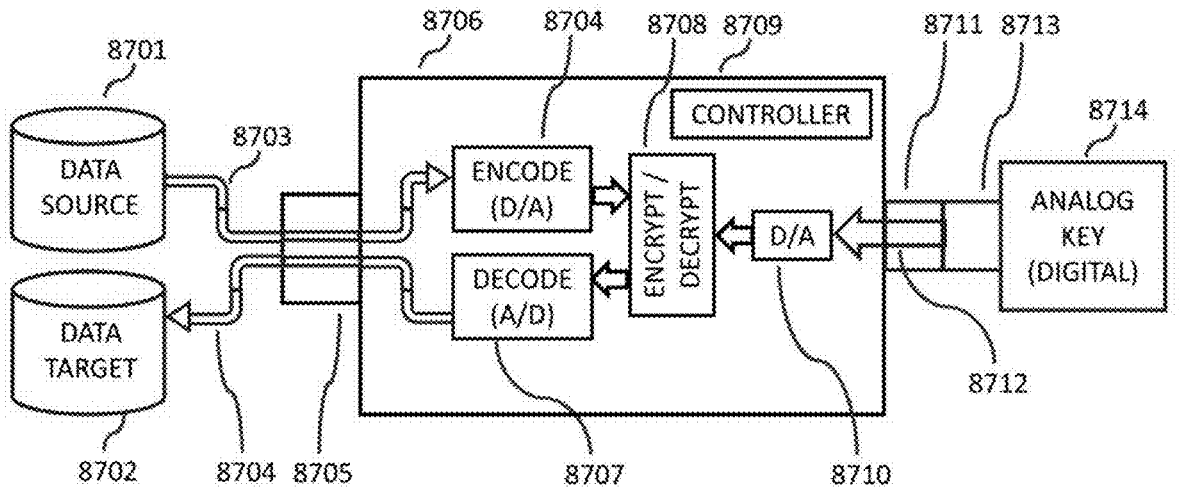
FIG. 87 illustrates an application of the encryption/decryption system with applied key.

FIG. 87 illustrates an application of the encryption/decryption system with applied key. A device is illustrated that performs one of two compound actions, or both. The first concept is that an original digital file on data store 8701 is to be encrypted and so is transmitted via bus 8703 through connection 8705 to the encoder 8704. The digital file can be of any type, and store 8701 can be a hard disk, ethernet stream, flash drive, or any of a multitude of data sources. Upon encryption the encrypted signal is encoded at 8707, transferred to a data target 8702 through connector 8705 as digital data stream 8704.

The second compound action is that an encrypted data file on data store 8701 is to be decrypted, and so is transmitted via 8703 through connection 8705 to the encoder 8704. The now analog signal would be decrypted by 8708, decoded by 8707 to be passed through 8705 as data stream 8704 to the data target 8702.

As is discussed elsewhere in this document, the exact configuration of encoder 8704 and decoder 8707 differs between encryption and decryption, so generally one set is available for encryption and one set for decryption, and the signal path is determined by the operation to be performed (encryption or decryption), and actions of controller 8709.

Device 8706 is the encryption/decryption device and can be embedded into a computer system or hard disk or can be constructed for external operation to look like a flash drive or other connection to standard connectors or ports. Connection 8705 may be proprietary or may utilize standards-based connections such as USB without limitation.

Device 8706 has an additional connection or port that accepts connection of a container for an analog key. This may be a digital representation of the analog key signal such that D/A 8710 and any additional circuitry necessary for implementation translates the digital file to an analog signal for use in the encryption or decryption process at 8708. Analog key file container 8714 may be a proprietary configuration or may be configured to a standard such as a USB flash drive where connector 8713 then would be mechanically and electrically configured to meet the USB standards. Connection 8711 is configured to mate with connection 8713 to pass the analog key file through as 8712 to the D/A 8710.

Device 8714 may contain one or more analog keys as digital files or stored in other ways. Multiple keys may be used at once or the system may select among them to determine which analog key to use.

Encryption/decryption engine 8708 is the heart of the device and may be one set of circuits for both encryption and decryption, or separate circuits. The configuration and variations possible with this module are detailed elsewhere. Component 8708 accepts an analog signal as input for either encryption or decryption along with one or generally more than one analog key signals. Component 8708 outputs an analog signal that for encryption is the encrypted analog signal, and for decryption the decrypted analog signal. It should be noted that because encoder 8704 and decoder 8707 do not utilize for encoding and decoding either the same number of bits as one another, or the same number of bits used to store the original file, that the encoded analog signal is a representation but not a direct representation of the original file. See FIG. 86 and description for more information.

In an alternate embodiment of FIG. 87, it is possible to just incorporate a single Flash memory in the device 8706 that interfaces with the data sources 8701 and 8702. Data in a digital file (encrypted or unencrypted) is received and buffered in a designated block or blocks of the Flash. The controller can detect connection of the analog key file container 8714 and then initiate the encryption/decryption operation, noting that some indication command is required to initiate the extraction of digital data from the Flash and, in synchronization therewith, initiate the analog keys. The two analog keys can be downloaded as two digital files and buffered for encoding to two analog key signals. The encryption or decryption process is then carried out with the two analog keys, and the resultant digital information from the A/D Converter 8707 stored in the same Flash that the incoming data was stored in. All that is required is to store the information in a different block. Thereafter, the block in which the incoming data was stored for processing is/can be block erased.

For this operation, all that is required is to determine if the operation is encryption or decryption. In this embodiment, the two transfer functions in the encrypt/decrypt block 8708 will need to be the inverse transfer function of each other. In this manner, all that is required is to switch the analog keys parameterizing the transfer functions and the "m" and "n" values for the D/A and A/D converters 8704 and 8707 to move between encryption and decryption. With this configuration, data in a digital format representing the message to be encrypted can be input to device 8706 and digitally stored in the Flash for later processing. All that is required is to attach the analog key container 8714 to send the two analog keys to the device 8706, in addition to a command to encrypt the message, and also to provide the "m" and "n" values for the encode/decode functions. The command for encryption will configure the analog keys to parameterize the correct transfer functions and apply the "m" and "n" values accordingly. The result will be storage of an encrypted analog signal as a digital file in the Flash and erasure of the digital message file that was encrypted For decryption, all that is required is to attach the analog key container 8714 to the device 8706 containing a digital file with an encrypted message file, wherein the two analog keys are those used for encryption. This will result in the transfer of the two analog keys to the device 8706, in addition to a command to decrypt and to also send the "m" and "n" values, the "m" and "n" values being those used for the encryption operation. The command for encryption will configure the analog keys opposite to what they are configured for the encryption operation and to configure the "m" and "n" values opposite to what they are configured for the encryption operation, noting that this will "flip" the analog keys between the two transfer functions and the "m" and "n" values also. The data to be processed will be that stored in the un-erased blocks of the Flash. The encrypted message never has to be taken off of the device 8706. After decryption, the decrypted digital file will be stored in a free block of the Flash.

The device 8706 after encryption is basically then configured as an encrypted device with the next action being decryption. The decrypted data can be stored in a free block in the Flash, but the encrypted message need not be erased. This allows an individual to use a single device that will receive a file, encrypt it with the two analog keys and store the encrypted message for transport. With the same device, all that is required is to have the two analog keys and the device 8706 for decryption. Since the decrypted message will then be stored in a known block in the Flash, it can be downloaded therefrom.

Although the disclosed embodiment has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A method for processing an analog message in either an encryption/decryption operation, comprising the steps of:
   receiving the analog message as a received analog message signal and being one of an analog encrypted message signal to be decrypted in a decryption operation or an analog unencrypted message signal to be encrypted in an encryption operation;
   wherein the received analog message signal has an associated length from a fixed beginning point;
   receiving a first analog key signal and a second analog key signal each of the first and second analog key signals having a fixed beginning point and an associated length;
   processing the received analog signal through a first transfer function and the output of the first transfer function processed through a second transfer function;
   wherein each of the first and second transfer functions have at least a second order response;
   parameterizing the operation of the first transfer function with the first analog key signal;
   parameterizing the operation of the second transfer function with the second analog key signal; and
   controlling with a controller the steps of parameterizing to synchronize the beginning of the received analog signal with the beginning of the first and second analog key signals.

2. The method of claim 1, wherein the first analog key signal is distinct from the second analog key signal.

3. The method of claim 1, wherein the second analog key signal is the inverse of the first analog key signal.

4. The method of claim 1, wherein the first and second analog key signals each have a length that is equal to or greater than the associated length of the received analog message signal.

5. The method of claim 1, wherein the steps of parameterizing each of the first and second transfer functions comprises modifying the respective at least second order responses thereof with the respective first or second analog key signals.

6. The method of claim 5, wherein each of the first and second transfer functions has a dynamic control element that controls the respective second order response and the steps of parameterizing each of the first and second transfer functions comprises modifying the respective dynamic control element with the respective first or second analog key signals.

7. The method of claim 5, wherein each of the first and second analog key signals is modified to generate respective dynamic first and second analog control signals for controlling the at least second order responses of the respective first and second transfer functions.

8. The method of claim 7, and further comprising the steps of:
   modifying each of the first and second analog key signals by introducing at least second order dynamics into the respective first and second analog key signals.

9. The method of claim 5, wherein the received analog message signal resides in a baseband portion of the frequency spectrum.

10. The method of claim 9, wherein the steps of modifying the respective at least second order responses of the respective first and second transfer functions with the respective first or second analog key signals results in spreading information in the received analog message signal across the frequency spectrum.

11. The method of claim 1, wherein the second transfer function comprises the inverse of the first transfer function.

12. The method of claim 1 wherein the step of controlling further comprising detecting the beginning of the received analog message signal with the controller and controlling the initiation of the first and second analog key signals to correspond to the detected beginning of the received analog message signal.

13. A method for encryption and decryption of an analog message signal having a finite length from a beginning point thereof, comprising the steps of:

encrypting the analog message signal with the steps of:

processing the analog message signal through a first transfer function with the output thereof processed through a second transfer function, wherein each of the first and second transfer functions have at least a second order response, generating first and second analog key signals, each having a finite length from a beginning, the first analog key signal associated with the first transfer function and the second analog key signal associated with the second transfer function, parameterizing the first and second transfer functions with the associated and respective first and second analog key signals, and synchronizing the generation of the first and second analog key signals with the beginning of the analog message signal, wherein the output of the second transfer function provides an encrypted analog message signal having a finite length from a beginning; and decrypting the encrypted analog message signal from the step of encrypting with the steps of:

processing the encrypted analog message signal through a third transfer function with the output thereof processed through a fourth transfer function, the third transfer function being the inverse of the first transfer function and the fourth transfer function being the inverse of the second transfer function, generating third and fourth analog key signals, each having a finite length from a beginning, the third analog key signal associated with the third transfer function and the fourth analog key signal associated with the fourth transfer function, wherein the third analog key signal is substantially identical to the first analog key signal and the fourth analog key signal is substantially identical to the second analog key signal, parameterizing the third and fourth transfer functions with the associated and respective third and fourth analog key signals, and synchronizing the generation of the third and fourth analog key signals with the beginning of the encrypted analog message signal, wherein the output of the second transfer function provides a decrypted analog message.

14. The method of claim 13, wherein the first analog key signal is distinct from the second analog key signal.

15. The method of claim 13, wherein the second analog key signal is the inverse of the first analog key signal.

16. The method of claim 13, wherein the first and second analog key signals each have a length that is equal to or greater than the longer of the analog message or the encrypted analog message.

17. The method of claim 13, wherein the steps of parameterizing each of the first and second transfer functions comprises modifying the respective at least second order response thereof with the respective first or second analog key signals and the steps of parameterizing each of the third and fourth transfer functions comprises modifying the respective at least second order responses thereof with the respective third or fourth analog key signals.

18. The method of claim 17, wherein each of the first and second transfer functions has a dynamic control element that controls the respective at least second order response and the steps of parameterizing each of the first and second transfer functions comprises modifying the respective dynamic control element with the respective first or second analog key signals and wherein each of the third and fourth transfer functions has a dynamic control element that controls the respective at least second order response and the steps of parameterizing each of the third and fourth transfer functions comprises modifying the respective dynamic control element with the respective third or fourth analog key signals.

19. The method of claim 17, wherein each of the first and second analog key signals is modified to generate respective dynamic first and second analog control signals for controlling the at least second order responses of the respective first and second transfer functions and wherein each of the first and second analog key signals is modified to generate respective dynamic third and fourth analog control signals for controlling the at least second order responses of the respective third and fourth transfer functions, the first and third dynamic control signals being substantially the same and the second and fourth dynamic control signals being substantially the same.

20. The method of claim 13 wherein:

the step of synchronizing the generation of the first and second analog key signals further comprising detecting the beginning of the analog message signal and controlling the initiation of the first and second analog key signals to correspond to the detected beginning of the analog message signal; and the step of synchronizing the generation of the third and fourth analog key signals further comprising detecting the beginning of the encrypted analog message signal and controlling the initiation of the third and fourth analog key signals to correspond to the detected beginning of the encrypted analog message signal.

21. A processor for encryption/decryption of an analog message signal, wherein the analog signal has an associated length from a fixed beginning point, comprising:

a message signal input for receiving the analog message signal;

a first circuit for receiving the analog message signal and processing it with a first transfer function;

a second circuit for receiving the output of the first circuit and processing it with a second transfer function;

wherein each of the first and second transfer functions have at least a second order response;

a first key input for receiving a first analog key signal for input to the first circuit, wherein the first transfer function in the first circuit is parameterized by the first analog key signal;

a second key input for receiving a second analog key signal for input to the first second, wherein the second transfer function in the second circuit is parameterized by the second analog key signal;

wherein each of the first and second analog key signals have a fixed beginning point and an associated length; and a controller for synchronizing the beginning of the received analog message signal with the beginning of the first and second analog key signals.

22. The processor of claim 21, wherein the first analog key signal is distinct from the second analog key signal.

23. The processor of claim 21, wherein the second analog key signal is the inverse of the first analog key signal.

24. The processor of claim 21, wherein the first and second analog key signals each have a length that is equal to or greater than the associated length of the received analog message signal.

25. The processor of claim 21, wherein the first and second analog key signals modify the respective at least second order response of the respective first and second transfer functions.

26. The processor of claim 25, wherein each of the first and second circuits have a dynamic control element that controls the respective at least second order response and the first and second key signals parameterize each of the respective first and second transfer functions by modifying the respective dynamic control.

27. The processor of claim 25, wherein each of the first and second analog key signals is modified to generate respective dynamic first and second analog control signals for controlling the at least second order responses of the respective first and second transfer functions.

28. The processor of claim 27, wherein each of the first and second analog key signals is processed through a modification circuit to modify each of the respective first and second analog key signals by introducing at least second order dynamics into the respective first and second analog key signals.

29. The processor of claim 21, wherein the second transfer function comprises the inverse of the first transfer function.

30. The processor of claim 21 and further comprising a detector for detecting the beginning of the analog message signal and controlling the initiation of the first and second analog key signals to correspond to the detected beginning of the analog message signal.

* * * * *